June 6, 1961 D. J. GIMPEL ET AL 2,987,704

VARIABLE MONITORING AND RECORDING APPARATUS

Filed Dec. 21, 1956 16 Sheets-Sheet 1

INVENTORS
Gilbert S. Daniels
Donald J. Gimpel
By: Wallenstein & Spangenberg Attys June 6, 1961 D. J. GIMPEL ET AL 2,987,704

VARIABLE MONITORING AND RECORDING APPARATUS

Filed Dec. 21, 1956 16 Sheets-Sheet 2

INVENTORS
Gilbert S. Daniels
Donald J. Gimpel
By: Wallenstein & Spangenberg
atty

VARIABLE MONITORING AND RECORDING APPARATUS

Filed Dec. 21, 1956 16 Sheets-Sheet 3

Inventors
Gilbert S. Daniels
Donald J. Gimpel
By: Wallenstein & Spangenberg, attys.

VARIABLE MONITORING AND RECORDING APPARATUS

Filed Dec. 21, 1956 16 Sheets-Sheet 4

INVENTORS
Gilbert S. Daniels
Donald J. Gimpel
By: Wallenstein & Spangenberg attys.

VARIABLE MONITORING AND RECORDING APPARATUS

Filed Dec. 21, 1956 16 Sheets-Sheet 5

Inventors
Gilbert S. Daniels
Donald J. Gimpel
By: Wallenstein & Spangenberg Attys June 6, 1961 D. J. GIMPEL ET AL 2,987,704

VARIABLE MONITORING AND RECORDING APPARATUS

Filed Dec. 21, 1956 16 Sheets-Sheet 6

INVENTORS
Gilbert S. Daniels
Donald J. Gimpel
By: Wallenstein & Spangenberg
Attys.

INVENTORS
Gilbert S. Daniels
Donald J. Gimpel
By: Wallenstein & Spangenberg
Attys.

June 6, 1961 D. J. GIMPEL ET AL 2,987,704

VARIABLE MONITORING AND RECORDING APPARATUS

Filed Dec. 21, 1956 16 Sheets-Sheet 8

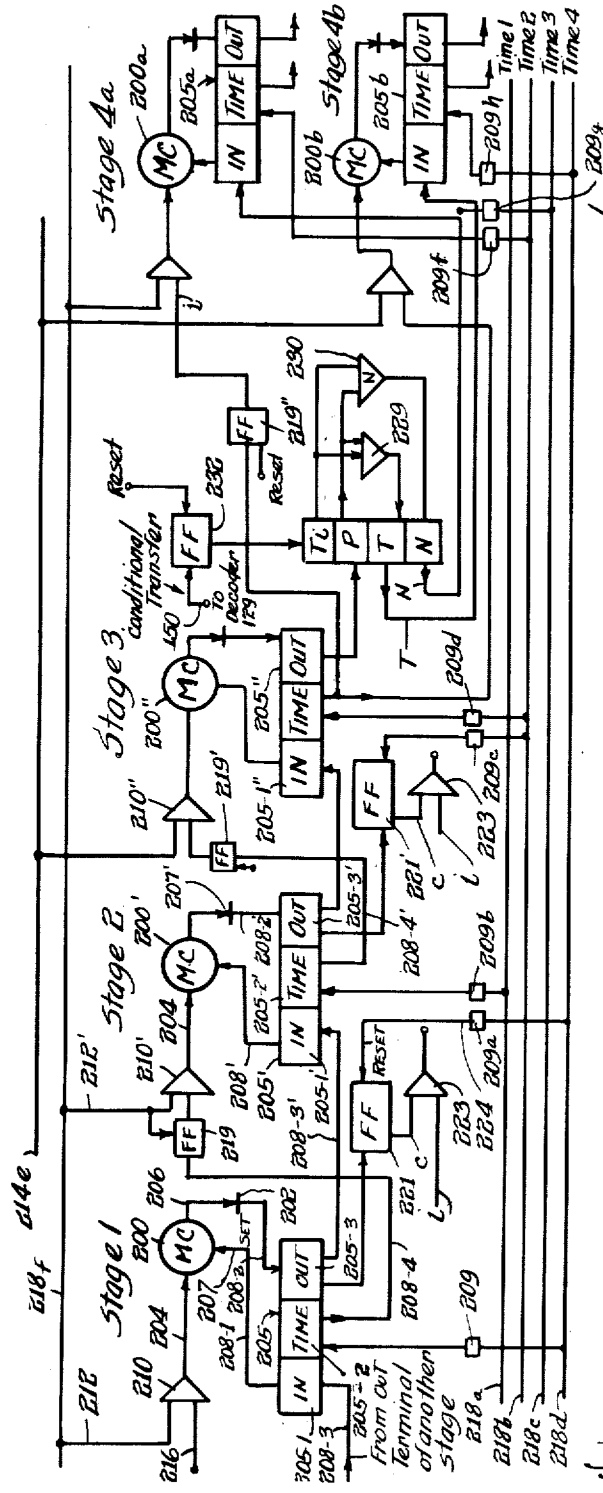

Fig. 8, Fig. 9

Registers Employed for Arithmetic Operations

| Operation | | DSR | AR | MQR-MQC | Drum |
|---|---|---|---|---|---|
| Addition | 1, 2 | Augend sum | Addend | Addend may appear anywhere | Addend |
| Subtraction | 1, 2 | Sub. or Min. difference | Minuend | subtrahend may appear anywhere | |
| Mult. | 1, 2 | Multiplicand | ←product→ | Multiplier | |
| Div. | 1, 2, 3, 4 | Division | Division "0" detect<br>Dividend "0" detect<br>Dividend<br>Remainder Quotient | | |
| Root | 1, 2 | Root | Rodicand | | |

INVENTORS
Gilbert S. Daniels
Donald J. Gimpel
By: Wallenstein & Spangenberg
Attys

VARIABLE MONITORING AND RECORDING APPARATUS

Filed Dec. 21, 1956 16 Sheets-Sheet 9

INVENTORS

Gilbert S. Daniels

Donald J. Gimpel

By: Wallenstein & Spangenberg attys

INVENTORS
Gilbert S. Daniels
Donald J. Gimpel
By: Wallenstein & Spangenberg
Attys.

VARIABLE MONITORING AND RECORDING APPARATUS

INVENTORS
Gilbert S. Daniels
Donald J. Gimpel
By: Wallenstein & Spangenberg
Attys

VARIABLE MONITORING AND RECORDING APPARATUS

INVENTORS
Gilbert S. Daniels
Donald J. Gimpel
By: Wallenstein & Spangenberg Attys.

INVENTORS
Gilbert S. Daniels
Donald J. Gimpel
By: Wallenstein & Spangenberg
attys

VARIABLE MONITORING AND RECORDING APPARATUS

Filed Dec. 21, 1956 16 Sheets-Sheet 15

Fig. 12.

PROGRAMMING INSTRUCTIONS

| No | CATAGORY | INSTRUCTIONS |
|---|---|---|
| 1 | AU | ADD |
| 2 | " | SUBTRACT |
| 3 | " | MULTIPLY |
| 4 | " | CONSTANT 1 |
| 5 | " | CONSTANT 2 |
| 6 | " | CYCLE COUNTER ADVANCE |
| 7 | DSR | READ IN |
| 8 | " | READ OUT ADDRESS |
| 9 | " | " |
| 10 | " | " |
| 11 | " | " |
| 12 | AR | READ IN |
| 13 | " | READ OUT |
| 14 | " | "0" DETECT |
| 15 | MQ | READ IN |
| 16 | " | READ OUT |
| 17 | " | ADD To MQC |
| 18 | " | SUBTRACT FROM MQC |
| 19 | AR | SHIFT |
| 20 | MQ | SHIFT |
| 21 | ARMQ | 1 |
| 22 | " | 2 |
| 23 | " | 3 |
| 24 | " | 4 |
| 25 | DRUM | READ IN |
| 26 | " | READ OUT |
| 27 | " | BLOCK 1 |
| 28 | " | BLOCK 2 |
| 29 | " | WORD 1 |
| 30 | " | WORD 2 |
| 31 | " | WORD 3 |
| 32 | " | WORD 4 |
| 33 | " | WORD 5 |
| 34 | | WORD 6 |
| 35 | INSTR REG. | READ IN |
| 36 | " " | READ OUT |
| 37 | ADDRESS REG | READ IN |
| 38 | " | READ OUT |
| 39 | KEYBOARD | CLEAR |
| 40 | " | TOTAL DEMAND |
| 41 | ADC | READ OUT |
| 42 | ALARM DETECT SET IF + | |
| 43 | INITIATE OFF NORMAL PRINT OUT | |
| 44 | INITIATE LOG PRINT OUT | |
| 45 | RESET DRUM ENTRY LOG CYCLE | |
| 46 | TABLE LOOKUP | |
| 47 | ALARM DETECT SET IF − | |

Fig. 13.

CONDITIONAL TRANSFERS SET CONDITIONS

| No | CLASS | SOURCE |
|---|---|---|
| 1 | 1-KEYBOARD ENTRY | KEYBOARD |
| 2 | 1 OFF NORMAL SUMMARY | " |
| 3 | 1 TOTAL DEMAND | " |
| 4 | 1 ON DEMAND LOG | " |
| 5 | 1 DRUM ENTRY LOG CYCLE | KEYBOARD OR CLOCK |
| 6 | 1 24 HR. LOG | " |
| 7 | 1 8 HR. LOG | Clock |
| 8 | 1 1 HR. LOG | KeyBoard or Clock |
| 9 | 2 SIGN + | ADDER |
| 10 | 2 CYCLE COMPLETE | CYCLE COUNTER |
| 11 | 3 ALARM DETECT | Bistable control |
| 12 | 3 LOG PRINT OUT | " |
| 13 | 2 OUT REGISTER CLEAR | " |
| 14 | 4 SCAN POINT ---(0,1,2,3) | Instruction Word |
| 15 | 4 TOTAL POINT --(1,2,3,4)- | " |
| 16 | 4 FLOW POINT (0,1,2,3)--- | " |
| 17 | 4 PRESSURE COMP. (2,3)--- | " |
| 18 | 4 ALARM MEMORY ---(1,3)- | " |
| 19 | 4 LOG POINT ---(2,3,4) | " |
| 20 | 4 TABLE LOOKUP (4-- 9)--- | " |
| 21 | 4 24 HR. TOTAL (4,5,6,7)--- | " |
| 22 | 4 8HR TOTAL -(3,7,8)-- | " |
| 23 | 4 CROSS TOTAL --(2,3)- | " |
| 24 | 4 TEMP. COMP. (1,3) --- | " |
| 25 | 4 INTEGRATION SUBCYCLE | Clock |
| 26 | 1 HR. -(2,4,6,8)-- | Instruction Word |
| 27 | 4 CROSS TOTAL --(4)- | " |

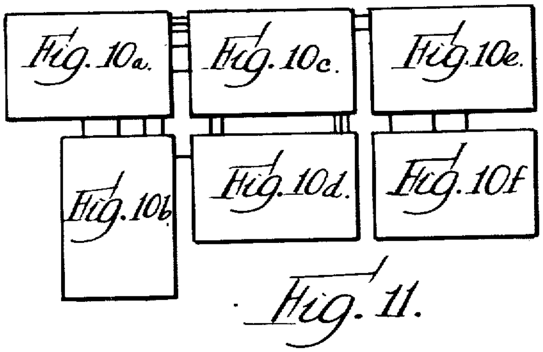

Fig. 11.

INVENTORS
Gilbert S. Daniels
Donald J. Gimpel
By: Wallenstein & Spangenberg
attys.

June 6, 1961 D. J. GIMPEL ET AL 2,987,704

VARIABLE MONITORING AND RECORDING APPARATUS

Filed Dec. 21, 1956 16 Sheets-Sheet 16

INVENTORS
Gilbert S. Daniels
Donald J. Gimpel
By: Wallenstein & Spangenberg
attys United States Patent Office 2,987,704

Patented June 6, 1961

2,987,704

VARIABLE MONITORING AND RECORDING APPARATUS

Donald J. Gimpel, Chicago, and Gilbert S. Daniels, Evanston, Ill., assignors, by mesne assignments, to Information Systems, Inc., Skokie, Ill., a corporation of Illinois Filed Dec. 21, 1956, Ser. No. 629,826

25 Claims. (Cl. 340—172.5)

The present invention relates to apparatus for monitoring variables for alarm conditions and for recording data on such variables.

The conventional engineering approach to the design of variable monitoring and recording systems requires, for the most part, a great deal of custom design resulting in high cost of the equipment involved. Furthermore, if a customer desires to substantially vary the order or types of variables to be handled by the system, requiring substantial alteration in the programming of the various parts of the system, a great deal of work and additional equipment is needed at great additional cost to the customer. The accuracy and reliability of these systems have also left much to be desired.

Among the primary objects of the present invention are to provide a variable monitoring and recording system providing for a much greater standardization of parts, greater flexibility enabling modification at low cost, and greater speed, reliability and accuracy.

Other objects of the present invention are to provide a variable monitoring and recording system which performs functions heretofore unavailable in variable monitoring and recording equipment. To this end the system of the invention is simultaneously operative to scan variables at a high rate seeking abnormal variables while the same system is printing data on the variables at a much slower rate, and it prints out data on newly detected abnormal variables independently of the printout of data on other variables so that information on abnormal variables is immediately available.

Still another object of the present invention is to provide variable monitoring and recording apparatus usable with a large number of different variable types requiring different arithmetic and other programming operations, such as linearization, totalization, time compensation or averaging, square rooting, etc., and, further, wherein the system regularly scans variables to be integrated frequently, interrupting a normal sequential scanning of other variables if necessary, so that the resultant integrated value accurately and currently represents the condition of the variables involved.

Still another object of the invention is to provide such a system where linearization is obtained with a high degree of accuracy, for example, in the order of one unit in one or two thousand, and with a minimum of cost and complexity in equipment. The factor of equipment complexity is of special importance in connection with minimizing maintenance problems and maximizing system reliability. A related object of the present invention is to provide a variable monitoring and recording system wherein signals in analog form are converted into a binary-decimal code, which simplifies the equipment required for a number of arithmetic operations.

Still another object of the present invention is to provide a variable monitoring and recording system which utilizes most preferably a magnetic drum storage unit wherein various control and data information are arranged in a novel manner which greatly simplifies data handling and programming as well as increases speed, accuracy and reliability of the type variable monitoring and recording system disclosed in co-pending application filed on even date herewith, entitled Data Reduction System filed by Ralph Arthur Anderson and Gilbert S. Daniels, Serial No. 630,721, now U.S. Patent No. 2,922,990.

In accordance with one aspect of the invention, a magnetic drum storage unit is uniquely applied to the field of variable monitoring and recording. Variable monitoring and recording systems customarily sequentially scan a number of variables in a given order for alarm conditions by comparing signals derived from transducers associated with the variables and predetermined signals representing upper and lower alarm limits of the variable. In the case where the transducers, particularly thermocouples, have non-linear input to output characteristics, relatively expensive and inaccurate linearizing potentiometers were heretofore provided. For integration purposes, relatively expensive and often inaccurate mechanically operated integrators were utilized for totalizing variables such as liquid flow. Furthermore, most programming and control operations were carried out through a maze of custom-wired stepping switches throughout the system and other components which did not lend themselves to system flexibility required when a change in programming was desired.

In accordance with the invention, the above-mentioned magnetic drum contains both programming and variable data information of a novel type and arranged and utilized in a manner to simplify and render more accurate and reliable the various operations to be performed in a variable monitoring system having the above requirements. Control instructions and data for each variable are preferably grouped together on the drum surface so that once the area set aside for a variable has been located, practically all control and data information related to that variable can be readily obtained in a minimum of time. The placement of the data blocks on the drum follows the scanning order of the corresponding variables. Information, preferably in binary-decimal coded form, is located in each of these areas which indicates whether the variable is one to be scanned for alarm conditions, whether it is a variable to be logged or to be linearized, whether it is a temperature, pressure or flow variable, whether it is a variable which requires pressure or temperature compensation, as required in the case of flow variables, and whether the variable is to be totalized for various periods such as one hour, eight hours or twenty-four hours. Depending on the kind of variable it is, and the operations to be performed thereon, this information, sometimes referred to as instruction information, is utilized to control various operations to be performed by the system. Thus, if an instruction indicates that the variable is to be linearized, linearized sections of the drum are rendered operative; and, if the variable is to be scanned for alarm conditions, alarm sections of the system are rendered operative. If it becomes necessary to change the type of variables being handled by the equipment, it is merely necessary to change the instructions by means of a suitable keyboard input device to suit the new variable conditions. Conditional transfer circuits are provided under control of the instruction information to carry out programming selection functions. Each of the areas of the drum set aside for a particular variable, these areas sometimes being referred to as blocks, also contain information in binary-decimal coded form of one of the alarm limits of the associated variable, and preferably also a number representing the difference between the upper and lower alarm limits of the variable, numerical data on the value of the variable when last scanned and also during a particular periodic cycle, such as hourly, and also information on whether the variable was abnormal when last scanned.

The advancement of a scanning switch which couples the transducer outputs to the measuring part of the system is, in part, controlled by the instruction information transferred from the drum. When the instruction indicates that the associated data block is to contain data on the value of the variable then being scanned, the scanning switch is advanced one position following measurement of the transducer output. Otherwise the switch remains dormant until after its output is called for.

In the most preferred form of the invention, the drum also contains numerical data representing memory of variables currently being logged and scanned to aid in programming information to and from the drum and particularly to enable momentary interruption of a given scanning sub-cycle and subsequent return thereto after other variables are scanned. The drum also has stored thereon information representing the total number of integration operations performed since the last base period, such as hourly base period begun, by means of which average flow from total flow information can be computed.

In another section of the drum, linearization tables are provided, preferably in the form of binary-decimal coded data, for linearizing the output of non-linear transducers. For each type of non-linear transducer, there is provided a different group of numerical data on different possible unlinearized measured values of the variables together with adjacent numerical data representing correction factors to be added to or subtracted from the unlinearized values to provide resultant linearized data.

Associated with the drum are one or more data registers which receive information on the value of the variable measured from the transducers for transfer to the drum and information from the drum for transfer to an output recording device. Additionally, there are address registers which receive numerical information on the particular variable being scanned, logged or totalized, the address register often obtaining the address from the drum. Following completion of a particular scanning operation, the address number recorded on the drum is reduced by one and then transferred to the address register which indicates the next variable to be scanned or logged and the section of the drum from which information is to be obtained or to which it is to be transferred. There is also provided an instruction register for receiving instructions from the drum and suitable decoding means which is responsive to the coded number stored in the instruction register to transfer various control signals to the programming apparatus. The programmer is preferably constructed for general use in monitoring and recording systems, particular connections adapted to a particular system being made preferably through a plug board or printed circuit insert which makes connection between the various stages of a shift register programmer, preferably magnetic core shift registers, including conditional transfer circuits controlled in part by the instructions from the drum. The particular programmer used for a particular installation is capable of providing a variety of alternative programs depending on the instruction information scanned and other factors. Although practically all programming theoretically could be controlled from the drum, it is preferable to utilize a main programmer externally of the drum to increase the speed of operation of the system, it being therefore unnecessary to wait for numerous revolutions of the drum to obtain information required for programming other than the control instructions above mentioned. The latter instruction can usually be obtained in a single pass or rotation of the drum.

An arithmetic unit including an adder may be utilized in performing multiplication, subtraction, square rooting or other arithmetic operations, either alone or in conjunction with the programmer in a general manner well known in the computer field. Multiplication can of course be obtained through successive addition utilizing the adder, and division, as is necessary in obtaining average flow rates, may be obtained through successive subtraction utilizing the above-mentioned adder. The adder, for example, subtracts the measured value of the variable from one of the alarm limits stored on the drum to detect for one extreme alarm condition. The result of the last-mentioned subtraction may be compared or subtracted from the aforementioned drum stored data on the difference between the high and low alarm limits of the variable to sense the opposite alarm condition of the variable.

The over-all format of operation of the preferred system includes the regular scanning of the variable-responsive transducers, such as thermocouples, bellows-operated potentiometers, etc. in a definite order. As each transducer is scanned, a binary-decimal coded number is generated from the transducer output. At the same time a drum address number (referred to as a scan address) corresponding to the transducer last scanned is transferred from the drum and the number one is added to or subtracted from this address to gain access to the section of the drum containing storage space and data handling information for the variable being scanned. Instructions identifying the type of variable involved are transferred from the selected section of the drum and then the binary coded information, representing the value of the variable being scanned, is sequentially programmed to various parts of the system depending on the instruction transferred from the selected section of the drum, where for example, it is sometimes compared to upper and lower alarm limit data transferred from the selected section of the drum. Where the variable is a flow variable wherein the transducer measures instantaneous rate of fluid flow in terms of a pressure drop across an orifice, before alarm detection is carried out a square rooting operation is necessary to compute the actual average flow rate. Where temperature is taken into consideration in computing an accurate average flow value, then the temperature and pressure points involved are provided with suitable transducers which are scanned ahead of the pressure-drop point and the values thereof are stored in the drum section ahead of the section set aside for the pressure-drop instructions so that pressure and temperature factors can be transferred from the drum to the arithmetic unit during the aforesaid square rooting operation. Resultant flow rate information is then added to a previous integrated total which is stored on the drum.

If during the scanning of a variable for alarm detection, no new abnormal condition or new return to normal condition is detected, nothing else of great importance normally occurs until the next variable point is scanned whereupon the above-mentioned operations are again performed. If a new abnormal variable is detected, the measured value of the abnormal variable is first linearized, if this is necessary, and then fed to an output register, and the rather slow printout of the value is carried out by an output typewriter recorder while other variables are scanned in the manner above explained. The data stored on the drum for the abnormal variable is modified to indicate that the variable is abnormal so that the next time the variable is scanned a printout operation will not normally occur even though the variable is then still abnormal.

Periodically, such as hourly, the system records or prints out the values of a number of selected variables and computed total values, all referred to as log points, whether or not they are new abnormal variables. Then, the values of all variables are stored in appropriate sections of the drum during what is called a drum entry log cycle after linearizing is effected, if necessary. At the same time variables on which cumulative hourly totals are desired have their current hourly totals added to a number stored in the related section of the drum representing a totalizing of the previous hourly totals.

During a drum entry log cycle, just as the first variable value for a log point is stored in the drum, it is practically simultaneously readout to an output register for printout under control of a log address number transferred from the drum, whereupon the variable value number is fed to an output typewriter recorder or the like, preferably a different one from the one above mentioned used to record abnormal variables. While the recorder is printing at a slow rate, a drum entry log cycle for other variables is carried on and, when the typewriter recorder finishes recording the first log point, the data value stored in the drum for the next log point is fed to the latter recorder under control of a log address number derived by subtracting or adding the number one to the previous log address number stored in the drum. In this way, print-out and variable scanning occur simultaneously.

Between hourly recording cycles, by depressing an "on-demand" pushbutton, a drum entry log cycle with printout of all log points occurs without the above-mentioned addition of hourly totals. During this period, an "off-normal summary" pushbutton can be depressed and data values on all abnormal variables as scanned (whether new or old abnormal variables) are printed out. Also, during this period by depressing a "totals-demand" pushbutton, the up-to-date accumulated total of all points on which twenty-four hour totals are desired can be selectively printed out.

Except during the one drum entry log cycle per hour, which takes only a minute or less for as much as 500 data points, the system responds to a new abnormal variable by printing out immediately the abnormal variable value on the special typewriter provided therefore without interruption of the normal scanning cycle, and simultaneously with the printing out of the regular hourly log points which may take several minutes to complete each hour.

In accordance with the preferred form of the present invention, the process of integration for flow variables takes precedence over all other operations of the system because, to obtain accurate, current total flow information, information on such variables should be obtained at regular intervals (referred to as integration sub-cyles). (Flow information is usually obtained from information of instantaneous flow rates.) This interval, for example, may be every ten seconds and may necessitate interruption of the scanning of other variables. Memory of the point of interruption in a scanning cycle is obtained through storing the current scan address number on the drum. Counting means are provided for keeping track the number of times a particular variable is integrated (referred to as integration sub-cycle count) and this information is also stored on the drum. Average flow over the period covered by the integration can thus be computed by dividing the totalized flow by the number of integration operations used to make up the integration total. The drum also contains information on the total number of possible integration operations in a given base period (referred to as integration sub-cycle constant), such as an hour, so that average flow information can be converted into total flow information by multiplying average flow by the ratio of the latter number to the integration sub-cycle count.

For reasons to be briefly outlined as the specification proceeds, practically all numerical data stored on the drum is preferably in a weighted binary code.

Other features, objects and advantages of the present invention relate to the relationship and details of the various components making up the system, and can be obtained in the more detailed description of the invention to follow.

Figure 16:
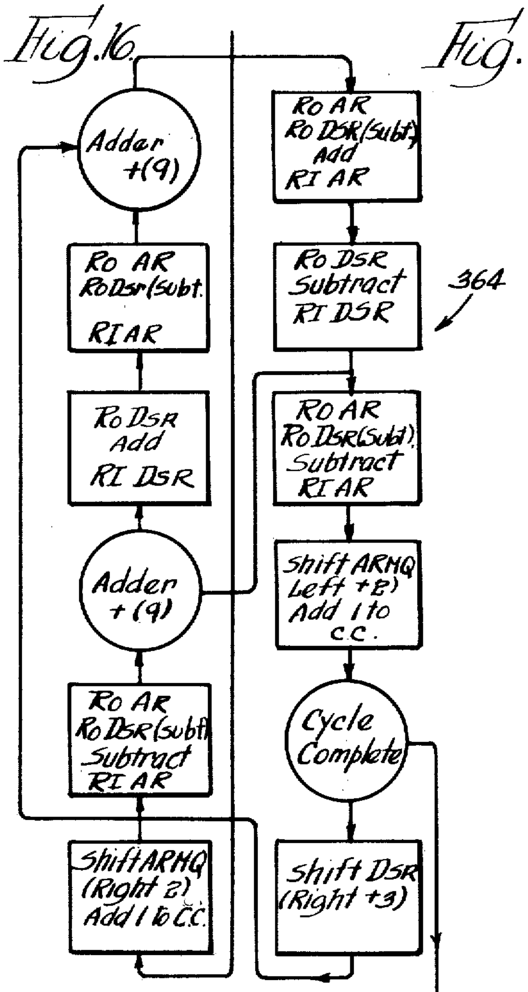
Figure 18:
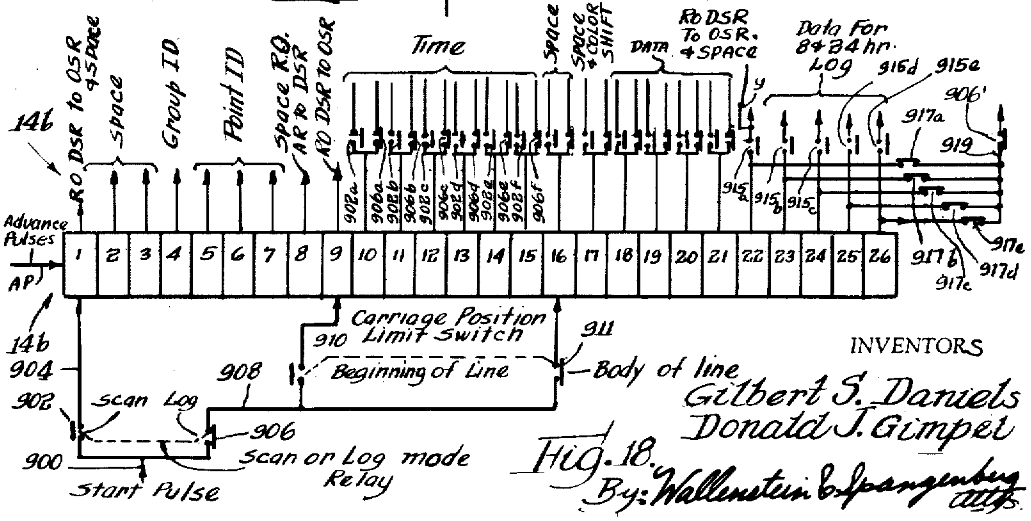
Figure 7A:
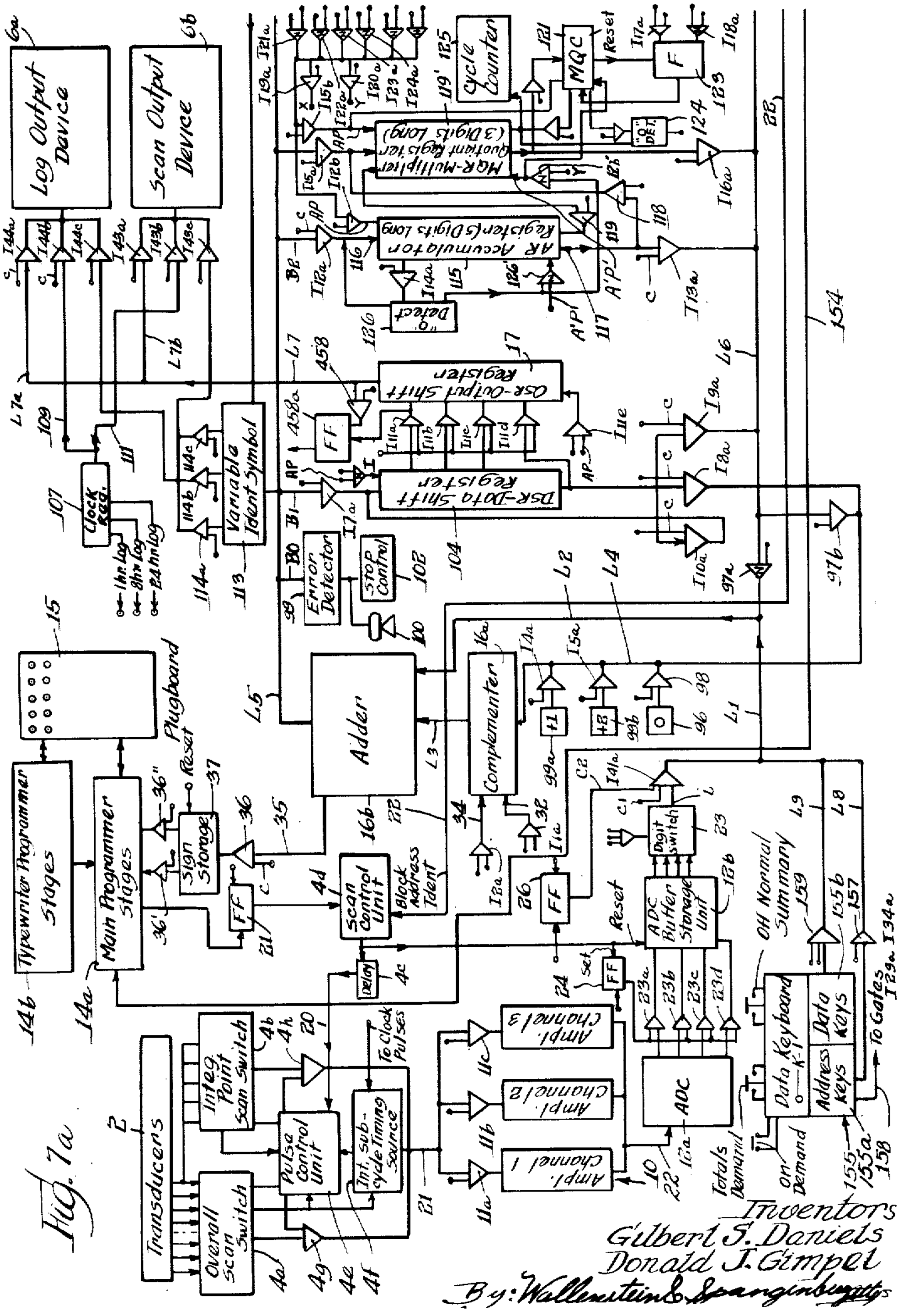
Figure 7B:
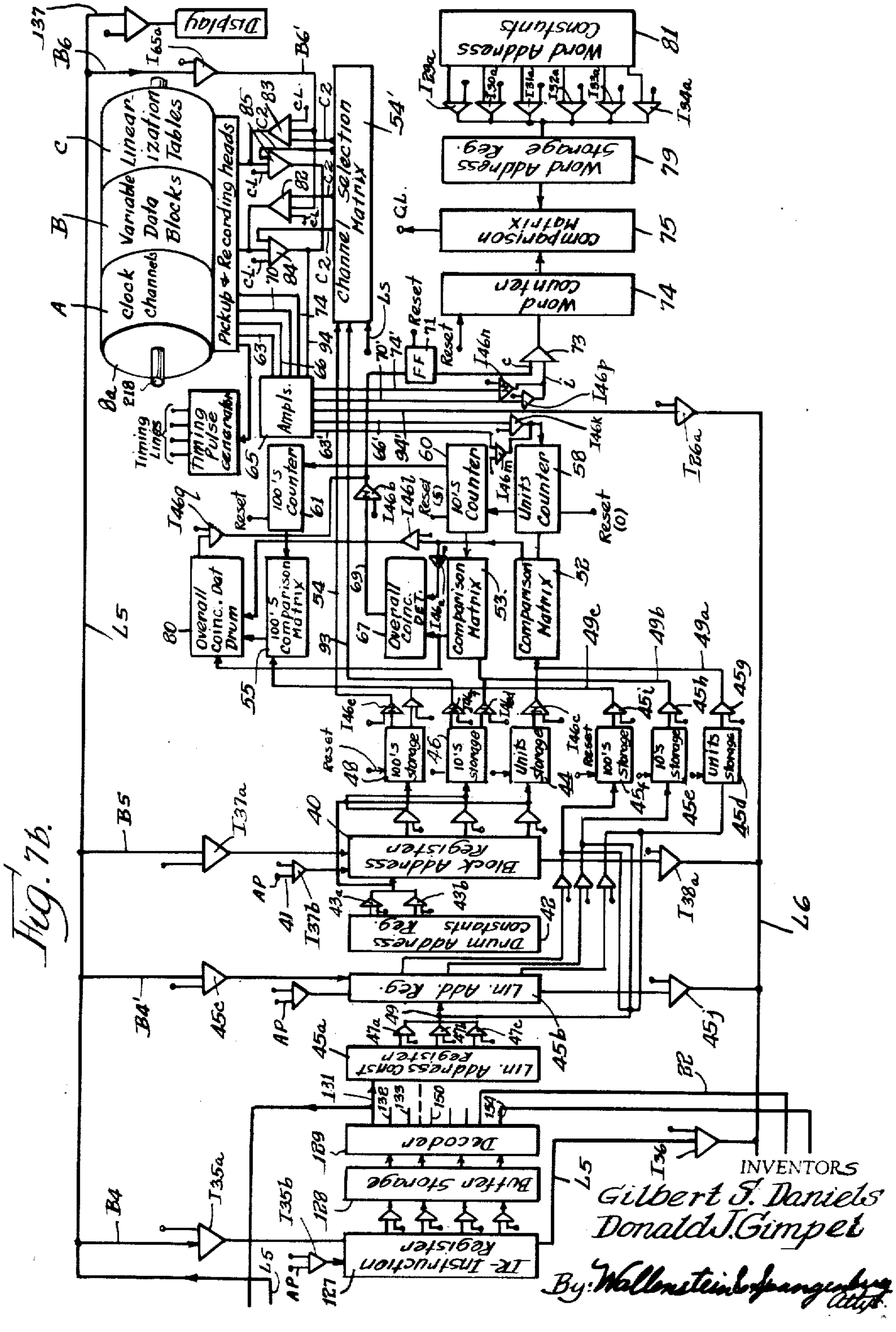
Figure 7C:
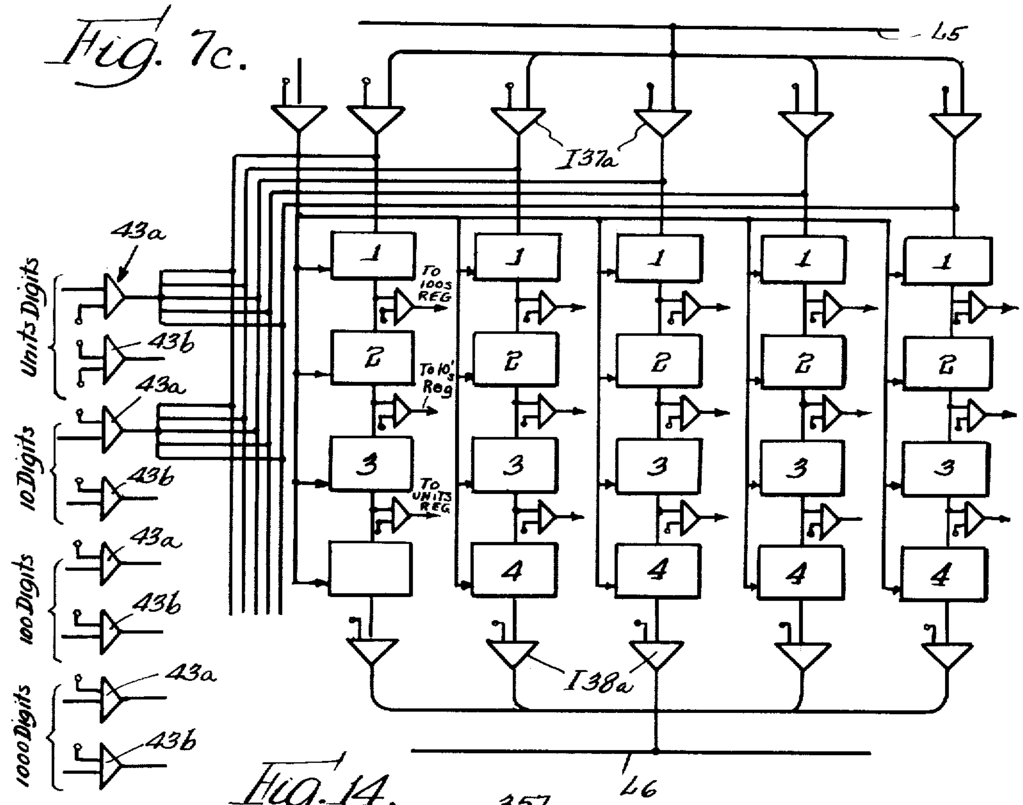
Figure 14:
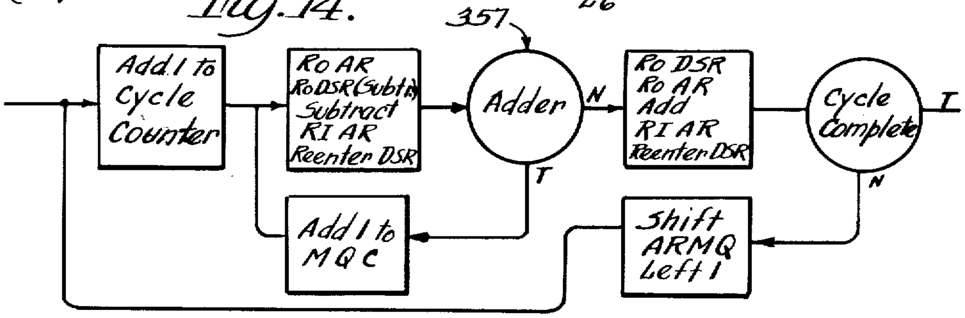
Figure 15:
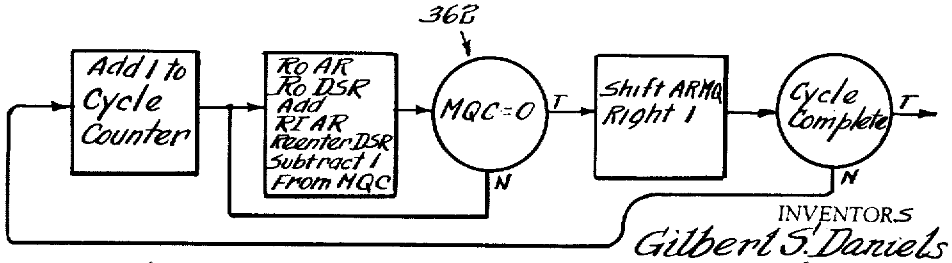
Figure 17:
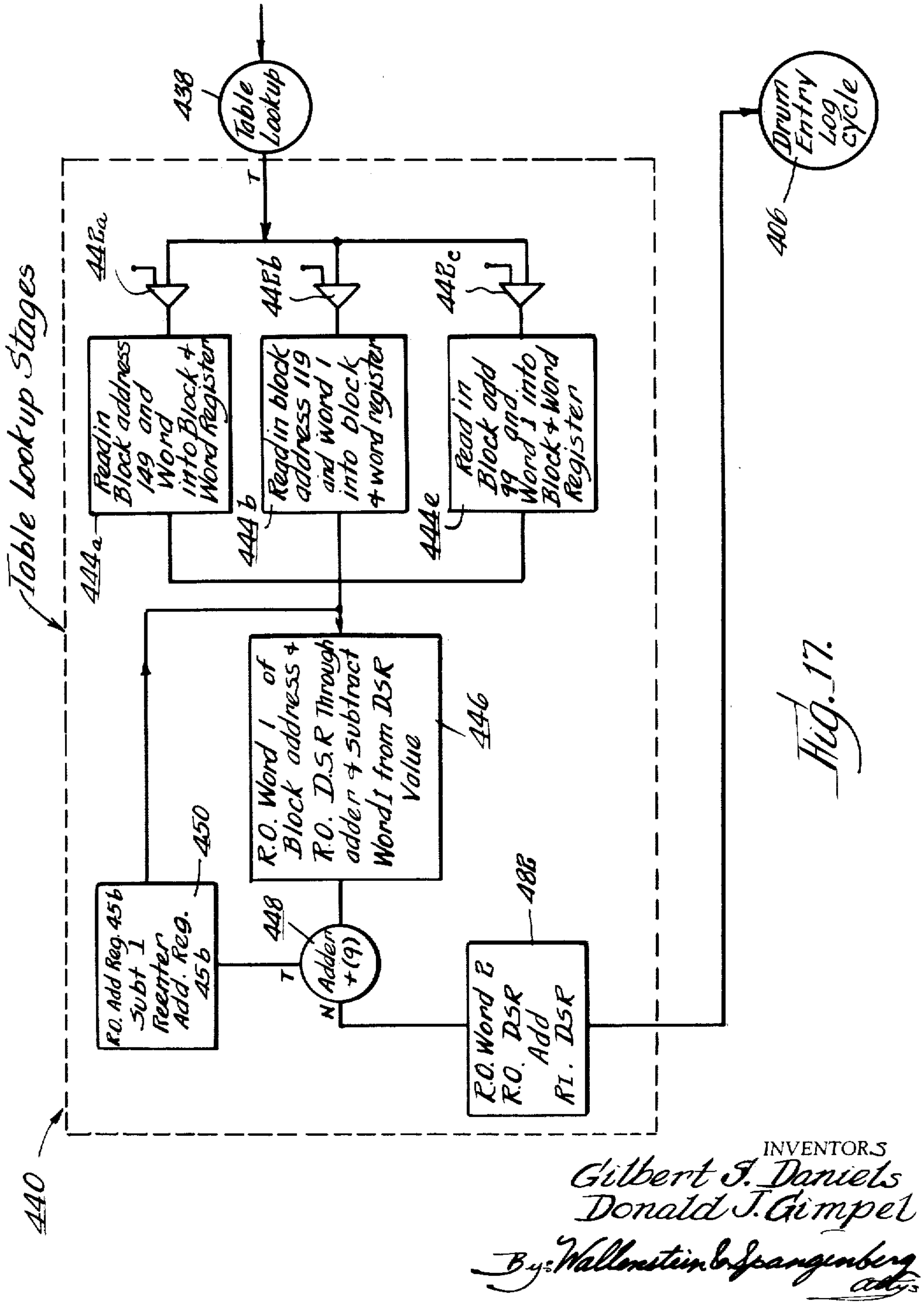

FIGS. 7*a* and 7*b* show a detailed box diagram of the variable monitoring and recording system of the invention;

FIG. 7*c* is a more detailed box diagram of the address register 40;

FIG. 8 is a chart illustrating the manner in which the various registers are utilized in the various arithmetic operations to be performed;

FIG. 9 is a simplified schematic indicating various types of control stages found in programmer **14*a***;

FIGS. 10*a*, 10*b*, 10*c*, 10*d*, 10*e* and 10*f* represent together a rather detailed box diagram of the programmer which controls the operation of the apparatus of FIGS. 7*a* and 7*b*;

FIG. 11 is a diagram illustrating the manner in which FIGS. 10*a*, 10*b*, 10*c*, 10*d*, 10*e* and 10*f* may be located to form one single continuous connected box diagram;

FIG. 12 is a list of programming instructions which the programmer **14*a*** in FIGS. 10*a*–10*f* must carry out in the control of the various gates in FIGS. 7*a* and 7*b*;

FIG. 13 is a chart illustrating the various types of conditional transfer conditions which determine the instructions given by the programmer **14*a***;

FIG. 14 is a box diagram illustrating a division operation with the data storage register and accumulator register containing the numerical information illustrated by the chart of FIG. 8;

FIG. 15 is a box diagram illustrating a multiplication operation with the DSR and AR registers containing the numerical information illustrated by the chart of FIG. 8;

FIG. 16 is a box diagram illustrating a square rooting operation with the DSR and AR registers containing the numerical information illustrated by the chart of FIG. 8;

FIG. 17 is a box diagram illustrating the table look up subroutine stages forming part of the programmer section of FIG. 11; and FIG. 18 is a box diagram of the typewriter shift register programmer **14*b***.

Figure 1:
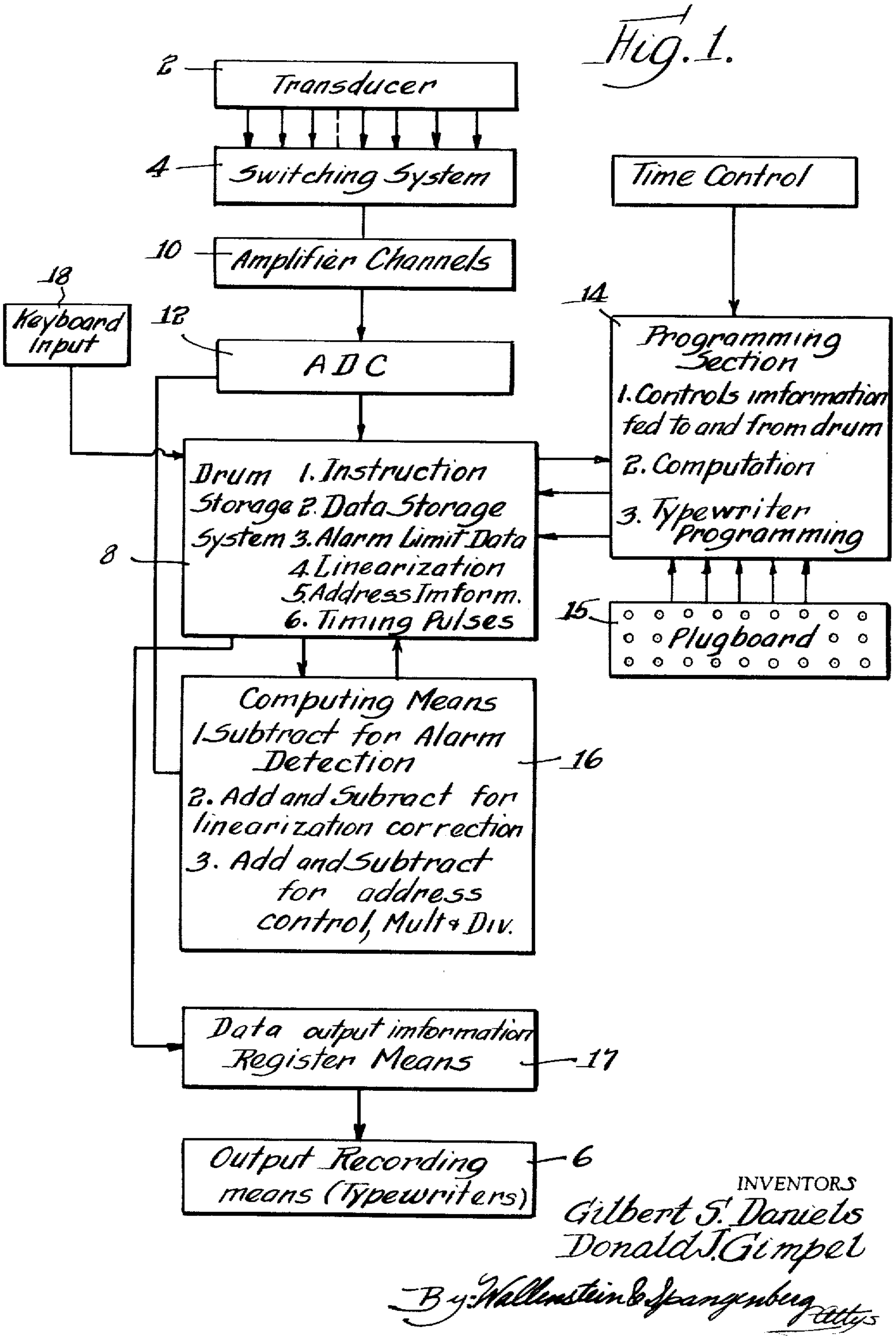
FIG. 1 is a simplified box diagram of the variable monitoring and recording system of the invention.

Referring now more particularly to the simplified box diagram of FIG. 1, which illustrates the basic components of the system making up the present invention together with their functions. The box generally indicated by the reference numeral 2 represents the individual transducers which are the primary variable-responsive devices which provide voltage outputs whose magnitudes are respectively proportional or are some function of the values of the variables with which they are associated. In the case of temperature variables, the transducers may be iron-constantan or chromel-alumel type thermocouples, or in the case of pressure or flow variables they may be bellows-operated potentiometers. In the case of thermocouples, they are usually non-linear devices, that is the amplitude variation of the voltage output is related in a non-linear manner to temperature input thereto. Although various well-known means may be provided for linearizing the outputs of the thermocouples, the present invention provides more accurate linearization means of a different character than heretofore utilized, and which means will be described in more detail hereinafter.

A single data handling system is preferably sequentially connected to the transducers by means of a switching system of any suitable type, the data handling system providing means for alarm detection, linearization, data storage and computation. Output recording means 6 is provided consisting preferably of one or more electric typewriters which at appropriate intervals, such as hourly, prints-out numerical data representing the actual values of the log points. Between such regular recording intervals, the system prints-out the values of new abnormal variables and also preferably of variables which have just returned to normal almost immediately as they are scanned.

In accordance with the invention, the data handling means connected between the transducers and the output recording device includes a magnetic storage means 8, most preferably including a magetic storage drum on which various kinds of information are arranged in a manner which facilitates the speed, accuracy, reliability and simplicity of the system as a whole. Among the various kinds of information on the drum is information on the values of the variables scanned derived from the outputs of the scanned transducers. This information is recorded on the drum surface in the form of multi-bit groups of binary coded information, each group representing one decimal digit, for example, of a four-digit number, representing the value of the variable involved. Accordingly, the output of the switching system 4 is connected through a multi-channel amplifier section 10 to an analog to digital converter 12 which preferably provides four groups of outputs representing a four-digit number. To utilize the converter 12 with transducers having different input-output characteristics, the transducer outputs are fed to a selected amplifier channel which in effect inserts a scale factor correction so that all signals fed to the converter have an amplitude proportional to the values they represent related to a common base or scale factor. The channel selected is controlled preferably by instructions stored on the drum.

The binary decimal coded information provided by the analog to digital converter 12 is stored in appropriate locations on the drum set aside for the variable involved. The drum is provided with a data storage section for information scanned every scanning cycle, the switching system 4 being continuously operative to repeatedly scan the transducer outputs. Additionally, locations are provided on the drum for storing information on the variables scanned during the drum entry log cycles, such as hourly, which data is readout to the output recording device where hourly information on log points is printed.

One of the operations performed practically every scanning cycle, is the detection of abnormal variables. The magnetic storage drum preferably includes within each of the areas set aside for the various variables involved binary decimal coded information on one of the alarm limits of the variables, for example, the lower alarm limits thereof and also preferably binary decimal coded information representing a number which is the difference between the upper and lower alarm limits of the variables. Also, in each area of the drum set aside for a particular variable, so called instruction information is provided in binary decimal coded form which instruction information indicates the kind of variable involved, such as pressure, temperature, flow, etc. and the kinds of programming operations required for such variables. The instructions, for example, indicate whether the variable is to be totalized, that is added to a number representing the previous total or data on the variable, whether it is to be added to a data value of another but related variable (referred to as cross totalizing), whether totals of the variable over various, such as 8 and 24 hour periods are desired for the variable involved, and whether the variable is a scan point and/or a log point. As previously explained, this instruction information is utilized as an aid in programming the various components making up the system.

The drum also contains address information which is read out from the drum and utilized to control the sections of the drum from which information is obtained. Furthermore, the drum contains a number of linearization tables in binary decimal coded form, each table comprising a progressively increasing series of numbers representing values of different points on the non-linear output-input curve of one type of transducer together with adjacent numbers representing amounts to be added to the apparent value of the variable measured by the system to correct for non-linearization of the transducers. For each different type of non-linear transducer, a different table section is provided. The points on the curves preferably represent the limits of different segments on the curve over which the linearization correction values are, for practical purposes, constant for a given degree of accuracy desired. Thus, for example, for a variation in apparent variable value from 300 to 500, the correction factor may be 5 units added to the apparent value whereas the correction factor for a range from 500 to 700 may be 6 units.

The primary control over the operation of the system is programmer 14. The programming section in conjunction with the instructions stored in the drum control the sequence and paths of information flow in the system. For example, the programmer controls the feeding of information to computer means 16 which performs simple addition and subtraction operations. The programmer in cooperation with the computing means also performs multiplication, subtraction, division and square rooting operations. The programmer is made up of non-conditional and conditional transfer stages which are interconnected by means of a plugboard 15 having terminals which can be interconnected by jumper leads or printed circuit panels removably insertable upon the plugboard terminals.

During alarm detection, the computing means preferably subtracts one of the alarm limits stored in the drum from the unlinearized data value and, from the sign of the difference, it can determine whether the variable has exceeded the alarm limit. A value stored in the drum representing the difference between the upper and lower alarm limits is then subtracted from the numerical result of the above-mentioned subtraction operation to determine whether the other alarm limit has been exceeded, this determination being made from a simple detection of the sign of the second subtraction operation.

Linearization is preferably effected for data to be printed out only, which, as above outlined occurs for most variables regularly, such as hourly, and each time a new abnormal or return to normal variable is scanned or during off-normal printout. In the linearization operation, the unlinearized measured value of the variable to be linearized is sequentially compared with the various above-mentioned reference points of the characteristic curve of the transducer involved stored in numerical form in the section of the drum set aside for the particular transducer involved. If the comparison indicates that the variable value falls above the first reference point, then the next highest reference point is compared to the measured value and this process repeats until a reference point is found which is above the measured value. The proper correction segment is then determined and the proper correction number stored on the drum adjacent to the last-mentioned reference point can be added to or substracted from the measured value to obtain the linearized value.

When the time comes for printout of a particular variable, this information is transferred from the drum to one or more output data register means, one variable at a time, and then to the output recording device 6. Since buffer storage is provided for information to be printed out, the variables may be continuously scanned during such printout so that alarm detection is continuously carried on during a printout operation. When an abnormal variable is detected, the variable data is linearized if necessary and immediate readout of this information to the output recording devices is effected. In the case where a single output data register is provided, the printout of other information is temporarily halted so that abnormal readout can take place. However, separate output registers and output recording typewriters are preferred so that both log point and alarm point printout can be carried on simultaneously.

In order to avoid repeated printout of data on a variable which remains abnormal, data on the condition of the variables when previously scanned are stored in the drum and this information is compared with currently scanned data so that only data on variables which have just become abnormal or have just returned to normal will be printed out.

If the kinds or sequence of the variables are to be varied, connections of the plugboard terminals can readily be varied and by means of a keyboard input device 18, new information can be quickly inserted on the drum. The keyboard 18 also may include pushbutton for on-demand off-normal and totals demand printout.

The invention contains numerous additional features which will be described in more detail hereafter. The broad over-all system just described provides for substantially continuous alarm detection even during printout of data information, and it provides a magnetic drum storage of various kinds of information which may be readily varied to suit varying customer demands, without requiring any substantial customizing of equipment. Furthermore, the type of information stored in the drum and the placement thereof on the drum to be described, result in minimum system complexity and maximum accuracy and reliability.

DRUM FORMAT

Figure 2:
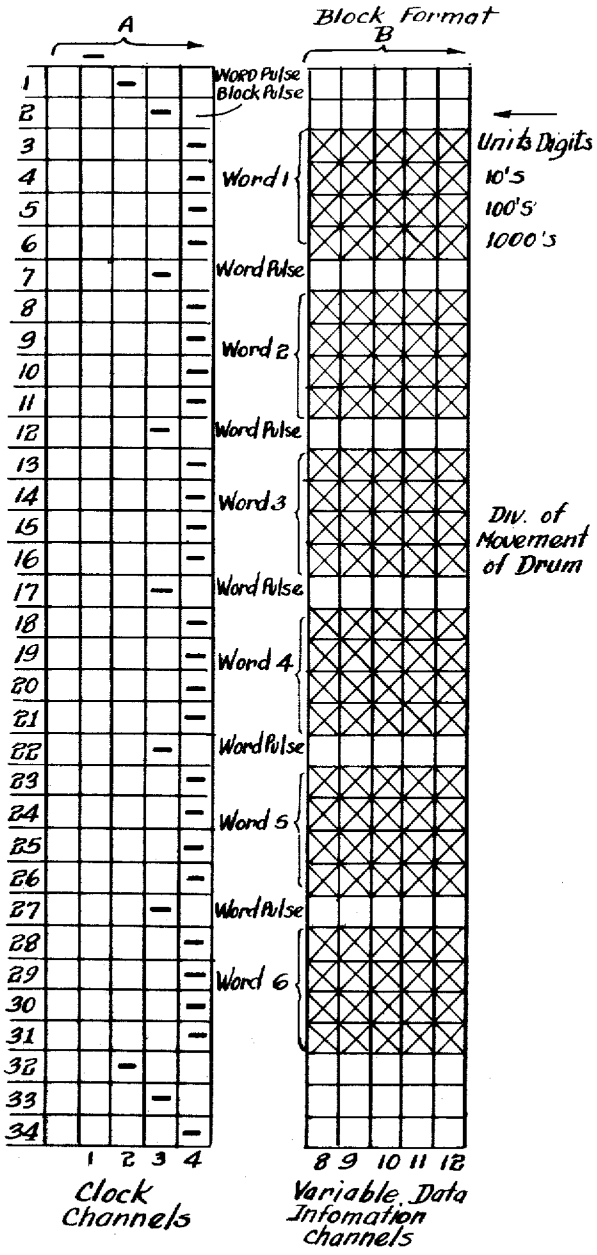
FIG. 2 shows the format of a word block in the data section B of the drum.

The primary storage component of the system is a magnetic drum storage unit *8a* (FIG. 7*b*), preferably in the form of a rotatably mounted cylindrical drum having on its outer surface, as is conventional on such drums, a magnetizable layer upon which digital information may be stored. The present invention uniquely applies the drum to the field of variable monitoring and recording. The drum is divided into a number of axially spaced information sections, each section having at least four contiguous magnetic tracks extending around the drum forming an information section, each track containing binary coded information identified, for example, by means of a positive or negative magnetization. Corresponding circumferential positions of the four contiguous tracks contain a binary code group which may be read out from the drum simultaneously by axially aligned pick-up heads. Each group of information stored in corresponding circumferential positions in the four tracks of each information section represent a number from 0 to 9. Four such code groups in succession on the drum form a word element representing a four-digit decimal number, as shown in FIG. 2. The first number in each word element to pass a group of pick-up heads represents the units digit, the second number in each word element passing by the pick-up heads represents the tens digit, the third such number represents the hundreds digit and the fourth such number represents the thousands digit. Each word element may represent the value of a variable, a programming instruction, variable identification or address information.

A track No. 4 (FIG. 2) is provided with pulses opposite each code element of each word. These pulses are also used to generate timing pulses to control the opening of gate circuits throughout the system. Suitable pulse dividers and counters can be utilized to obtain any one of the four-word element pulses associated with each word. For purposes of locating each word element, a clock pulse in drum track No. 3 (FIG. 2) is positioned on the drum opposite each circumferential position on the drum preceding the beginning of each word element. Another clock pulse track No. 2 is provided in which is recorded a clock pulse preceding the beginning of a given number of word elements forming a basic word group, to be often referred to as a data block. Thus, provision is made for locating a particular word block and a particular word in each word block. A track No. 1 contains a single reference pulse ahead of the block pulse for block No. 1.

Data on a particular variable are grouped together within a particular block, which in the example to be illustrated comprises six words per block, although more or less could be utilized depending on circumstances.

Figure 3:
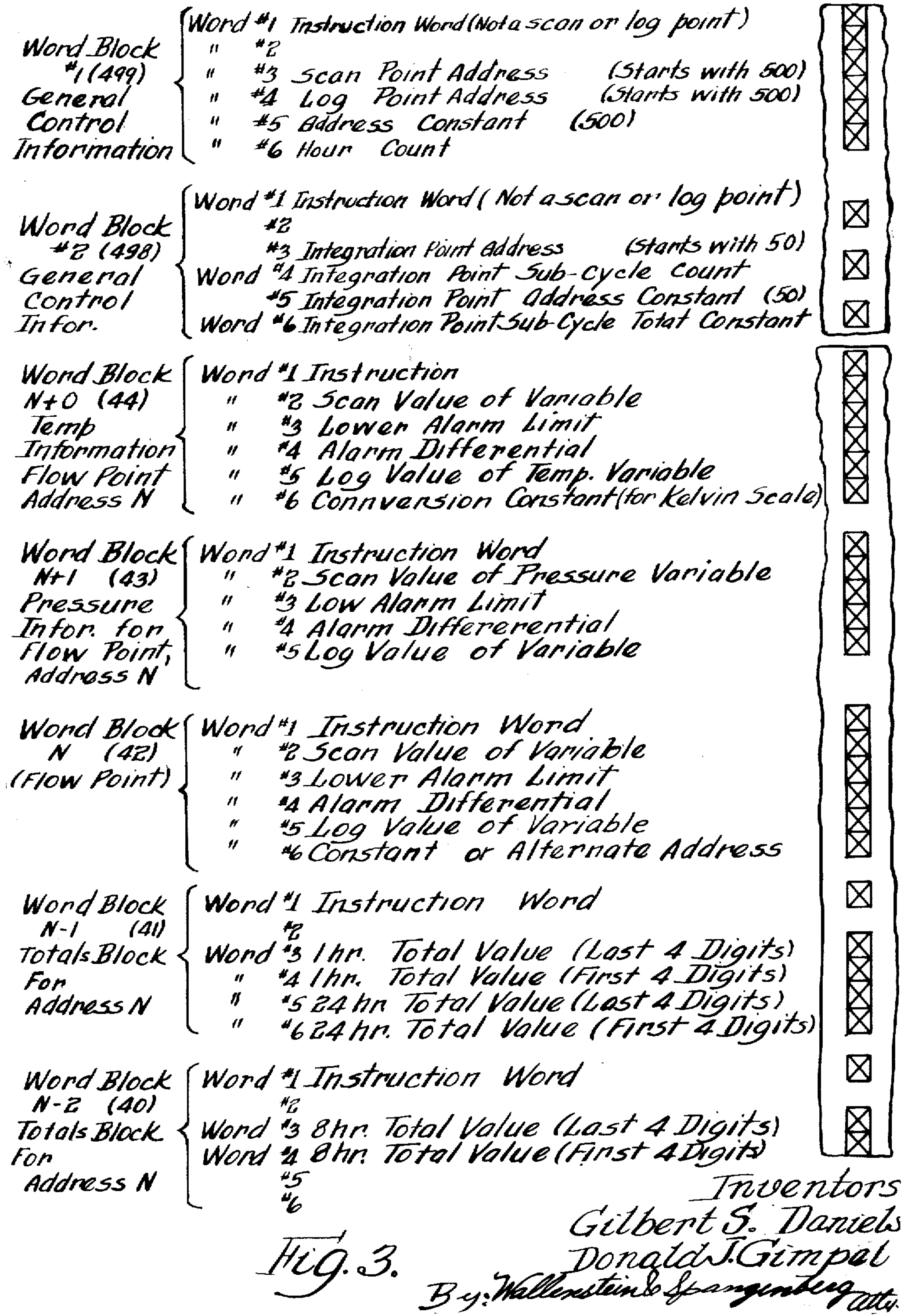
FIG. 3 shows the types of information stored in a number of word blocks in section B of the drum.
Figure 4:
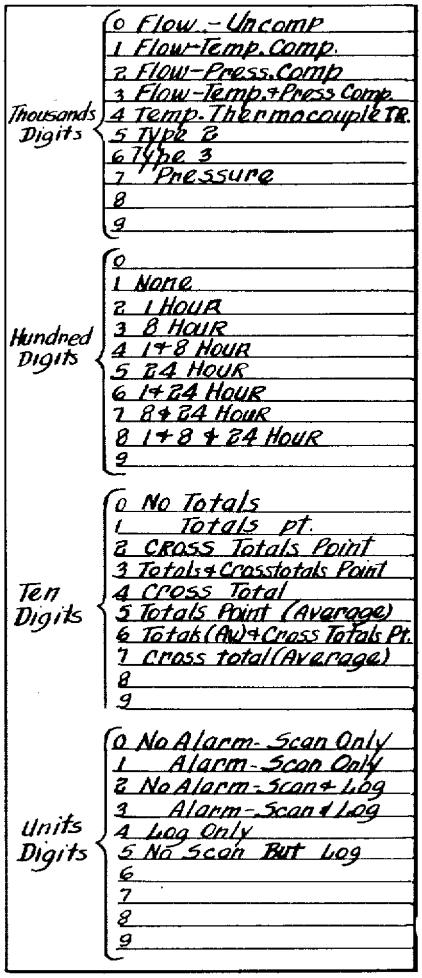
FIG. 4 is a chart illustrating the instruction code.

Refer now to a typical word block No. 455 (block address 44) in FIG. 3. Word No. 1 is a four-digit number representing information referred to as instruction information which identifies the type of variable involved and the types of operations to be performed with the data on such variable and also provides information on the abnormal and normal condition of the variable. FIG. 4 summarizes the kinds of information provided by the various digits of the instruction word. As there shown the units digit of the instruction word identifies whether the information contained within the block is that of a scan point that is a transducer point, to be scanned by the switching system 4, whether the variable point is one which is to be a log point printed out during a drum entry log cycle, or, if the information in the block does not represent information which is scanned, is it nevertheless to be logged during the regular logging cycles such as totals information.

The tens digit of the instruction word indicates whether the data in the block represents data for a variable which is to be totalized or integrated, and whether the point involved is a cross total point, that is a point whose data is to be totaled with data on other points. The hundreds digit of the word indicates the various periods over which totals are to be obtained, such as 1, 8 or 24-hour periods.

The thousands digit of the word gives other types of information, such as, in the case of a flow variable, whether the information is to be temperature or pressure compensated. By flow is meant information on the average rate of flow of the variable at any instant. Usually, the flow rate is measured by the drop in pressure across an orifice through which the fluid flows. Flow rate is proportional to the square root of the pressure drop across the orifice. As previously indicated in some cases, temperature and pressure of the fluid stream varies sufficiently to substantially affect the accuracy of the flow rate measurements. In such case, it is usually desirable to include pressure and temperature compensation factors in computation of flow rate. This explains the importance of the instruction information relating to temperature and pressure compensation since if pressure and temperature compensation is needed, the system must be programmed for such pressure and temperature compensation. In such case, the scanning switch system preferably sequentially scans information first on temperature and gauge pressure and then on pressure differential, the temperature and pressure information being stored in successive blocks of the drum preferably ahead of the block to contain the average flow rate information. Information on pressure differential is not actually stored on the drum, as such, but the square root of this information is first obtained to determine flow rate whereupon this information is stored upon the drum, the square rooting operation including temperature and pressure compensation factors where this is desired. The thousands digit also indicates whether the data in the word block is to be linearized and which linearization table is to be used.

Word No. 2 of each word block is the value of the variable scanned during the current scanning cycle. Each scanning cycle, this word value is changed to the current scanned value of the variable. Word No. 3 is the lower alarm limit of the particular variable and word No. 4 is the alarm differential value (i.e. difference between the upper and lower alarm limits of the variable) for purposes of high alarm detection. Alarm detection is obtained by subtracting the value of the variable at the point involved from the lower alarm limit, an abnormal variable condition being indicated if the subtraction results in a positive number. Then the alarm differential number is subtracted from the result of the first subtraction or vice-versa, the sign of this result indicating the variable condition. Word No. 5 is the value of the variable scanned during the regular such as hourly, scanning cycle which data is to be printed out on the electric typewriter or other recording device. The space for word No. 6 is more often than not unused and when used may contain conversion constants to be added to other data for computation purposes. One good example of this is the constant necessary to convert a (Fahrenheit) temperature measurement to a Kelvin measurement, the latter usually being necessary where temperature is a factor in a formula such as the above-mentioned average flow rate computation. Word No. 6 may also be a number representing the address of another block containing cross totals data to which the data in the block is to be added. This may be necessary, for example, when cross totals are obtained of data on different points. Totalized information, as will be seen hereafter, occupy positions in separate word blocks set aside therefor and these word blocks have instruction words giving information that the block contains information to be handled like log points (i.e. they are to be printed out). These total blocks are not treated like total points which are points to be totalized. Total blocks, to the contrary, contain the totalized information but are not considered like points to be totalized. A word block containing cross totals is identified by its instruction as a log point and a cross totals, not a cross totals point.

As above mentioned, the drum contains a clock pulse channel having a single recorded magnetic indication thereon defining a reference or start position on the drum. The first block is located just following this reference point and it passes by the pick-up heads associated with the drum ahead of the others starting with the time when the pulse of track No. 1 passes the pick-up heads. For reasons to be explained, the blocks are actually identified with block addresses which are inversely related to their block order. For example, the first block may be given block address 499, the second block may be given address 498 and so on. In the section of the drum now being described, all of the blocks have the format just described except the first and second blocks which contain, for the most part, address control information. For example, referring again to FIG. 3, the first block contains in word position 3 a number representing the block address of the variable point last scanned. When this number is read out from the drum, one is subtracted therefrom so that the next word block can be reached. When all variables have been scanned, the number derived from the scan address word changes from a positive to a negative number, and this indicates that a scanning cycle has been completed.

Word No. 1 in blocks No. 1 and No. 2 block address 499 and 498, respectively, contain an instruction word indicating that neither a log point or a scan point is involved.

Word No. 4 in block No. 1 is a number representing the log address word which, during a printout program, identifies the last point or word block considered for printout purposes. Initially the log and scan numbers represent the total number of word blocks in the data section of the drum. When the log address is reduced by one and a negative number results (number less than zero) then this indicates that all word blocks have been handled for printout purposes.

Word No. 5 of block No. 1 represents the log and scan address constant, which, where 500 word blocks are involved, is the number 500 which is transferred into the scan and log address words upon completion of a printout or scanning cycle.

Word 6 is a number representing the number of regular, such as hourly, drum entry log cycles since the beginning of the last twenty-four or other main base period.

Word No. 3 of block No. 2 represents a number identifying the integration point currently being scanned. By integration point is meant a point which, like a point representing an instantaneous rate of flow, needs to be integrated at regular intervals, such as every ten seconds. In order to ensure the scanning of these variables every ten seconds, it is often necessary to interrupt the scanning of other variables. Initially, word No. 3 is a number representing the block address containing data information on the first integration point to be scanned. The integration points are preferably scanned in succession and the word blocks on the drum containing data thereon are arranged in corresponding succession on the drum, preferably occupying the last word blocks in the data section of the drum. The integration point address number is likewise reduced by one upon completion of each programming cycle for a particular point and when this number changes to a negative number this is an indication of completion of scanning of the integration points.

Word No. 5 of block 2 is a constant such as 50, represening the first block address associated with the integration points and this number is transferred to the integration point address word No. 3 following completion of the scanning of all integration points, referred to as in integration subcycle.

Word No. 4 in block No. 2 is a number representing the number of integration subcycles (integration point subcycle count) occurring since the last reference or start time, such as the last hour, and thus increases by one each integration subcycle. This information is utilized to obtain information on average flow rate since the ratio of the number representing the integration of flow rates over a given period divided by the integration subcycle count is proportional to the average rate of flow over such period.

Word No. 6 of block No. 2 is a number (referred to as the integration point subcycle totals count) representing the total number of possible integration subcycles within a base period, such as an hour. From word No. 6 and word No. 4 data on average flow over any period less than an hour can be readily converted to a number representing total flow for the period.

The clock pulse channels occupy a section of drum 8*a* (FIG. 7*b*) referred to as section A. The variable data tracks just described fall in a contiguous axial drum section B which may actually comprise a number of axially spaced, five-track sections to accommodate space for a large number of variables. If the diameter of the drum can accommodate 50 six-word blocks, then ten such five-track sections are required to accommodate 500 word blocks.

The linearization tables are found in a third axial section C of the drum 8*a*. However, before describing section C of the drum, reference should be made to FIG. 6 which shows a straight line curve C1 whose ordinate and abscissa, respectively, represent the apparent variable value of the variable being measured and the associated transducer output in volts. Curve C1, therefore, represents the theoretical transducer output to input curve assuming a linear transducer. Curve C2 represents the actual input to output characteristic of the non-linear transducer involved. For the segment of curve C1 between points $Xn-1$ and $Xn$, the variable value $yn-1$ should be added to the ordinate of curve C1 for a given degree of accuracy. For the curve segment between points $Xn$ and $Xn+1$, the correction value is $Yn$. Likewise, for the segment from points $Xn+1$ to $Xn+2$ the correction factor is the value $Yn+1$.

Figure 5:
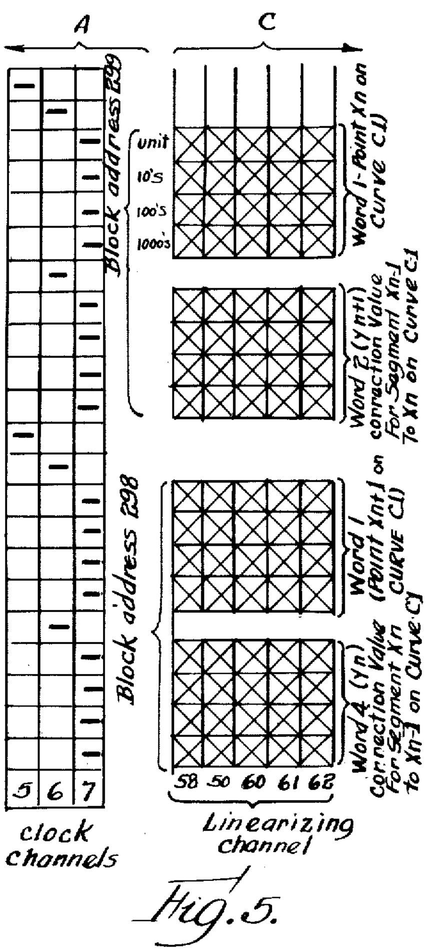
FIG. 5 is a diagrammatic representation showing the types of information stored in the two-word blocks in the linearization section C of the drum.

Refer now to FIG. 5 showing an exemplary format for a five-track axial area of the linearization section C of the drum, it being understood that there may be one or more other such axial areas on the drum. Also shown in FIG. 5 are clock channel tracks in section A of the drum which are used in locating various word blocks in section C of the drum.

Section C of the drum contains in tracks numbers 58 through 62 binary decimal coded word blocks of two words each, the first word in each group representing the ordinate or variable value of one of the points above mentioned on the curve C1 representing the limits of the various above-mentioned segments. The second word in each block represents the correction factor for the segment of which the point of word 1 is the upper limit. Word No. 1 of succeeding blocks represent successive segment limit points on the curve C1. Linearization is effected by successively feeding word No. 1 of the various groups in order to a data register to be referred to hereinafter in the description of Figs. 7*a* and 7*b* and this number is subtracted from the apparent data value measured or detected by the analog to digital converter 12, previously referred to in the description of FIG. 1. When the subtraction indicates a negative number, word 2 of the block involved will give the correction factor to be added to apparent data value. Thus, the system effectively hunts for the proper segment of the curve C1 by the above-mentioned subtraction process and when this segment is found, the proper correction information is located on the drum surface in word 2 following the last read out word 1.

A reasonable value for the longitudinal recording density on the drum is 100 bits per inch. This insures that if the heads are mounted 1 mil off the drum surface that the flux density 10 mils off will be small resulting in small interference in the same track. From the point of view of head mounting, a lateral density of 10 tracks per inch is both reasonable and practical. It is expected that the system will operate asynchronously with timing from the drum; therefore, it is expected that there will be a great latitude in timing which, in turn, will allow an induction motor drum drive. Assume a drum speed of 3450 r.p.m. a value consistent with an induction motor with a 3600 r.p.m. zero slip speed.

The channel length per six-word block is 31 bits or equivalently, $31\times5=155$ bits per block for five channels. If 50 six-word data blocks are stored on a set of five recording channels hereafter referred to as a data channel, then the number of bits around the periphery is exactly $50\times31=1550$ which results in a drum diameter of 4.94" on the basis of a 100 bit/inch density. The drum length required for a capacity of 500 information blocks is about 5.3 inches or correspondingly 53 heads. The clock frequency as derived from the third clock track would be $57.5\times1550=89.125$ kc. corresponding to an 11.2 microsecond period. The average access time, excluding channel switching, would be 8.7 milliseconds with a maximum of 17.4 milliseconds.

TABLE 1—SUMMARY OF DRUM REQUIREMENTS

| | | |
|---|---|---|
| (1) Physical dimensions | | |
| Diameter | inches | 4.94 |
| Length/500 six-word blocks | do | 5.30 |
| (2) Recording density and speed | | |
| Lateral | channels/inch | 10 |
| Longitudinal | bits/inch | 100 |
| Surface speed | in./sec. | 891.25 |
| (3) Clock channels | | 8 or 5 |
| (4) Format | | |
| blocks/information channel (six word blocks or about 150 two word blocks) | | 50 |
| words/block | | 6 and 2 |
| digits/word | | 4 |
| bits/digit | | 5 |
| bits/block/recording channel | | 31 |
| bits/channel | | 1,550 |
| (5) Timing | | |
| Drum speed | r.p.m. | 3,450 |
| | r.p.s. | 57.5 |
| Clock frequency | kc. | 89.125 |
| Clock period | μ seconds | 11.2 |
| Access time | milliseconds max. | 17.4 |
| | milliseconds ave. | 8.7 |

DETAILED BASIC BOX DIAGRAM

Refer now to FIGS. 7*a* and 7*b*, which taken together represent substantially a relatively detailed box diagram of the entire system of the invention. The switching system 4 to which the transducers 2 are coupled is, in FIG. 7*a*, designed for use with a scanning program wherein a number of the variables to be integrated or totalized are regularly scanned, for example every ten seconds. To accomplish this, the scanning of other variables must be periodically interrupted to return to the integration variables so that no interruption occurs in the regular scanning of the latter variables. The integration variable data may, for example, be obtained by the repeated totalization or integration of data representing instantaneous rates of flow of a fluid or gas passing through a particular part of the system being monitored to obtain quantity of flow information. In the interest of accuracy and reliability, all component flow rates over a given period should be regularly obtained. To this end, the scanning switch system comprises a scanning switch section **4*a*, which may be any one of a number of well-known types of scanning switches, such as a telephone-type scanning switch, which utilizes a solenoid which when pulsed once advances a wiper one contact position. All variables, including integration variables are connected to switch 4*a* in the same order as the placement of the drum block addresses containing the values of the variables in question. The integration variables are also connected to the input of a similar scanning switch 4*b* also in the same order as the placement of the drum block addresses containing the values of the variables in question. The pulses for advancing the stepping switch sections are preferably a source of pulses available on a line 20 fed through a suitable delay unit 4*c* from a scan control unit 4*d*. The scan control unit 4*d* is fed from signals derived respectively from the instruction word of the drum block from which information is then being received and the programmer 14*a*. Whenever a new program cycle begins, a flip-flop or bi-stable unit 21 is set, whereupon it prepares the scan control unit 4*d* for operation when it receives a signal on line 22 that the instruction word of the new drum block address indicates that the drum block address is to contain the value of a variable to be scanned, there is a scan point, rather than other information such as totals information. Then, a pulse is generated by the scan control unit 4*d* which in a general manner to be explained, effects the resetting of an ADC buffer storage unit 12*b* and the transfer thereto from an analogue to digital converter unit (ADC) unit 12*a* of the value of the variable represented by the transducer then being scanned. The delay unit 4*c* is provided to delay the pulse output of the scan control unit 4*d* for a sufficient period to enable transfer of the latter information to the buffer storage unit 12*b*. Then, the pulse from delay unit 4*c* is fed to a pulse control unit 4*e* where the active switch section 4*a* or 4*b* is advanced one position. The next block address containing data on a scan point will initiate the next scan switch advancement. The pulse control unit 4*e* may include gate circuits (not shown) for selectively feeding the pulses either to the switching sections 4*a* or 4*b* and a bi-stable control circuit (such as a flip-flop trigger circuit) which controls the gates to open them at the proper times. This bi-stable control circuit is periodically set from a suitable self-resetting timing source 4*f*, which generates a pulse regularly, such as every ten seconds, to set the above-mentioned bi-stable control circuit to open a gate which feeds the switching pulses from delay unit 4*c* to the integration switch 4*b* whereupon only integration points are scanned which, takes a good deal less than the integration subcycle (ten seconds) period. Upon completion of the scanning of the integration points, the switch 4*b* feeds or generates a pulse which resets the above-mentioned bi-stable circuit to open the gate coupling the switching pulses to the switch section 4*a* where normal scanning of the variables continues from the point of last interruption. It may take a great deal more than ten seconds to complete the scanning of the variables associated with the switch section 4*b*. Then, at the beginning of the next ten second interval, before all the other variables are scanned, the timing source 4*f* feeds a pulse to the pulse control means to trigger the above-mentioned bi-stable control circuit into a condition which terminates the feeding of switching pulses to switch section 4a and again effects the feeding of switching pulses to the integration point switch 4b. Upon completion of the scanning of the integration points, the switching pulses are again fed to the switch section 4a in the manner above explained and the switch section 4a resumes the scanning of the various variables or points associated therewith beginning with the point following the last scanned point until the time again arrives when the integration points are to be scanned. If the scanning switch 4a completes the scanning of the non-integration points before the next regular integration sub-cycle begins, then the scanning switch 4a** begins to rescan the variables.

The outputs of the switch sections 4a and 4b are respectively gated by means of gates 4g and 4h, respectively, which are controlled by the aforementioned bistable control circuit so that the output of the active switch section will be fed to an amplifier input line 21. In the drawings, the symbol

represents an "and" gate, the line *i* intersecting one side of the triangle representing a line on which signals to be transferred appear and input line *c* representing a control line which when a pulse or direct current of proper polarity is applied will result in the transfer of the signal through the gate to output line *o* if the signal appears at that instant. The same symbol with an "N" in the triangle represents a "not" gate which means that the signal on line *i* will pass through the gate except when the aforementioned control voltage appears on line *c*. Where an "and" gate contains two control lines identified as *c*1 and *c*2 (making a total of three input lines), then both control lines must simultaneously receive proper control signals to effect signal transfer.

As indicated by the brief description of the simplified box diagram of FIG. 1, as each variable is scanned, a voltage appears in the output of the switching system 4 whose magnitude is a function of the value of the variable involved. As will be seen, this voltage is converted into a series of coded electrical signals, each signal element in the series representing a digit of a number representing the numerical value of the variable in a manner to be explained. As will be explained in more detail hereinafter, each signal element may comprise a code, preferably a binary decimal code, comprised of a number of information bits representing the digit.

First, the voltage signals on line 21 are fed through one of the amplifier channels 10, the selection of which amplifier channel is controlled by gates 11a, 11b and 11c, etc. which are controlled by the instruction word of the variable being scanned. The transducers 2 may comprise a number of different types of transducers for respectively measuring different types of variables or different ranges of the variables, and, accordingly, the voltage outputs thereof may be different although the numerical values which they represent are the same or vice versa. Therefore, some means for scale factor correction, as this problem may be referred to, is needed. The different amplifier channels have different levels of amplification to provide signals on a common output line 22 whose relative values are proportional to the apparent values of the variables which they represent related to a common base or scale factor. The signals on line 22 may be fed to a conventionl analog to digital converter of a type preferably providing four groups of binary coded information. These bits may represent the 8–4–2–1 binary decimal code wherein the bits from left to right respectively represents the presence or absence of the numbers 8, 4, 2 and 1. The digit involved is determined by the sum of the numbers represented by the bits, which in a binary decimal code are never greater than 9. This is commonly referred to as a straight binary decimal code. Any binary code may be used, however, but preferably one having certain characteristics to be described. The analog to digital converters, for example, may be a shaft-commutator type as disclosed in the I.R.E. (Instrumentation) Transactions, pages 48–54, June 11, 1953, and pages 168–173 and 215–218. It may also be a non-mechanical type as disclosed in the reports of the winter conference of the Instrument Society of America, February 1955, pages 6–9 and FIG. 6.

In the box diagram, the four output lines of the ADC converter 12a represent four groups of five lines each, each group representing the five bits for one of the digits of a four digit number. In most instances, in FIG. 7, a single line represents five such bit lines. These lines extend through "and" gates 23a, 23b, 23c and 23d controlled from a bi-stable or flip-flop circuit 24 which is set into gate opening condition by the above-mentioned pulse output of the scan control unit 4d. Opening of the latter gates transfers the output of the ADC converter 12a to the buffer storage unit 12b so that the data value of the variable scanned is stored while the scanning switch system is advanced one position and the ADC converter acts upon the new transducer signal fed thereto. The buffer storage unit can comprise any suitable well known unit including at least four 5-bit binary code storage sections arranged for parallel read-out. For example, each storage section may be similar to that disclosed in U.S. Patent No. 2,630,562, to E. A. Johnson, granted March 3, 1953.

At the appropriate time, the four outputs of the buffer storage unit are sequentially scanned by a 4-position digit stepping switch 23 which successively feeds the four 5-bit binary decimal coded outputs proceeding from the least significant digit to the most significant digit, to input *i* of a 3-input "and" gate I41a The advancement of digit switch 23 may be controlled by switching pulses derived from the word element clock pulses. (Remember that line *i* actually comprises many lines leading to five separate "and" gates. This shorthand reference appears throughout FIGS. 7*a* and 7*b* to simplify the drawings.) The control line c1 is controlled by drum address control circuits to be described. When the pick-up heads of the magnetic drum reach the position where the data is to be stored, line c1 is pulsed. The gate is not opened, however, unless control line c2 has a proper voltage applied thereto from a flip flop control circuit 26 which is triggered into the proper condition to obtain this result if programmer 14a requests the reading out of conversion matrix 12a. The digit switch 23 doesn't start to operate until the gate I41a opens. Obviously, switch 23 can be a pulse operated switch having an input pulse line controlled by a three-input "and" gate controlled like gate I41a. The outputs of the unit 12b are sequentially fed through the gate I41a, to line L1 and L2 leading to a conventional type adder unit 16b, forming part of the computer section 16 referred to in the description of FIG. 1. This adder may, for example, be similar to that used in the IBM model 650 magnetic drum data-processing machine referred to in the IBM 650 operation manual, Form 22–6060–1, copyrighted 1958 by International Business Machine Co. The adder has a second input line L3 extending from complementer 16a which may be a well-known computing device which effects subtraction by adding the complement of the number to be subtracted. Thus, for example, when it receives a control pulse on a subtract line 34, it provides a binary decimal coded output representing a number which is the result of the subtraction of the number fed thereto from a given base number, such as 9 or 10. Thus, the complement of the number 2 to the base 9 is 7. The same complementing system used in tthe aforesaid IBM 650 machine may be used, if desired. The complementer is not operative, however, when an add line 32 is pulsed. Then the information passes through the complementer unchanged. The complementer receives binary decimal coded information from a line L4.

In the case where the complementer 16a complements the information fed thereto, the output of the adder appearing on line L5 represents the number which is the subtraction of the digit fed thereto on line L3 from the digit fed thereto on line L2. The adder includes a suitable carry loop so that the result of the subtraction of the least significant digits or the addition thereof may increase or decrease the minuend of the next highest significant digit subsequently fed to the adder. The coded information to be added or subtracted, as should be apparent from the previous description, is fed to the complementer and adder, one digit at a time, starting with the least significant digit and proceeding to the most significant digit so that subtraction or addition may be effected in a manner similar to hand addition or subtraction.

In the present system, positive numbers are preferably determined by the most significant digit, the numbers from 0 to 4 representing positive numbers and numbers from 5 to 9 representing negative numbers. One such code is the well known 5–12–34 bi-quinary code used in the IBM model 650 data processing machine. In this code the quinary bit has one binary condition from 0 to 4 and another binary condition from 5 through 9 so that a detector detecting the primary bit of the most significant digit of the numerical information involved will indicate whether the result of a subtraction operation is negative or positive. If the adder is of the type where the binary indication is either the existence or absence of a pulse on the bit line involved, the detection of a positive or negative number can be obtained by detecting the presence or absence of a pulse on the line involved. Of course, the detector must be gated for operation only upon the passage of the fourth digit through the adder. The positive or negative detect line in FIG. 7*a* is a line 35 leading to the primary bit output of the adder in which is inserted an "and" gate 36, which is opened by a signal on its control line *c* when the fourth digit passes through the adder. This signal can obviously be derived by feeding every fourth word pulse generated by the word pulse channel of the drum which is then active in controlling the moment of passage of information through the adder. The appearance of a pulse at the output gate 36 will be assumed to indicate a negative number. The output of gate 36 controls a sign storage unit 37 which may be a bi-stable circuit which is reset as each word pulse is induced in the selected pick-up head of the drum to a positive indicating condition. When a pulse appears at the output of gate 36, the bi-stable 37 is set to a negative indicating position. A control line extends to the main programmer 14a from the sign storage unit 37, the voltage on line 36' being controlled by the condition of the bi-stable 37. The voltage on line 36' feeds a number of conditional transfer stages to be described which control a programming sequence resulting in the opening and closing of certain specified gates shown in FIG. 7*a* and 7*b*.

The output of the adder may be fed to any one of a number of locations, one being the drum, and, before these other locations are discussed, it will be helpful to explain the manner in which information is read into or from certain specific addresses or locations on the drum. Temporary reference to FIG. 7*b* may now be had for an understanding of this part of the system. It should be understood, however, that any suitable well-known type of drum address locating means may be used without departing from the broad aspects of the invention.

A block address register 40 is provided for storing a four-digit binary decimal coded number representing the block address of the section of the drum to which access is desired for read-in or read-out purposes. Register 40 may be any one of a number of well-known types of shift registers, such as the magnetic core shift registers disclosed on pages 15–19 of the April 1956 edition of Automatic Control. There are preferably five shift register channels therein, one for each bit of a five-bit binary decimal code. FIG. 7*c* shows a box diagram of a five-channel shift register. Each channel has four cascaded stages numbered 1 through 4. Binary information fed into the first stage is transferred to the next stage upon the feeding of a suitable advance or transfer pulse to the shift register from an advance line 41 which advance pulses are fed simultaneously to all the stages of the five channels. Following the transfer of the first (units) code group to stage 2 and before receiving the next advance pulse the tens code group is fed into the first stage which is then transferred to stage 2 while the units code is transferred to the third stage as the next advance pulse is received. Three such pulses advance a code from the first to the last stage. The advance pulses temporarily stop when the register is full. For readout from the register a set of four advance pulses will empty the register and upon reception of each such pulse a code group is transferred out from stage 4 to the gates 138a.

When the register is being filled with a new address, the code groups fed to the second, third and fourth stages at the instant the third (last) advance pulse is received is transferred also to units, tens and hundreds storage registers 44, 46 and 48 said latter registers unlike conventional magnetic core registers providing continuous voltage signals. This type of register is sometimes referred to as a non-destructive readout register.

Referring again more particularly to FIG. 7*b*, information for the address register 40 is fed thereto from main input line L5 (which really comprises five separate bit lines) and branch line B5 via gate 137a leading to the input of the address register 40.

Information for the address register 40 may also come from any one of the output gates of a drum block address constants register 42, the gates being numbered 43a and 43b. The register 42 contains block addresses not associated with any particular variable, such as block addresses for storing information in or receiving data from the drum address blocks 1 and 2. The output of register 42 is also read into the units, tens and hundreds buffer storage register 44, 46 and 48. The constants register 42 as well as most of the other registers may, for example, be of the type in said U.S. Patent No. 2,630,562.

For reasons which will become apparent, assuming that the drum is of a size to accommodate 50 six-word blocks around the periphery thereof, as shown in FIG. 2, and that section B of the drum has then such 50 word block sections, the address number representing word block 1 in the first section will be 499, for work block 2—498, for word block 3—497, etc, so that the blocks have addresses inversely related to their position on the drum. The first block in the other various five-track sections to the right of the first section will have block numbers 449, 399, 349, 299, 249, 199, 149, 99 and 49, respectively.

If it is assumed that the linearization tables in section C of the drum occupy one five-channel axial section on the drum, then there will be approximately 150 two-word blocks in this drum section. Blocks in this five-channel section may be represented by address numbers inversely related to their block positions as in drum section B so that the first block will have an address 149.

Information for locating blocks in the linearization section of the drum are not stored in the block address register 40. The various block addresses of the first blocks of the various linearization tables representing the lowest points on the various C1 curves are stored in a register 45a having a number of (five-line) gated outputs equal to the number of different linearization tables stored on the drum. Although only three address outputs are shown, obviously many more may actually be present depending upon the number of types of non-linear transducers being used. The various groups of gates at the outputs of the register 45a are numbered 47a, 47b and 47c, respectively, and the various outputs thereof are connected to a common output represented by common output line 49 which actually represents three groups of five lines, the groups representing the units, tens and hundreds digits of the word block address desired in the linearization section of the drum. In the present exemplary embodiment, no thousands digit is required since all addresses are under one thousand. The common output 49 is connected to a linearization register 45*b* which is similar to address register 40 in that it is comprised of five 4-stage magnetic core shift register channels for storing 4–5 bit binary decimal coded information groups. Provision is also made for reading information into the various stages of the channels of register 45*b* simultaneously (i.e. in parallel) from the common output 49. The address register 45*b* has an output extending through "and" gate 45*j* to line L6. The output of the linearization address constants register is also read into units, tens and hundreds non-destructive readout storage units 45*d*, 45*e* and 45*f*. The latter registers are also fed by the signals being transferred to the various stages of the linearization address register 45*b* from line L5 and gate 45*c* when the third or last advance pulse is fed to register 45*b*.

The output of storage registers 45*d*, 45*e* and 45*f* are fed through "and" gates 45*g*, 45*h* and 45*i* to comparison matrices 52, 53 and 55, respectively.

The units, tens and hundreds outputs of the address register 40, it should be remembered are connected to the inputs of the storage registers 44, 46 and 48. The storage registers, in turn, are connected through "not" gates I46*c*, I46*d* and I46*e* to matrices 52 and 53 and line 54 leading to the input of channel section matrix 91, respectively. When the "not" gates I46*c*, I46*d* and I46*e* are closed, the gates 45*g*, 45*h* and 45*i* are open and vice versa, so that the comparison matrices will only receive block addresses for the drum Section B or the drum Section C at any given time. During the location of a drum address in Section C of the drum the output of registers 44, 46 and 48 are fed to tens, units and hundreds comparison matrices 52, 53 and 55.

The comparison matrix units 52, 53 and 55 may be designed in accordance with well-known matrix design techniques so that an output control pulse is provided whenever two inputs thereto represent the same number, or two numbers related to any given predetermined manner, or both. For example, the tens comparison matrix 53 provides a pulse output whenever the binary coded numbers fed to two respective inputs thereto are the same digit or differ by five units. The units and 100's comparison matrices 52 and 55 provide an output pulse only when the inputs are the same digit.

The second inputs to the comparison matrices 52 and 53 are, respectively, the binary decimal coded outputs of a units counter 58 and a tens counter 60. The second input to comparison matrix 55 is the output of a hundreds counter 61. The units counter is always initially reset to the numeral 0 and the tens counter always to the number 5 and the hundreds counter 61, which is only used to locate a drum address in Section C of the drum, reset to the number 1. Whenever the units counter receives a pulse, it subtracts one from the previous total stored therein, and, whenever the units counter has subtracted ten units, it feeds a pulse to the tens counter which subtracts one unit from the number stored therein. Likewise, when the tens counter has been pulsed ten times, it subtracts one from the count in hundreds counter 61. The counters therefore, act as pulse subtracters rather than as pulse counters of the usual type. The pulse subtracting means is used because, as above explained, the drum blocks have addresses inversely related to their actual order. A typical type of backward counter is disclosed in Electronics Engineering Magazine, volume 68, November 1949, pages 962–967.

The units counter 58 is fed from clock pulse channel lines 63 or 66 on which the word and block pulses respectively appear from clock pulse tracks 2 or 5 as the drum moves past the pick-up heads 64. Tracks 2 and 5 are respectively used for locating drum addresses in Sections B and C of the drum. The lines 63 and 66 extend to the inputs of respective channels of an amplifier unit 65 whose output lines 63′ and 66′ extend to the input of the units counter 58 through "not" and "and" gates I46*m* and I46*k*, respectively.

When locating a data block on the drum, output pulses generated by the comparison matrices 52 and 53 are fed to an over-all coincidence detector 67 which, when it simultaneously receives pulses from both matrices 52 and 53, generates a pulse on an output line 69 which passes through a normally-open or "not" gate I46*b* and sets a flip-flop trigger circuit 71 controlling an "and" gate 73 to which is fed the word pulses of clock pulse track 3 on input line *i*. The flip-flop circuit is set to open the gate 73 so that the word pulses can operate a word counter 74. The gate input line *i* receives pulses from a channel of the amplifier unit 65 which is fed by a line 74 extending to an associated pick-up head. The output of the latter channel appears on output line 74′ which passes through a normally open "not" gate I46*n* leading to the input line *i* of gate 73.

When locating addresses in the linearization Section C of the drum, a three-way coincidence is used to locate a drum address. The output of the units comparison matrix is fed via an "and" gate I46*l* ("not" gate I46*a* then being closed) to an over-all coincidence detector 80 as is the output of the tens and hundreds comparison matrix 53 and 55. When the coincidence detector 80 receives coincidence pulses simultaneously from the comparison matrices, a pulse appears in its output which is fed through "and" gate I46*q* to flip-flop circuit 71 to open the gate 73. When locating addresses in linearization drum Section C, the input line of gate 73 receives its pulses from word pulse track 6 via line 70, one of the channels of amplifier unit 65, output line 70′, and "and" gate I46*p*.

The word counter 74 may be a pulse adder which increases its previous count total by one, each time it receives a pulse. The word counter is reset to zero every six-word pulses. The count stored in the word counter is fed to a suitable comparison matrix 75 whose other input is fed from a word address storage register 79. Both the counter 74 and the word address storage register 79 receive binary decimal coded information representing a number from one to six representing one of the 4-digit words in a selected block address of the drum. The word address storage register 79 in turn is fed from one of a number of selected outputs of a word address constants register 81 which, under the control of the programmer 14*a*, feeds a binary decimal code group representing a number from one to six through one of the gates I29*a*, I30*a*, I31*a*, I32*a*, I33*a* and I34*a*. When word coincidence is obtained, a pulse is fed by the comparison matrix 75 to terminals C.L. controlling 3-input "and" gates 82, 83, 84 and 85 associated with the drum pick-up and recording heads. Only those gates will open which also receive prepare signals from the channel selection matrix 54′ on control line *c*2. These gates, respectively, control the feeding of information into and out of the drum. It should be understood that there are actually a much larger number of gates than shown in the drawing, there being one outgoing gate for each of the data tracks on the drum, and one ingoing gate for each such track. Of course, the gates associated with the same 5-track section are operated alike.

As above explained control lines *c*2 of the drum read-in and readout gates 82–85 are controlled from the channel selection matrix unit 54′. The particular control line *c*2 which receives a prepare signal is determined by the signals fed to the three input lines thereof, namely, aforementioned line 54, line 93 and line LS. The last-mentioned line is fed with a suitable control signal whenever the linearization Section C of the drum is desired and when fed with such signal, feeds a prepare signal to control line *c*2 of gates 83 and 85. Otherwise, the combination of signals appearing on lines 54 and 93 will determine which of the various gates associated with drum Section B is selected, it being kept in mind that for read-in or readout purposes, there are ten possible gate sections to be selected at any given time.

It will be recalled that line 54 is fed from the hundreds storage register 48 except during linearization. The other input line 93 to the channel selection matrix is fed through a "not" gate **146*f*** with a signal representing the most significant bit of the binary decimal code group representing the tens digit of the block address desired. As previously indicated in the preferred code used with the present invention, this signal is one binary condition for digits 0 to 4 and the other binary condition for the digits 5 through 9.

The manner in which an address in drum section B is located may be explained using the following example. Keeping in mind that there are ten 5-channel sections in section B of the exemplary drum, assume that block 3 in the first such 5-track section is to be located. As above explained, this block has address number 497 and this number will be stored in the address register 40 and also in the buffer storage units 44, 46 and 48. Line 54 receives binary decimal coded information representing the hundreds digit of the address, namely, the number 4, and line 93 receives a binary signal representing the most significant bit present in any one of the numbers 5 through 9 present in the tens digit of the address. Using well known matrix design techniques, the matrix 54′ is arranged to respond to the signals on lines 54 and 93 to select the gate control lines ***c*2 of the gates associated with the first 5-track section in drum section B. As soon as the drum has rotated into a position where the start pulse in clock channel track 1 is opposite the corresponding pick-up head (not shown in FIG. 6A) the units and tens counters 58 and 60 are reset to the number 50. The over-all coincidence detector 67 will receive simultaneous coincidence pulses from comparison matrices 52 and 53 when the drum portion containing word block 3, which has address number 497, is opposite the pick-up heads, since, at that time, counters 58 and 60 have the number 47 (50 minus 3 block pulses) stored therein. As above explained, the matrix 53 is arranged to provide a coincidence pulse at the output thereof whenever numbers at the inputs thereof are the same or differ by the digit 5. Since number 4 contained in the tens block pulse counter 60 and the number 9 in the tens storage unit 46 differ by 5 units, coincidence will be effected when the drum is in the above-mentioned position. Since the comparison matrix 52 will at that time show coincidence between the units digits of the codes fed thereto, the over-all coincidence detector 67 will provide a pulse on its output line 69 which sets the flip-flop trigger circuit 71 to a position which opens the gate 73 to initiate a word locating operation. In the manner above explained, depending upon the words stored in word address storage register 79, the gates 82, 84, etc. associated with the first five-track opened at the proper block and word position to enable the feeding of information to or receiving information from the particular block and word position of the drum selected. If information is then being fed to the drum the incoming signal appearing on main input line L5 reaches the gate 82 via branch line B6, "and" gate 125*a* which is opened by a programming instruction requesting a drum read-in operation and line B6′. In a drum read-in operation the units, tens, hundreds and thousands digits are received in succession so that the four digit elements of a word position are filled in a single revolution of the drum. Also, in a drum read-out operation, all four digits in a word are read-out in succession. Signals being fed out from the drum appear at the output of the selected gate 84 (or 85) which via line 94 is fed to the input of one of the channels of the amplifier unit 65 which channel has an output line 94′ extending through an "and" gate 126*a* connected to lines L6. Gate 126*a* is, of course, opened during a drum readout operation by the programmer 14*a***.

The drum output signals on line L6 normally pass through a "not" gate **87*a* leading to the minuend line L2 extending to the adder 16*b*. In some cases, however, the drum output signals are fed through an "and" gate 97*b* to line L4 extending to the complementer where the drum output is to be subtracted from another number. Assuming that the third block in the second 5-track section of the drum section B is desired, the block address 447 (500 minus 3) would be fed to the block address register 40 so that the comparison matrices 52 and 53** will produce simultaneous coincidence pulses when the latter section of the drum is brought opposite the pick-up head associated therewith.

The channel selection matrix is designed to select the set of gates associated with the first 5-track section in section B of the drum when the signal on line 54 represents a 4 (representing numbers in the 400's) and the signal on line 93 represents a tens digit of from 5–9. It selects the gates associated with the second 5-track section when the signal on line 54 represents a 4 and that on line 93 represents a number of from 0–4. In a like manner, the channel selection matrix selects the gates associated with the 3rd, 5th, 7th and 9th 5-track sections when the signals on lines 54 and 93 are 3–5 through 9, 2–5 through 9, 1–5 through 9 and 0–5 through 9 and the gates associated with the 4th, 6th, 8th and 10th 5-track sections when the signals on lines 54 and 93 are 3–0 through 4, 2–0 through 4, 1–0 through 4 and 0–0 through 4. The $3n+2$ code used is such that the most significant bit of the tens digit code group has one binary condition for numbers 5–9 and the opposite condition for numbers 0–4 so that the line receives the proper signals.

In the case where a section in the linearization section C of the drum is desired, the block address is fed to the comparison matrices 52, 53 and 55 in a manner above explained. However, drum section B will not be selected because the channel selection matrix will receive a pulse on input line LS which will indicate to it that the gate sections associated with section C of the drum only are to be selected.

PATH OF INFORMATION FLOW

The data handling circuit shown in box form in FIGS. 7*a* and 7*b* is arranged to provide a path of information flow arranged in loop form. Starting with the drum **8*a* as a source of information, information flows from the drum, through line 94 (really five separate lines), amplifier unit 65, line 94′, gate 126*a*, and lines L6 and L2 leading directly to the adder 16*b*. Information is often read through the adder where no arithmetic operation is to be performed and, in such case, the number zero is fed unchanged from a zero storage register 96 and associated "and" gate 98, through the complementer 16*a*** to the second input of the adder so that the number fed to the adder from the former input appears unchanged in the adder output.

In addition to means 96 and 98 for passing the number zero through the complementer, there is provided storage means **99*a* and 99*b* for respectively feeding a code group representing the number 1 and 2 through "and" gate 14*a* and 15*a* which numbers can be added or subtracted from the number fed on line L2. The adder output is connected to the main line L5 which leads to a number of gated branch lines, namely, branch lines B0, B1, B2, B3, B4 and B5 and B7 in addition to drum input line B6. The first branch B0 is an error detection branch including an error detector unit 99 of any suitable type. If the binary decimal code group fed to line L5 represents a symbol other than 0 to 9 in the particular code utilized, the error detector unit 99** operates a suitable enunciator means, such as a horn 100, and/or also control means 102 which will shut off power from the system to terminate operation thereof if the binary decimal code group on line L5 is in error. The error detector unit receives all binary decimal code groups appearing on the line L5 which, because of the loop arrangement, will include all binary decimal code information flowing in that part of the system located to the right of the code conversion matrix 12a.

Branch B1 includes an "and" gate I7a whose output leads to a data shift register 104 which may comprise a 5-channel 4-stage, magnetic-core shift register similar to the address register 7c. The output of the data shift register may extend to any one of four different locations. The output of the last stages thereof can be fed through an "and" gate I8a to input line L4 extending to the complementer 16a. Alternatively, the output of the last stages thereof may be passed through an "and" gate I9a to input line L6 leading directly to the adder 16b via line L2. Also, the output stages of this register may be fed through an "and" gate I10a which re-circulates the output thereof back into the input of the shift register.

The information stored in the corresponding stages of the shift register channels making up the register may be readout from the register simultaneously through "and" gates I11a, I11b, I11c and I11d to corresponding stages of output shift register 17. To effect this result, a single advance pulse can be fed to the data storage register to shift the stored signals out of the various stages thereof and the generated signals are fed through the gates 11a, 11b etc. to the corresponding stages of the output register 17. Output register 17 may be similar to the data shift register 104 except that it is arranged to feed out the binary code groups to output line L7 with the most signficant digits first in response to advance pulses on advance line AP. The reason for the feeding of information with the most significant digits first in this part of the system is because the output recording devices fed from output register 17 are preferably electric typewriters which are arranged to type numerical information with the most significant digit first. Line L7 leads to branch lines L7a and L7b which respectively extend through "and" gates I44a and I43a leading respectively to log output device 6a and scan output device 6b. These log output devices may be electric typewriters, the typewriter 6a being utilized to print out information on all of the variables regularly, such as hourly, or when they are demanded between hourly periods by the depression of the on-demand and totals demand push button controls. The output device 6b can be utilized only to print out data on new abnormal variables or variables which have just returned to normal immediately as they are scanned.

A clock register 107 is provided which feeds coded information on lines 109 and 111, respectively, to gates I44b and I43b so that information one time may be recorded by the output devices 6a and 6b. A storage register 113 is provided containing coded information on symbols which identify the variables, such as P for pressure, F for flow, and T for temperature, which coded information are fed through respective gates 114a, 114b or 114c at the proper time to the scan output devices 6a and 6b via "and" gates I44c and I44d. The manner in which the gates controlling the feeding of information to the log output device 6A and the scan output device 6B will be explained in more detail hereinafter in connection with the description of the typewriter programmer 14b which controls these gates.

The branch B2 contains an "and" gate I12a feeding a shift register, referred to as an accumulator or (AR) register 115. The accumulator register, unlike the other shift registers above-mentioned, has five stages in each of its five channels. It can, therefore, accommodate five binary decimal coded groups representing five digits. The accumulator register 115 differs from the other shift registers described also in the fact that information may be shifted therein in two directions. Hence, two advance pulse lines AP and A'P' are shown associated with this register. A typical two direction shift register is disclosed in the IRE Convention Record, part 4, 1955, page 80. This register may also receive information fed from either end thereof as is indicated by the direction of the arrows 116 and 117. Normally, information is fed into the first stages of this register from the outputs of the gate I12a and is fed out of the last or fifth stages thereof with the least significant digit first through the "and" gate I13a leading to the adder input line (or lines) L6. The output of the fifth stages of the accumulator register may be alternatively fed through "and" gate 118, to the first stages of a register 119' referred to as the MQR or the multiplier quotient register. The AR and MQR registers, in such case, form one over-all shift register sometimes referred to as an ARMQ register. The MQR register is similar to the accumulator (AR) register 115 in that information can be shifted in either direction therein and information may be fed into either end thereof. Each channel of this register has four shift register stages, the last or fourth stages thereof being represented by a separate box MQC.

The first or upper stages of the MQR register 119 may also be fed from the main line L5 through an "and" gate I15a. Forward advance pulses are fed to the AR and MQR registers through gates I12b and I15b respectively. These pulses shift the signals in these registers forward or downward, that is toward the last stages thereof holding data on the least significant digits. The AR and MQR registers are serially connected together when storing eight digit numbers resulting from multiplication and eight-digit totals information received from the drum. When the eight digit number is to be readout from the serially connected AR–MQR (or ARMQ) registers, the eight digits appear in stages 1–5 of the AR register and in stages 1–3 of the MQR register and forward advance pulses effect the successive transfer of the eight digits from the third stage of the MQR register through "and" gate I16a leading to output line L6. Otherwise the eight digits usually occupy stages 2—5 and 1—4 of the AR and MQR registers. When the eight digit number, for example is used in a division operation, the number "0" is detected in a manner to be described so that the four most significant digits appear in stages 2—5 of the AR register. Then these four digits are read to the adder 16a via "and" gate I13a connected to the output of the fifth stage of the AR register. The four least significant digits are not used. The quotient is developed in the four stages of the MQR register and readout by transferring the quotient to stages 2—5 of the AR register using another "0" detect operation.

For the various arithmetic operations, the information in the AR and MQR registers are shifted backward or toward the first or second stages of the AR register in various predetermined amounts, sometimes the shift being 4 stages, sometimes 1 and and at times perhaps 2 or 3 stages. Accordingly "and" gates I21a, I22a, I23a and I24a are provided at the output of which 1, 2, 3 and 4 pulses per gate opening cycle are provided. The output of these gates are fed in parallel to "and" gates I19a and I20a which respectively are connected to terminals X and Y, which respectively lead to the reverse or upward shift lines of the AR and MQR registers. If both the AR and MQR registers are to be connected in series, then an "and" gate 119 connects the outputs of the first stages of the MQR register and the signal inputs of the fifth stages of the AR register. For example, if four shifts rearward are desired, then gates I24a, I19a and I20a are opened to feed 4 shift pulses to the reverse shift lines of the AR and MQR registers. A selection of forward advance steps is similarly obtained by feeding the proper number of pulses to forward shift lines AP.

Multiplication and division involve successive addition or subtraction operations. In multiplication the 4-digit multiplier is fed to the four stages of the MQR register, the least significant being in the fourth stages MQC thereof. Then the multiplicand is added to itself the number of times indicated by the digit in the MQC stages. Each time the multiplicand is added to itself the number in the fourth register stages MQC is decreased by one by the feeding of a control signal through a gate I18*a* to a code modifying unit 123 which decreases the number in the MQC stages by one. When this number reaches zero, a "0" detector unit 124 is rendered operative which opens gate I21*a* to pass a single shift pulse via gates I15*b* and I12*b* to advance both registers AR and MQR then connected serially one step forward. After four such successive "0" detect operations counted by a cycle counter 125, the succession addition operation is complete and an eight digit product appearing in stages 2—9 of the AR–MQR registers results. The programmer then calls for the former mentioned "0" detect operation on the AR register which shifts the four most significant digits to the stage 2—5 of the AR register.

In division, the 4-digit divisor stored in the data storage register is subtracted from the dividend in the accumulator register as many times as the resulting remainder number appearing each time in the AR register is a positive number. Initially, the number set into the MQC stages is one. After each subtraction operation, the number one is added to the MQC stages by passing a control signal through gate I17*a* which operates the code modifying unit 123 to increase the number in MQC by one. When the remainder number becomes a number less than zero, as determined by the sign detection means previously mentioned associated with the adder, the programmer 14*a* opens the gate I18*a* which subtracts one from the MQC number and then adds the remainder number to the division which is recirculated in the DSR register 104 to restore the previous remainder number in the AR register. The number in the MQR register stages including the MQC stages is shifted backward to transfer the quotient number developed in the MQC stages to the third stage in the MQR register. The remainder number in the AR register is shifted one position rearward and the previous operation is repeated. Each time a number is transferred from the MQC stages the cycle counter counts 1 and 4 such counts indicating a four digit quotient number ends a division operation.

Branch B4 (FIG. 7*b*) includes an "and" gate 135*a* leading to an instruction register 127 which stores the instruction of word one of the selected drum block. This register may be a magnetic core shift register with five shift register channels each four stages long. A preferably electronic-type bi-stable buffer storage register 128 is coupled to the output of the various stages of the instruction register through "and" gates which open when the third advance pulse shifts, the least significant digit to the last stage of the register. The buffer storage register 128 provides a continuous source of voltage signals to a decoding matrix unit 129 which among other things, sets various conditional transfer circuits of the programmer in a manner to be explained. The decoding matrix may take the form of the decoding matrix disclosed in the article entitled "Rectifier Networks For Multiposition Switching" by D. R. Brown and N. Rochester in the Proceedings of the IRE, February 1949, pp. 139–147. Thus, the decoding unit has a large number of output lines 131–154 some of which lead to the programmer 14*a* and others leading to the linearization table address register 45 where the proper drum block address is selected by opening the proper gate 47*a*, 47*b* or 47*c* and to the variable indentification register 113. As previously explained, the least significant digit of the instruction number, among other things, gives information on whether the associated variable when last scanned was normal or abnormal. If this number was zero, it indicated that the variable was previously normal; if the number is one, then this indicates that the variable was previously abnormal. A line 154 extending from the decoder connects with programmer 14*a* to set an alarm conditional transfer circuit when the units digit of the instruction is zero. The line 22, previously mentioned, extends from the output of the decoder to the scan control unit 4*d* (FIG. 7*a*) to indicate to the latter when the block address involved is that of a scan point.

The keyboard input device 155 has a depressible key section 155*a* for setting up a drum block address in the address register 40 and associated buffer registers 44, 46 and 48 via gate 157, line L8, lines L1, L2, adder 16*b*, line L5 and branch B5. The word address is also set by controlling the word address constants register from the keyboard. The timing for transfer of the block and word address is under control of the programmer 14*a*, a given portion of each programming cycle being given over to inquiry of the keyboard setting, if any. The keyboard also has a data key section 155*b* for feeding the desired numerical information to the data storage register via gates 159, line L9, lines L1 and L2, adder 16*b*, and line L5 and branch B6 leading to the proper recording head selected by the channel selection matrix. In this way the various data constants may be initially manually entered into the proper drum position at the proper time.

The keyboard has a key K–1 which is depressed when the address and data from the keyboard is to be entered into the linearization section C of the drum. The keyboard also has "On-Demand," "Totals Demand" and "Off-Normal Summary" push buttons or keys for effecting these various kinds of readouts previously described.

Before leaving FIGS. 7*a* and 7*b*, it should be pointed out that FIG. 12 lists some of the instructions carried out by the programmer 14*a* in controlling many of the gates shown in FIGS. 7*a* and 7*b*. The various instructions have been numbered in the chart of FIG. 12 and the same numbers have usually been used to identify the gate or gates controlled by the instruction involved together with the letter "I" ahead of the number. Small case letters have been used following the number to distinguish between the different gates controlled by the same instruction.

PROGRAMMER

*Part A—Types of programming stages*

The present variable monitoring and recording system is a completely automatic system wherein the programmer 14*a* provides a variety of alternative programs depending upon various conditions which may change from moment to moment. The system automatically adapts itself to these changing conditions without the need for an intervening human operator. The programmer 14*a* in the preferred form of the invention, uses a magnetic core control element having a number of windings (not shown). The magnetic core has a generally rectangular hysteresic curve commonly found in magnetic core control elements, as discussed in the April 1956 edition of Automatic Control Magazine, pages 15–19.

One of the windings receives control voltage signals usually in the form of pulses of a given polarity which set the core into one state of magnetization. Another winding receives pulses of a given polarity which are called advance pulses which, if the core is in said given state of magnetization, will change the state of magnetization of the core to a state of opposite magnetic polarity which results in the generation of a pulse on the third or output windings of the magnetic core unit. Once the core has been triggered into its second state of magnetization, subsequent advance pulses of the aforementioned polarity received on the second mentioned winding will not change the core and result in an output pulse. When the core is again set to its above-mentioned first state of magnetization, a pulse will also be generated but the pulse is of opposite polarity from the first mentioned generated pulse and can be blocked out by a rectifier element. The reception of the next advance pulse will again generate a useful output pulse which passes through the rectifier. In FIG. 9, the magnetic core units are shown in circular form and the various inputs leading to the various windings above-mentioned are shown by lines intersecting the circle.

Each core unit forms part of a stage of the programmer 14*a* which stage controls the operation of one or more parts of the system, such as the gates shown in FIGS. 7*a* and 7*b*. Each stage carries out one or more instructions of the kind shown in FIG. 12. The stages are connected together to form a shift register wherein the stages are rendered operative in succession by a shifting of a control pulse from stage to stage at the proper time.

Referring now more particularly to FIG. 9, the first programming stage has a magnetic core unit indicated by reference numeral 200, and a line 202 extends to the winding which sets the core into the first state of magnetization. A line 204 extends to the winding which receives advance pulses, and a line 206 is the output line which receives a pulse generated by the core when its state of magnetization is triggered from its first to its second state of magnetization. A rectifying element 207 is provided in this output line which passes pulses of a polarity generated by a change in magnetization from said first to said second state but not from the second to the first states. The other stages of the programmer shown in FIG. 9 also have a magnetic core unit identified by reference numeral 200 and additional distinguishing marks such as a single or double prime or small case letters. Associated with each of these magnetic cores is a terminal block, such as 205, containing an "In" terminal 205–1, a "Time" terminal 205–2 and an "Out" terminal 205–3. Obviously, where necessary, there may be several additional input and/or output terminals. The terminals of the various stages are connected to the various windings of the associated cores by various leads such as 208–1 and 208–2 and the terminals of successive stages are likewise interconnected by jumper lead wires or by printed circuits which permit connections of a ready variance of the programming sequence or the operations or combination of operations to be performed at a particular step in a given sequence. Thus, the terminal blocks may make up the plugboard 15 previously referred to. The terminal containing unit 15 can be designed to receive printed circuit cards or sheets which make interconnections between the various terminal blocks instantaneously. Thus, for example, the basic components of the system disclosed could be utilized for alarm scanning only, high speed scanning and subsequent storage only, or other possible types of programming, although the specific as distinguished from the broader aspects of the invention is as described.

The "In" terminals like 205–2 are connected to the "Out" terminal of the previous programming stage by a jumper lead or printed circuit connection like 208–3 or 208–3′. The generation of an output pulse in a given stage initiates operation of various units controlled by that stage and also sets the following programming stage for operation when a timing pulse is fed thereto from said given stage. The timing pulses appear on lines 208–4, 208–4′, extending from the "Time" terminals.

The "Time" terminals are externally connected to terminals like **209*a*, 209*b*, 209*c*, etc. associated with time lines 218*a*, 218*b*, 218*c* and 218*d* which are fed with pulses originating from the clock pulse tracks. Utilizing suitable pulse dividing means, each of the lines may be fed with pulses occurring at a different rate. One line, for example, may be pulsed every four word element pulses or twelve word element pulses generated in the pick-up heads. The particular time line to which the time terminals 205–2, 205–2′, 205–2″, etc. are connected depends upon the various kinds of operations to be performed by the particular stage in question. FIG. 12 gives a list of the type of operations or programming instructions carried out by the various stages of the programmer. Many of these operations take longer than others to be completed so that the time terminal of a particular stage is connected to the time bus or line which will give a sufficient period of time to enable the operations to be performed by that particular stage to be effected. The "Time" terminal of a given stage may be connected to a flip-flop or bi-stable trigger circuit 219 which opens an "and" gate such as gate 210 or 210 of the next stage. The input line to these gates is connected to one of a number of advance pulse lines such as 218*e* and 218*f*** which provide suitably timed advance pulses for operating the various gate or gates in FIGS. 7*a* and 7*b* or other units to be controlled by the stage. These lines, for example, may be pulsed only every fourth word element pulse or every first word element pulse in each group of four word element pulses induced in a particular pick-up head associated with the drum 8*a*. As above explained, the advance pulse appearing in the output of gate 210 or 210′, etc. sets the particular preset core to a magnetization state which generates a control pulse. The last mentioned advance pulse may also be used to reset the flip-flop circuit 219, 219′, etc. of the associated stage.

The pulse generated by a particular stage, in addition to setting the core of the next stage, usually triggers one or more bi-stable or flip-flop circuits like 221, 221′, etc. connected to the associated "Out" terminal. These circuits 221, 221′ etc. control the opening and closing of the various "and" gates shown in FIGS. 7*a* and 7*b*. In FIG. 9 the gates are referred to by reference numerals 223, 223′, etc.

A typical operation of the programming stage may be as follows. Assuming that core 200 has been set by the reception of a set pulse on line 202, when the operations of the previous stage have been performed, control line 216 of the gate 210 receives a gate opening signal from the bi-stable of the previous stage. Then, at the proper time, an advance pulse is fed from the advance pulse line **218*f* to the other input of the gate 210. An advance pulse thus appears at the output of the gate 210 which triggers the magnetic core 200 back to its second state of magnetization which results in the appearance of a pulse on its output line 206. This pulse is transmitted to the flip-flop 221, setting it into a position where the control voltage is fed therefrom to the gate 223 will open the gate 223** to enable signals fed to its input line *i* to pass through the gate. The output pulse also is fed to the "In" terminal of stage 2 of the programmer which sets the associated magnetic core 200′ to a first or reference state of magnetization so that an advance fed to its advance winding will generate a pulse in the output winding thereof. However, an advance pulse will not appear on this line until the various operations to be performed by stage 1 are complete, whereupon a reset pulse fed from time line **218*d* through terminal 209*a* will reset the flip-flop 221 to close gate 223. Also, when the operations to be performed by stage 1 are complete, a pulse is fed from time line 218*d* through the "Time" terminal of stage 1 to trigger flip-flop circuit 219 which opens gate 210′. When an advance pulse appears on gate input line 212′ leading from advance pulse line 218*f*, it triggers the core 200′ into its second state of magnetization, resulting in an output pulse appearing at the "Out" terminal which performs functions similer to those of stage 1**.

Stage 3 in FIG. 9 is a conditional transfer stage. A conditional transfer stage has associated with it two other stages similar to stages 1 and 2, one of which will be triggered into operation if one set of conditions exists, and the other of which will be triggered into operation if a different set of conditions exists. A conditional transfer stage actually may be thought of as a stage which determines which of two other stages such as stage **4*a* or 4*b*** are to be selected. The conditional transfer stage, stage 3 in FIG. 9, comprises a magnetic core 200'', an input control gate 210'' and a terminal block 205'' similar to those of stages 1 and 2. The core 200' is set by the output pulse of stage 2 and, when stage 2 has completed its operation, core 200'' receives an advance pulse which generates an output pulse appearing on the "Out" terminal of the associated terminal block. The pulse appearing at the "Out" terminal is fed to a "P" terminal of a terminal block 228. A line connects this terminal to an input line of an "and" gate 229 and a "not" gate 230. As previously explained, these two types of gates differ in that an "and" gate feeds a signal to its output when the two input lines receive simultaneously a signal of the proper polarity, whereas a "not" gate normally feeds signals through the gate and is closed to prevent a signal from appearing in its output when the input lines simultaneously receive these signals. The second input line of these gates are fed from a "Ti" terminal which, in turn, is controlled by the output of a flip-flop or bi-stable trigger circuit 232.

The trigger circuit 232 is controlled by the particular condition involved, usually by the pulse or other signal in one of the output lines such as 150, of the decoder 129. The conditional transfers stage effectively makes inquiries to determine which of two possible conditions exists and energizes one of two possible programming branches depending on the condition. Thus, an inquiry may be, is the sign of the result of the subtraction operation performed by the adder positive or negative? Another inquiry may be, does the point being scanned require linearization; or is it a pressure or a temperature variable? The answers to these inquiries, in many cases, are given by the instruction word in the instruction register. When the answer to a particular inquiry is in the affirmative, the flip-flop will be set to its condition which will result in the transmission of the pulse fed to the "P" terminal from the previous stage through the gate 228 to the "T" terminal, and will prevent the transfer of this pulse through the "not" gate 230. When the flip-flop 232 is in its reset condition, then the pulse from the terminal "P" will not pass through the "and" gate 228 but will pass through the "not" gate 230 to an "N" terminal.

The "T" terminal is connected via a transfer or "T" line to the "In" terminal of stage 4*b* of the programmer, whereas the "N" terminal is connected via a normal or "N" line to the "In" terminal of the programmer stage 4*a*.

FIG. 13 gives a list of most of the conditional transfer inquiries made by the programmer. Each conditional transfer stage in the detailed programmer box diagram of FIGS. 11*a*–11*d* has a number in parentheses which corresponds to a conditional transfer number in the chart of FIG. 13 identifying the conditional transfer inquiry involved. A conditional transfer stage in FIGS. 10*a*–10*f* is identified by a circular outline. The stages which operate similarly to stages 1, 2, the non-conditional transfer stages such as 4*a* and 4*b* in FIG. 9 are shown in FIGS. 11*a*–*f* by a square outline.

In FIG. 13, for inquiries 14–24, 26 and 27, there appears a group of numbers enclosed in parentheses together with three dash lines. The three dashes and the parentheses represent from right to left the units, tens, hundreds and thousands digits of the instruction number. The location of the parentheses indicates the digit of the instruction number containing the answer to the inquiry involved. Considering inquiry No. 14 for the present, if the units digit of the instruction number is either 0, 1, 2 or 3, then a scan point is present, and the flip-flop circuits of the conditional transfer stages making this inquiry such as circuit 232 in FIG. 9, will be set into a state indicating the presence of a scan point.

The more detailed explanation of the operation of the programmer 14*a* will now be given. The explanation will be broken down into the various basic types of system operation involved, namely:

(*a*) Alarm scanning for new abnormal variables or variables which have just returned to normal, together with print-out of information on such variables including an identification number for the variable, the value of the variable, a symbol identifying the type of variable and the time when the variable was scanned; (*b*) An hourly drum entry cycle and hourly print-out of data on all log ponits; (*c*) "On-Demand" print-out of data on log point which are normally printed out hourly; (*d*) Totals demand operation wherein current totals information may be selectively printed out at any time; and (*e*) "Off-Normal Summary" print-out of data on all abnormal variables when requested.

*Part B—Programming during alarm scan cycle*

The present invention substantially continuously scans the variables seeking new abnormal and new return to normal variables. The scanning continues even when the system is printing out information. Moreover, where the system contains flow rate variables such as average variables, which should be periodically integrated, the scanning of other variables is interrupted to enable the scanning of such integration variables and the addition of the current average value to the previous integrated value.

Figure 10A:
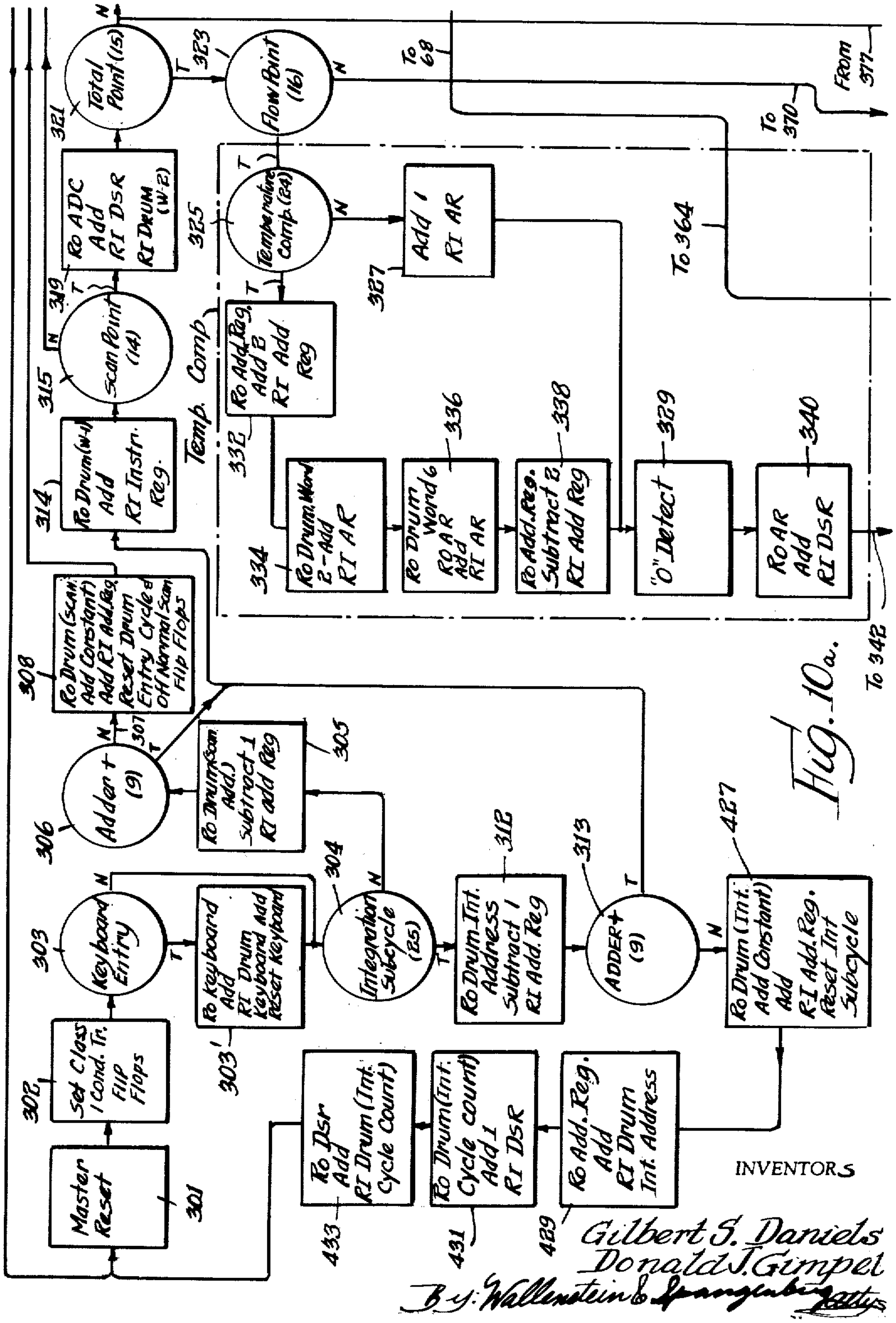
Figure 10B:
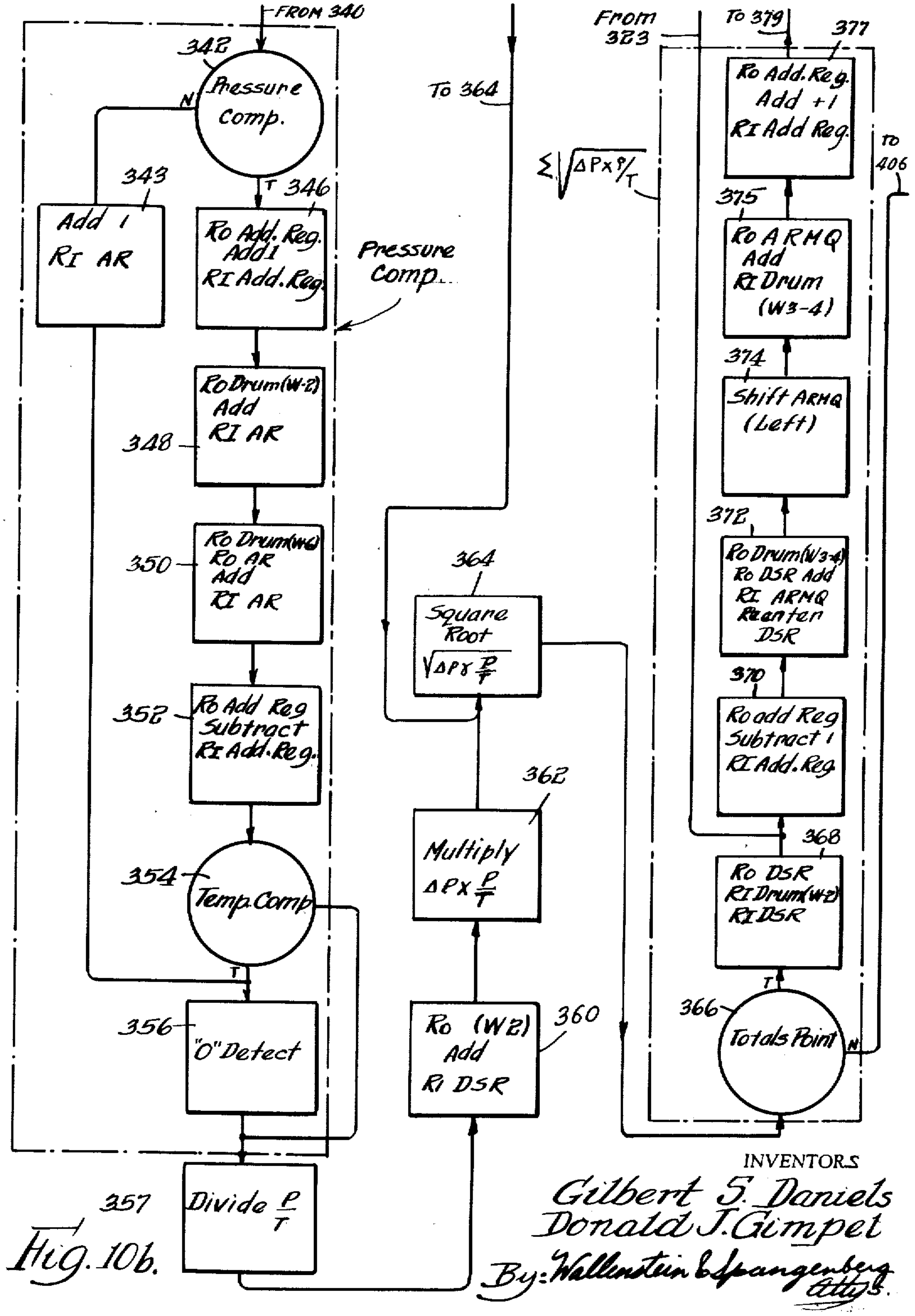

Referring to FIG. 10*a*, the programming cycle begins with the feding of a pulse to the input of a master reset programming stage 301 which resets various parts of the system then requiring resetting, such as the conditional transfer flip-flop circuits into their normal or non-transfer states. Class 1 and Class 3 conditional transfer stages (FIG. 13) arc reset by stage 301. Class 2 conditional transfer stages are functions of arithmetic operations and may be reset during the portion of the program involved. Class 4 stages are reset upon entry of an instruction in the instruction register. Following this, programming stage 302 is set into operation to effect the setting of the flip-flop circuits associated with Class 1 conditional transfer circuits (FIG. 13) which should be set and also sets the flip-flop 21 (FIG. 7*a*) of scan control unit 4*d*. Class 2, 3 and 4 conditional transfer stages are set during the course of the operation of each programming cycle not at the beginning as the Class 1 stages. The conditional transfer stage 303 is set into operation where inquiry is made as to whether a keyboard entry has been made, that is, whether the operator has depressed keys on the keyboard 155 (FIG. 7*a*) for the purpose of entering information into the drum. If he has, then stage 303' is rendered operative which first opens gate 157 to feed a binary decimal coded number via lines L8, L1 and line L5 to either main address resgister 40 or linearization address register 45*b*, depending upon whether section B or C of the drum is to be entered, the number representing the block address of the drum to be entered. Simultaneously, a line of a multi-line cable 158 extending from the keyboard to the control lines of gates 129*a*–134*a* at the output of the word address constants register is energized to feed a number representing the word position of the selected drum block address to the word address register. Then, when the selected block and word positions of the drum pass the pick-up heads, a coincidence pulse is generated in a manner previously explained which opens gate 159 then prepared for opening to feed binary decimal coded signals from the keyboard representing the number selected by the depression of the keys of data section 155*b* thereof via L9, L1 and L2, adder 16*b*, line L5 and branch B6 leading to the drum read-in heads where the number is recorded in binary decimal coded form on the drum. Then, stage 303' clears the keyboard and a pulse is generated which sets programming stage 304 into operation. Stage 304 is also set into operation via the "T" line of conditional transfer stage 303 if no keyboard entry was involved.

Stage 304 makes inquiry as to whether an integration subcycle is involved. This can be determined from a flip-flop circuit (not shown) which is set to indicate an integration subcycle each ten second or other selected interval by the timing pulse source 4*f* (FIG. 7*a*). Note that the block addresses containing data on integration variables are active also during normal scanning periods not involving integration subcycles.

For the present, it will be assumed that an integration subcycle is not involved, so that the result of the inquiry is a pulse on the "N" line leading from the conditional transfer control stage 304. The latter pulse sets a programming stage 305 into operation, which transfers the scan address word 3 of block 1 of the drum usually representing the block address of the last variable scanned to the address register through the adder, where 1 is subtracted from this address, the resultant address usually representing the block address of the variable then being scanned. Of course, to transfer the scan address word from the drum, the stage 305 must open the proper gates to transfer the block address 499 in constants register 42 (FIG. 7*b*) to the address register 40, to transfer the number 3 representing word 3 from constants register 81 to register 79 and to enable passage of the word 3 information through gate **126*a* to line L6**.

Upon completion of this address transfer, the next programming stage 306, is set into operation, which stage is a conditional transfer stage inquiring whether the output of the adder when 1 was subtracted from the previous address was positive or negative. If negative, this indicates that the scanning of all block addresses in drum section B has been completed further indicating the end of an alarm scanning cycle. A pulse then appears on "N" line 307 which sets the address reset stage 308 into operation.

Operation of stage 308 results in the transfer of word 5 of block 1, the scan address constant, which is the number equal to the number of block addresses in drum section B, such as 500, through the adder (where zero is added to this number) and then into the address register 40. Stage 308 also resets to normal condition the flip-flops associated with the drum entry log cycle and the off-normal summary conditional transfer stages. Upon completion of the operations to be performed by programmer stage 308, stage 309 (see FIG. 10*c*) is set into operation, which stage is a conditional transfer stage which inquires whether integration subcycle is in effect. Since in the assumed example an integration subcycle is not in effect, a pulse appears on the "N" line which sets the next stage 310 into operation. The purpose of this stage is to transfer the scanned address constant number now in the address register into word 3 of drum block 1 which is to contain the scan address number. The address will be transferred out of the address register through the adder, where 0 is added thereto, and then to the input branch B6 leading to the drum recording heads.

If the output of the adder back at the conditional transfer stage 306 (FIG. 10*a*) indicated that the result of subtracting one from the current scan address number was still positive, then, the "T" line thereof is pulsed instead of the "N" line to initiate operation of the programming stage 314. This point in the programmer is also reached when an integration subcycle is involved such as when the point represents a rate of flow quantity to be integrated. Assuming that an integration point is involved, then, going back to stage 304, the "T" line thereof will be pulsed to start a stage 312 operating which effects the readout of the integrator point address from the word 3 position of the second block of section B of the drum, through the adder **16*b* where one is subtracted therefrom and the result is read into the address register 40. Next, conditional transfer stage 313 is rendered operative which inquires whether the result of the latter subtraction is positive indicating that an integration subcycle has not yet been completed. If such is the case, stage 314 above mentioned is set into operation. When stage 314 is in operation, the instruction word, word 1 of the block address in the address register, is read out of the drum through the adder into the instruction register. To effect this result, the proper gate associated with the word address constants register 81 is opened to transfer into the word storage register 79 the code for word 1. (From here on in the description, whenever a direction or instruction requires the reading out of or reading into the drum certain information, it will be understood that proper word and block addresses will be read into the registers required to effect this result.) When an instruction is read into the instruction register, the instruction decoder network 129** will be operative to set the various flip-flop circuits of the conditional transfer circuits to be affected by the instruction word, as above explained.

When the programmer stage 314 completes its operations, the next stage 315 is set into operation, which stage is a conditional transfer stage, which inquires whether the block address in the address register is that of a scan point. If the address was the address for block 1 or block 2 (having address numbers 499 or 498), since such address is not related to any particular point or variable as the other data blocks, it is not related to a scan point and, accordingly, the "N" line would be energized. The line "N" associated with the conditional transfer stage 315 extends to conditional transfer control stage 316 (FIG. 10*c*), which makes inquiry as to whether a drum entry log cycle is involved. A drum entry log cycle occurs hourly when print-out of substantially all variables is desired. Since this is not the case in the present example, the "N" line thereof will be energized to initiate operation of the programmer stages 309 and 310 in the same manner previously explained.

Since a scan point is involved, the "T" line of the conditional transfer stage 315 will be pulsed, initiating operation of stage 319. This stage initiates read-out of the variable value information at the output of the code conversion matrix **12*b*** (FIG. 7*a*) into the data storage register 104 and also simultaneously into the word 1 position of the drum block address involved. This transfer occurs, of course, when there is coincidence between the block and word address control sections of the system, as above explained.

Next, conditional transfer stage 321 is set into operation, which stage makes inquiry as to whether the point involved is one to be totalized. For the present, it is assumed that such a point is involved, such as a flow rate variable. As is conventional in the field of flow measurements, the quantity of fluid flow through a conduit is measured by determining the pressure drop across an orifice. The quantity of average rate of flow is proportionate to the square root of the pressure drop across the orifice. As previously indicated, it can be shown that temperature and absolute pressure of the fluid in addition to pressure drop are often factors to be considered in computing average flow. In such case, the equation for rate of flow is:

$$\sqrt{\Delta P \cdot P/T}$$

where $\Delta P$ is the pressure drop and P and T are respectively absolute pressure and temperature.

Depending upon the material involved and the possible variation in temperature and absolute pressure, it may be unnecessary to include a temperature or absolute pressure correction factor in the equation. As above outlined, the instruction word contains an indication as to whether the variable should be pressure or temperature compensated. For the present, let it be assumed that both temperature and pressure compensation is desired. In some cases only average flow rates are desired, whereas in others the integration of flow rates to determine quantity of fluid flow or average flow rates are desired. The latter variables are referred to as integration variables which are regularly scanned during the so-called integration subcycles.

If the flow variable is one which requires integration, then the "T" line at the output of the conditional transfer stage 321 will be pulsed to initiate operation of another conditional transfer stage 323 which inquires whether the variable involved is a flow point. In the assumed example it is such a point; however, the variable may be a totals point, that is a point to be totalized, such as a kilowatt hour variable, without it being a flow point. If a flow point is involved, then the "T" line of the conditional transfer state 323 is pulsed to initiate operation of another conditional transfer stage 325, which inquires whether the particular variable is to be temperature-compensated as determined from the instruction in the instruction register at that time. If it isn't then the "N" line of the transfer stage 325 is energized to initiate operation of a programming stage 327 which reads the number 1 into AR register. The output of stage 327 leads to the input of a "0" detect stage 329 whose function will be explained hereinafter.

Assuming that temperature compensation is desired, the "T" line of the conditional transfer stage 325 will be pulsed to operate the programming stage 332, which adds 2 to the numbers stored in the address register by passing the address through the adder together with a code group for the number 2 and then transferring the result of the addition back into the address register.

As illustrated in FIG. 3, there are several drum word blocks associated with each flow variable, and other variables to be totalized as well. In the case of flow variables, average rate of flow data is stored in word 2 of a given block address N which falls in the block sections set aside for integration variables. For the convenience of data handling and reducing access time to the drum, two word blocks before and two word blocks after the N address of the flow variables involved provide information relating to such variables. For example, in block address 44 ($N+2$) in FIG. 3, the information necessary for temperature compensation is provided, namely, the value of the temperature at the point of flow involved which is scanned and read into word 2 of the block address as an ordinary point or variable. Word 6 of this block contains a Kelvin conversion constant for converting a Fahrenheit measurement to the Kelvin temperature base. In block address 43 ($N+1$), information is provided in word 2 of the gauge pressure at the flow point involved. Word 6 of this block contains a conversion constant for converting gauge pressure to absolute pressure necessary in the average flow rate computations. This is usually a number representing an average atmospheric pressure at the place involved. The pressure point involved like the temperature point is scanned and read into the drum the same as any other scan point. In the present example, the scanning of the temperature and pressure points precedes the scanning of the flow point which is necessary in order to compute the flow at the point involved.

Returning to programmer stage 332 in FIG. 11*a*, this stage adds 2 to the number in the address register so that the address for the work block containing information on temperature is available. Next, programmer stage 334 is rendered operative, and this stage reads the measured temperature value stored in word 2 of the temperature word block into the AR register 114 via the adder. Then, the next programming stage 336 is rendered operative, this stage effecting the reading of the Kelvin constant in word 6 of the word block involved and also the number stored in the accumulator register through the adder where they are added together and the result of the addition is fed into the AR register, the resultant number representing the Kelvin value of the temperature involved. In the next programming stage 338, 2 is subtracted from the number stored in the address register to restore the original or N block address.

Next, the above mentioned "0" detect programming stage is operated. This stage initiates operation of the "0" detect unit 126 (FIG. 7*a*) and feeds advance pulses to reverse shift pulse line A'P' of the AR register 114 as long as the decimal code group in the first stages thereof is the number 0. When the number therein is a number other than zero, the feeding of advance pulses ceases under control of the "0" detect unit 126. This "0" detect operation is necessary for the type of division computation to be performed by the system.

Following completion of the zero detecting operation, the next programming stage 340 is set into operation, which transfers the temperature data in the AR register to the data storage (DSR) register 104 via the adder. (This and practically all other transfer operations not involving an actual mathematical operation are effected through the adder, as above explained, by the addition of a 0 to the information fed to the adder.) The DSR register contains the divisor which, in the case where temperature compensation is not desired, is merely the number 1.

Next, the programmer through stage 342 makes inquiry as to whether pressure compensation is to be utilized. If not, the number 1 is transferred to the accumulator register by stage 343 which register is to contain numerical information of the dividend. In the average rate of flow formula, if no pressure compensation is involved, the absolute pressure part thereof may be replaced by the number 1 as in the case of the divisor above described.

If, on the other hand, pressure compensation is desired, the conditional transfer stage 342 initiates operation of programmer stage 346 which effects transfer of the address in the address register through the adder where 1 is added to the address, the resultant address being returned to the address register. The block address now is the address of the word block ($N+1$) containing pressure compensation information for the flow variable involved. The next stage in the programmer, stage 348, therefore transfers word 2 of the pressure block to the accumulator register. The next stage in the programmer, stage 350, effects the read-out of word 6 of the pressure word block to the adder simultaneously with the read-out of the pressure information in the accumulator register where absolute pressure is obtained by addition of atmospheric pressure to the gauge pressure transferred from word 2 of the block involved. The next stage, 352, restores the block address of the flow variable involved by adding 1 to the address in the address register.

The next stage in the programmer is a conditional transfer stage 354, which makes inquiry as to whether temperature compensation is desired or not. This inquiry is necessary because the programming branch just described may be entered whether or not there is temperature compensation and the program steps following this point in the program are somewhat different where temperature compensation is involved than where it is not involved. If no temperature compensation is involved, the "0" detector stage 356 is by-passed. If temperature compensation is desired, then the programming stage 356 is set into operation for a zero detect operation of the kind above described which insures that the code group in the accumulator register representing the most significant digit is a number greater than 0.

Next, the system performs a division operation under control of programming stage or stages 357 by dividing the absolute pressure information stored in the accumulator register by the Kelvin temperature information stored in the data storage register. FIG. 14 shows the various programming stages making up the division unit 357. The result of this division leaves the quotient in the multiplier-quotient (MQR) register 119.

The next operation to be performed is the multiplication of the result of the division just described by the drop in pressure across the orifice at the flow point in the system involved. As shown by the chart of FIG. 8, the numbers to be multiplied are initially stored in the multiplier-quotient (MQR) register and the data storage (DSR) register. The multiplication operation can be set up by transferring information on the drop in pressure across an orifice at the flow point in question to the data storage register. Accordingly, a programmer unit 360 following the division programming stage 357 is set into operation which transfers word 2 of the block address then stored in the address register, which is the OP flow variable involved, through the adder to the data storage register. Then a multiplying unit 362 comprising the programming stages shown in FIG. 15 is set into operation which multiplies $P/T$ by ΔP. The product of two 4-digit numbers is an 8-digit number and the four most significant figures of the product are stored in the accumulator register with the most significant digit in the second stages thereof and the four remaining digits in the four stages of the multiplier quotient register 119, the most significant digit being in the first stages thereof.

Next, a programmer unit 364 is rendered operative which obtains the square root of the numerical information now stored in the AR and MQR registers. This unit following the programming operations outlined in FIG. 16. The result of the square root operation appears in the data storage register.

The programming system through a conditional transfer stage 366 next makes inquiry as to whether a totals point is involved, that is, whether the rate of flow data just computed is added to the sum of other rate data to provide a measure of quantity of fluid flow. If a totals point is involved, a stage 368 is rendered operative which transfers the flow information out of the data storage register and into word 2 of the block address of the flow variable involved at the same time that the information is recirculated or re-entered into the data storage register.

Next a programming stage 370 reads out the address stored in the address register to the adder where the number 1 is subtracted therefrom and the result is entered into the address register so that information in the block following the data point involved, namely block number address 41 (N−1), FIG. 3, is available. Words 3 and 4 of this word block contain an 8-digit number representing quantity of flow since the beginning of the last hourly or other base period. The least significant four digits of this number appear in word 3 and the most significant digits being in word 4. In the case where rate variables to be integrated are involved, this total is increased by a current rate measurement periodically such as every 10 seconds.

In the next programming stage 372, the four digit number representing the current rate of flow in the DSR register is added to the four least significant digits in the adder and the result of the addition is read back into the registers AR and MQR which are connected in series in this case as an 8-stage shift register. The variable transferred from the DSR register is recirculated or re-entered into the DSR register. In general, when an 8-digit number is read into the serially connected AR and MQ registers, the most significant digit (which in many cases can be zero) is in stages 2 of the AR register and the least significant digit is in the last or MQC stages of the MQR register. Where the 8-digit number is to be readout of these registers as an 8-digit number, then the 8-digits must occupy stages 1—4 of the AR register and 1—3 of the MQR register because the last or MQC stages thereof has no output line leading into the main loop of information flow. Accordingly, a stage 374 is provided which shifts the AR and MQR registers one position in the direction of the most significant digit, namely toward the first stages of the AR and MQR registers.

The 8-digit number in the latter registers is then read out through the adder and into words 3 and 4 of the totalizing blocks in question. This is accomplished in programming stage 375. Following this, the original point address is restored in the address register by programming stage 377 where the address in the address register is read to the adder where 1 is added thereto, and the result read back into the address register. The program again enters the main programming stream from which it originally branched when an inquiry concerning total point was involved. It should be noted at this point, that totalizing of non-flow variables may be handled by this system and, in this case, the side branch portion involving the totalizing operations of stages 370, 372, 373, 375 and 377 may be entered via the "N" line extending from the conditional transfer stage 323 (FIG. 10*a*) previously mentioned. In such case, the latter stages add the current data value in the storage register representing the value of the variable then being scanned to words 3 and 4 of the data block following the data block containing the value of the variable involved.

The next operation to be performed is the alarm detection operation previously alluded to. To this end, stage 379 is rendered operative. Programmer stage 379 effects the read-out of word 3 from the drum of the block address involved through the "and" gate 97*b*, complementer (FIGS. 7*a* and 7*b*) via lines L6 and L4. Simultaneously, the data value is read out from the data storage register and fed through "not" gate 97*a* to the adder 16*b* via lines L6 and L2. A subtract pulse is fed through gate 12*a* to the complementer so that the lower alarm limit is subtracted from the data value. If the result of this subtraction is a negative number, then this indicates that the variable is abnormal. If the result of the subtraction is a negative number, then a signal is passed through a gate 36 to the sign storage unit 37 which via a gate 36' sets the flip-flops associated with the conditional transfer circuits such as the one associated with stage 383, inquiring whether an alarm detection is involved, such as stage 383. The result of the above-mentioned subtraction operation is read into the accumulator register.

The next stage 381 in the programmer determines whether the variable has exceeded the upper alarm limit, which becomes pertinent only if the variable value was at least higher than the lower alarm limit in the first above mentioned alarm detect operation. To effect this result, the alarm differential value stored in word 4 of the block address involved is subtracted from the number in the accumulator register which represents the result of the first subtraction operation. It can be shown that if the second subtraction results in a positive number the variable value has exceeded the upper alarm limit thereof. In this case, the alarm differential information from the drum is passed through the "and" gate 97*b* leading to the complementer 16*a* whereas the numerical information in the accumulator register is passed via lines L6 and L2 directly to the adder 16*b*. The result of the subtraction operation is not read into any part of the system but is merely destroyed as it is read out of the adder. If an abnormal variable is detected, then the sign storage unit 37 is set to indicate an abnormal variable condition. The sign storage unit 37 will, in turn, via a gate 36'' set the flip-flop associated with the next stage 383 and others which inquire whether the variable scanned is abnormal. If the variable is abnormal, then the "T" line of stage 383 is energized to set an off-normal summary conditional transfer stage 382 into operation which stage inquires as to whether an off-normal summary has been requested. As above explained, an off-normal summary is initiated by depressing a button on the keyboard which requests a printing-out of all variables which are abnormal at that time. In the present example, it is assumed that such an off-normal summary has not been requested. Therefore, when the variable is abnormal, the "N" line of the conditional transfer stage 382 will be energized to initiate operation of the following conditional transfer stage 387, which stage inquires whether the variable was abnormal during the previous scanning cycle. This information is obtained from the units digit of the instruction stored in the instruction register at that time. If the variable was normal when previously scanned, then this indicates that a new abnormal variable is involved, which requires print-out of such abnormal variable data. Otherwise, if the instruction indicates that the variable was abnormal when previously scanned, it is unnecessary to read this information out since it already has been printed out during the previous or some other previous scanning cycle. If the latter is the case, then the "T" line is energized which joins the main programming stream at the input to the conditional transfer stage 316 previously mentioned.

If, on the other hand, a new abnormal variable was scanned, then the "N" line will be energized which initiates operation of an off-normal summary conditional transfer stage 390 which inquires whether an off-normal summary has been requested. Since it was not requested, the "N" line will be energized to initiate operation of an alarm memory conditional transfer stage 392 which inquires whether the variable when last scanned was abnormal. If it was abnormal when last scanned, then a new return to normal status of the variable is present and, as above explained, this requires a read-out of such information during the alarm scanning cycle. Then, the "T" line will be energized which initiates operation of the last-mentioned branch from the main stream of the programming system. Otherwise, if the variable was still normal when last scanned, the "N" line of the conditional transfer stage 392 is energized to initiate operation of the main stream conditional transfer stage 316.

The first stage in the last-mentioned branch of the programmer is a flow point conditional transfer stage 394 which makes inquiry as to whether a flow point is involved. In our example, since a flow point is involved, the "T" line will be energized to initiate operation of a totals point conditional transfer stage 396 which stage inquires whether the flow point is one to be totalized. In some instances, only instantaneous rate of flow information is desired, in which case although a flow point is involved, it is not a point whose data is to be totalized. However, in our example, it is assumed that a totals flow point is involved so that the "T" line of this stage is energized.

Figure 10C:
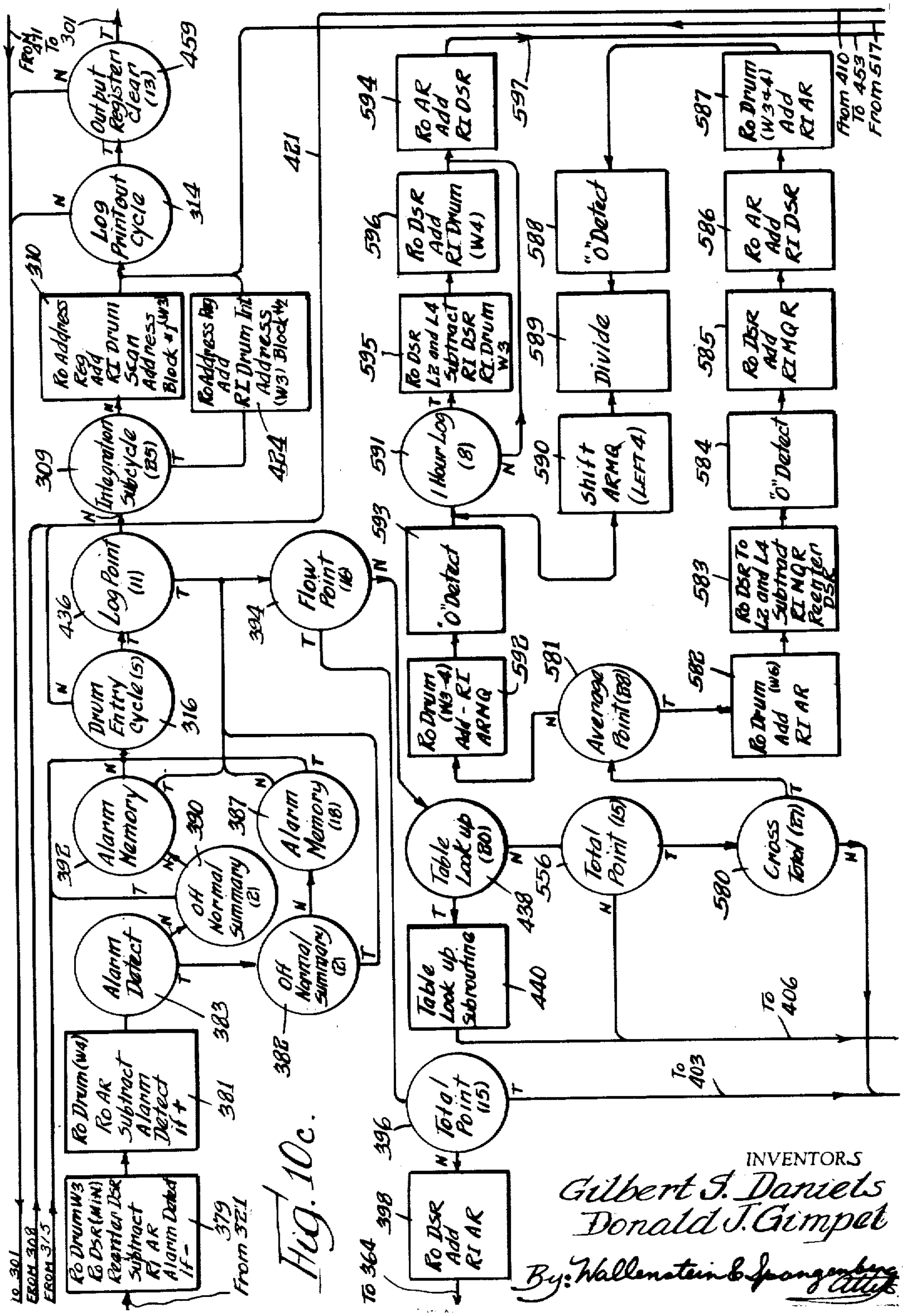
Figure 10D:
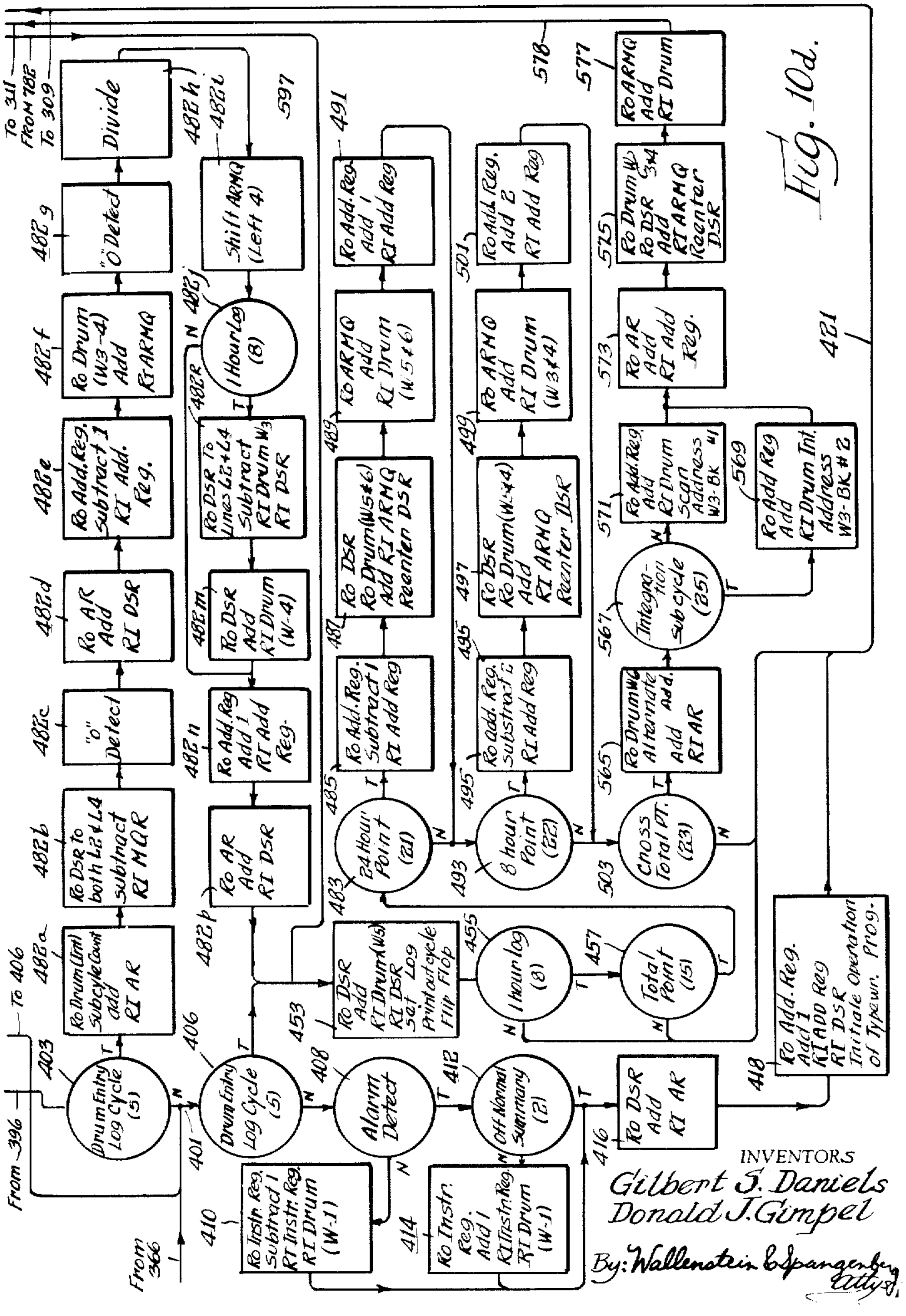
Figure 10E:
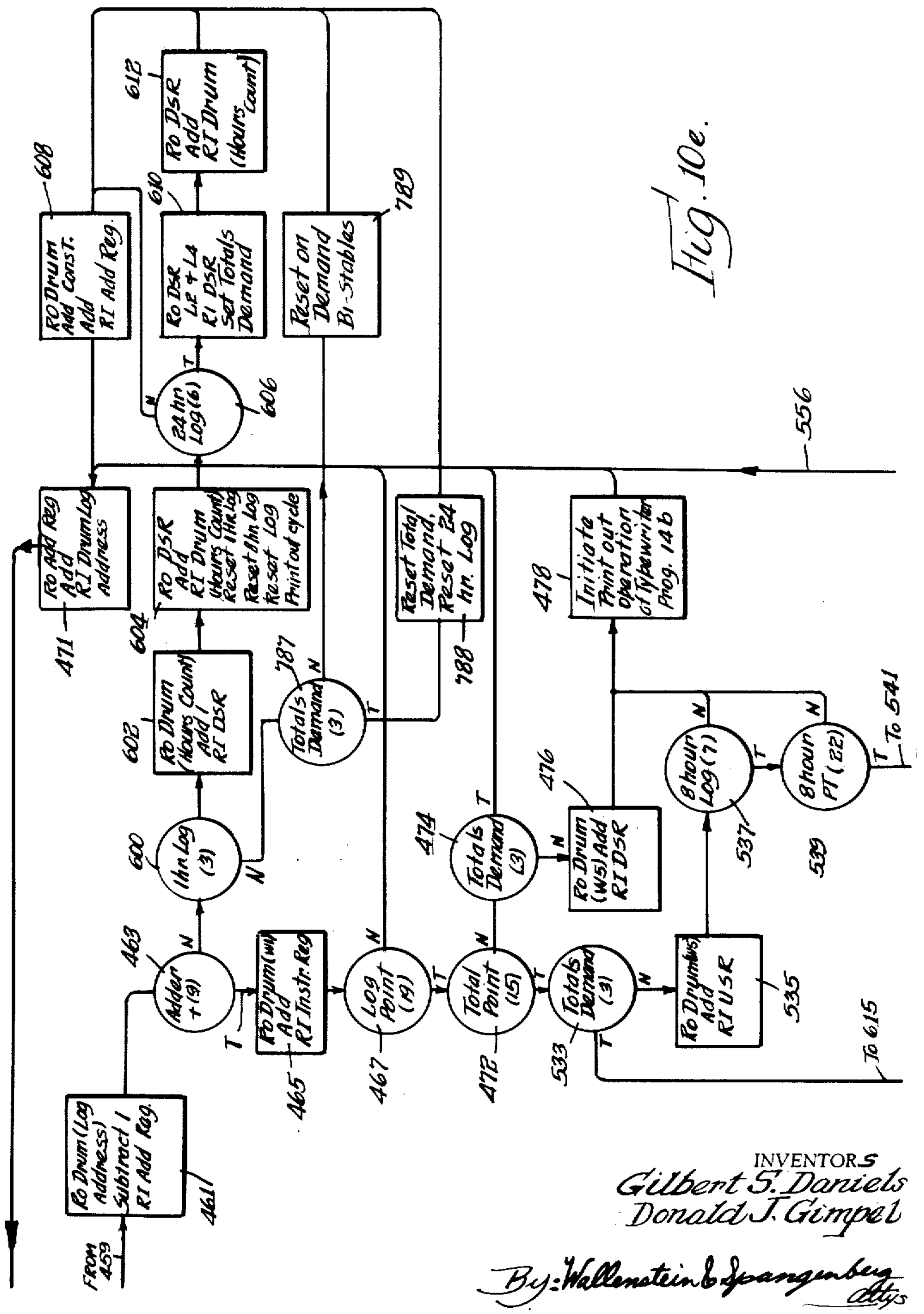
Figure 10F:
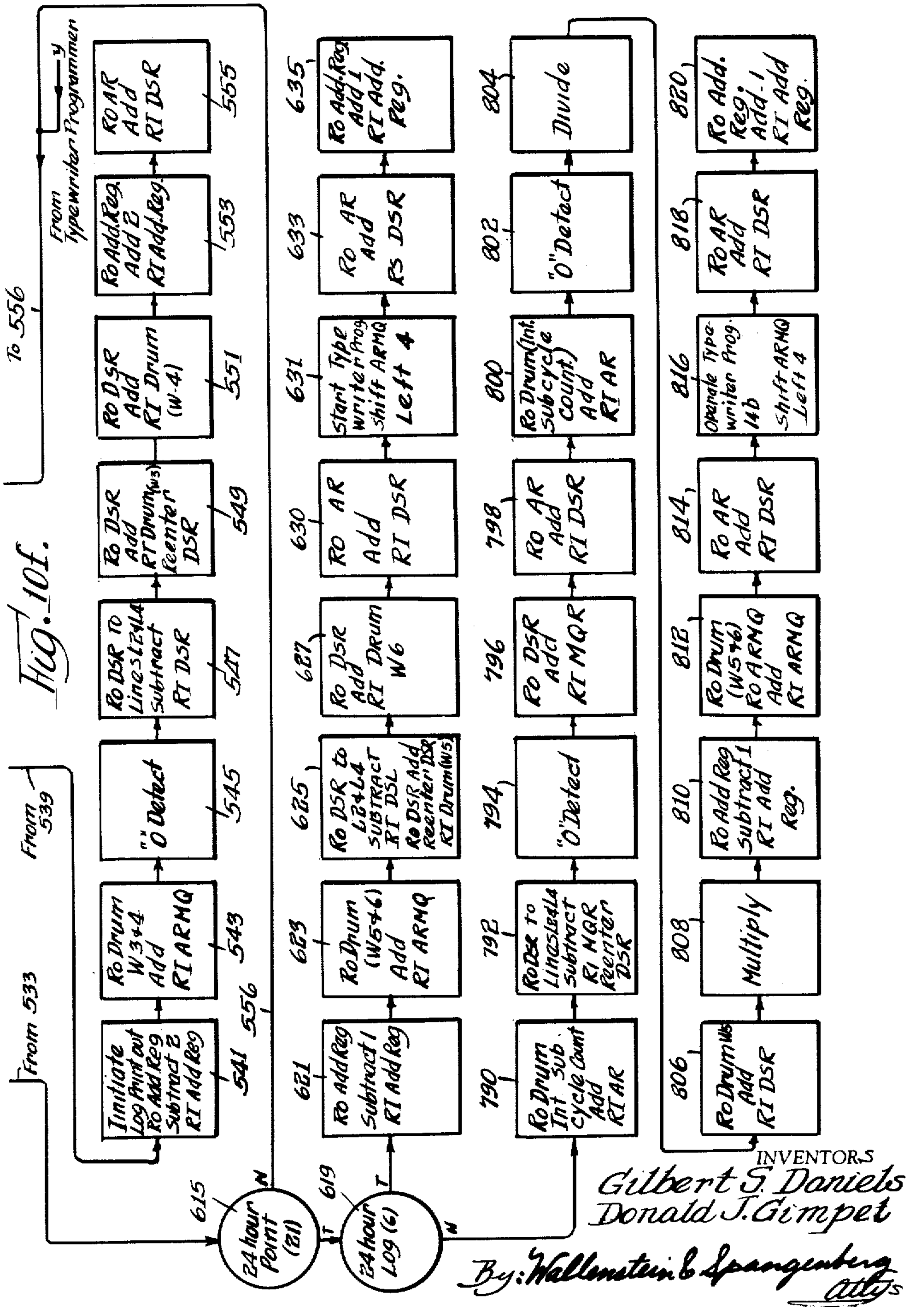

If the flow point does not require totalization, a square rooting operation is necessary to convert the differential pressure measurement to rate of flow. Thus, in such case, the "N" line of the stage 396 will be energized to initiate operation of a programming stage 398 which reads out the differential pressure information from the data storage register into the accumulator register. Stage 398 then initiates operation of the square root programming stage 364 (FIG. 10*b*) where the square root of the differential pressure is obtained. In the subsequent stage of this portion of the programmer, the totals point conditional transfer stage 366 is encountered, and, since the variable involved is not to be totalized the "N" thereof will be energized, which line re-enters the branch above mentioned at point 401 (FIG. 10*d*).

Returning to the totals flow point example, when the "T" line of the conditional transfer stage 396 (FIG. 10*c*) is energized, this will initiate operation of a conditional transfer stage 403 (FIG. 10*d*) which inquires whether a drum entry log cycle is involved. If such was the case, then the "T" line of this stage would be energized to initiate operation of a time-compensation sub-branch to be described in more detail hereinafter. In the present example, a drum entry log cycle is not involved so that the "N" line will be energized to initiate operation of another conditional transfer stage 406 which makes the same inquiry as the stage 403, the necessity for this stage being necessary because of the entry into the branch stream of the output of another programming section at point 401.

In the case at hand, the "N" line would be energized to initiate operation of a conditional transfer stage 408 which makes inquiry as to whether the variable is abnormal. Although this inquiry was previously made in the present example to enter the branch of the programmer involved, nevertheless, as above explained, this branch may be entered under circumstances not involving an abnormal variable which would require an inquiry of the alarm condition of the variable at this point. If the variable was normal, the "N" line is energized which initiates operation of a programming stage 410, which modifies the instruction in the instruction register to indicate that the variable is normal.

As indicated in the instruction word format in FIG. 4, if the units digit of the instruction word is the number one, then subtracting one from this will give the number zero which is the code number for indicating a no-alarm condition for a variable which is to be scanned only. If the variable is to be both scanned and logged, then if the variable is abnormal the units digit of the instruction word is the number 3. If one is subtracted from this number, the number 2 results, which indicates no alarm for a variable which is to be scanned and logged. It can be shown that the programming stage 410 is only rendered operative for a variable which when previously abnormal has returned to normal. The programming stage 410 thus effects the read-out of the instruction word from the instruction register through the adder where one is subtracted therefrom whereupon a new instruction word is re-entered into the instruction register at the same time that a new instruction is read into word one of the drum block at the address involved. However, in our example, a variable which was previously normal has just become abnormal so that the "T" line of the conditional transfer stage 408 was rendered operative. This initiates operation of the off-normal summary conditional transfer stage 412 which inquires whether an off-normal summary has been requested. If not, the "N" line is energized to initiate operation of the programmer stage 414, which adds one to the units digit of the instruction word so that the instruction then indicates that the variable is abnormal. Thus, the programming stage 414 effects the read-out of the instruction word from the instruction register and feeds it through the adder where one is added thereto, and then the result of the addition is read back into the instruction register and also into word one of the drum word block involved. The output of the programming stage 414 initiates operation of a programming stage 416 as does the "T" line of the off-normal summary conditional transfer stage 412.

The programming stage 416 effects the read-out of the variable value from the data storage register through the adder and into the accumulator register. Following this, the next stage 418 of the programmer is rendered operative, which effects the read-out of the number in the address register through the adder and into the data storage register. The reason for this transfer of the address to the data storage register is that, except during on-demand read-out or hourly read-out periods, a number identifying the variable involved is printed by the scan output typewriter **6*b* before the data information. Since the output register 17 is connected only to the output of the data storage register 104**, it becomes necessary to transfer the data value previously stored in the data storage register to some other point in the system, namely the accumulator register, so that the block address of the variable involved can be transferred into the data storage register for read-out to the recording device.

The programming stage 418 performs a number of functions. Among these, is the initiation of operation of the typewriter programmer **14*b*** (FIG. 7*a*) which controls the sequence in which information is transferred to the scan output recording device. In this case, the typewriter programmer will open one of the gates **114*a*, 114*b* or 114*c* and gates 143*c* to transfer the proper identification symbols to identify the type of variable to the scan output device 6*b*. Then it will operate the gates 11*a*, 11*b*, 11*c* and 11*d* at the output of the data storage register and gates 143*a* at the input to the typewriter 6*b*** to transfer the address (point identification) information therein to the output register 14 and then to the typewriter 6*b*. Then, after sufficient time is provided for effecting this printout, the typewriter programmer opens gates 143*b* to effect the transfer of time information from clock register 107 to the typewriter 6*b* and effects the transfer of the data value from the accumulator register, back into the data storage register, where this data value is likewise transferred to the output register and the typewriter 16*b*. The typewriter programmer will be described in more detail later on.

Following the transfer of the data information in the data storage register to the output storage register, the system is then free to continue alarm scanning of the variables.

Programming stage 418 is connected to programming stage 309 (FIG. 10*c*) in the main stream of the programmer via line 421. Stage 309 inquires whether an integration subcycle is involved.

If an integration sub-cycle is involved, which is the case in the present example, the stage 309 provides an output signal on its "T" line which initiates operation of a programming stage 424, which restores the (integration) address stored in the address register into word position of the first block of the drum. If an integration sub-cycle was not involved, then the "N" line at the output of the register stage 309 will be energized to initiate operation of the programmer stage 310 which restores the scan address in the address register to word 3 in the first block of the drum. In this way, the drum stores information on the last variable or address block scanned. The outputs of the adjacent programming stages 310 and 424 both lead to a conditional transfer stage 314 above described which, if a log printout cycle is not involved, sends a signal back to the master reset programming stage 301 via "N" line to initiate another cycle of operation of the programmer where another variable is scanned.

As above outlined, it was assumed that the integration variables occupy the last 50 word blocks in section B of the drum. Furthermore, the scanning of other variables is interrupted periodically so that the integration variables can be scanned regularly to obtain integrated data which is stored in totalizing word blocks of the drum. This interruption of the normal scanning of non-integration variables is obtained by any suitable means, such as a clock which periodically sets a master flip-flop circuit (not shown) which in turn sets the various flip-flop circuits associated with the integration sub-cycle conditional transfer stages, such as stage 304 and others. As long as these stages indicate an integration sub-cycle, the address transferred to the address register in each programming cycle will be the integration address word stored in word 3 in the first block of the drum. When all integration variables have been scanned, then the flip-flop circuits controlling these conditional transfer stages are reset and the address constant is transferred from word position 5 of block 1 of the drum to word position 3 of block 1 of the drum.

To review the sequence of programming steps necessary at the termination of an integration sub-cycle, reference should again be had to FIG. 10*a* and conditional transfer stage 304. When block address 0 is in the address register, the subtraction of one from the number zero by the programming stage 312 will be a negative number so that the inquiry of the conditional transfer stage 313 would result in the energization of the "N" line thereof. This would initiate operation of a programmer stage 427 which reads out the integration address constant 50 from the drum in word 5 of block No. 2 thereof, passes the same through the adder and into the address register in preparation for transfer of this address into word 3 of block No. 2 of the drum. The stage 427 also resets the above-mentioned flip-flop circuits associated with the conditional transfer circuits which inquire about the integration sub-cycle, such as conditional transfer stage 304.

Next, the programming stage 429 is operated which reads out the integrator address constant from the address register, passes the same through the adder and then enters the same into word 3 of block No. 1 of the drum.

As above indicated, the number of integration subcycles in each hourly period is memorized for purposes of time compensation to be explained hereinafter. Accordingly, the next programming stage 431 transfers out the integration cycle count number from word 6 in block No. 1 of the drum, passes the same through the adder where one is added thereto, and the result is read into the data storage register in preparation for re-transfer to the drum.

The next programming stage 433 reads out the numerical information in the data storage register, passes the same through the drum and effects the entry of the integrator cycle count number in word 6 in block No. 1 of the drum. The output of the programming stage 433 enters the main programming stream ahead of the master reset stage 301 to initiate a new cycle of operation of the system.

*Part C—Drum entry log cycle—Linearization*

As previously explained, in addition to the normal alarm scanning cycle which includes the integration subcycle above outlined, regularly, such as hourly, data on all log points are printed out independently of whether the points are alarm points. Also, the present system has provision for printout of all log points at any particular time desired by depression of an on-demand push button associated with the keyboard. The only basic difference between an on-demand programming cycle and the regular hourly printout cycle is that in the former situation no change is made in of 8 and 24 hr. totals information. It should be understood that there are various flip-flop circuits which are set at hourly, 8-hourly and 24-hourly intervals to effect the operation of the 1, 8 and 24-hour totalizing operations.

In the portion of the drum entry log cycle, now to be described, it will be assured that a non integration variable is being scanned, such as a temperature variable, requiring linearization. As previously explained, alarm detection operations are performed on unlinearized values even when non-linear thermocouple outputs are involved. Linearization is effected only during a printout programming sub-cycle.

In the early stages of the programming cycle involved, the hourly or on-demand drum entry log cycle follows the normal programming sequence previously explained in connection with normal alarm scanning operations except that where the variable is not a totals or flow point certain branches of the programmer are not used. In fact, none of the conditional transfer stages even inquire about a drum entry log cycle until stage 316 (FIG. 10*c*). At this point, if such a cycle is involved, the "T" line of the programming stage 316 is energized to initiate operation of a conditional transfer stage 436 which inquires whether the block address involved contains data on the value of a log point. As previously explained, log points are, in general, those points (variables) which have their values printed out hourly. They include hourly totals variables and most variables monitored by the transducers. Examples of drum block which do not contain data on log points are blocks 1 and 2 and blocks containing temperatures and pressures of flow points ($N+1$, $N+2$ adresses) which are used only in the computing of flow rates and are not printed out as separate variables. If a log point is involved, then the above-mentioned printout branch is entered at the input to flow-point conditional transfer stage 394. Let it be assumed that a non-flow variable is involved so that the "N" line of this stage is energized to activate a conditional transfer stage 438 which inquires whether the variable requires linearization, that is, requires table look-up in drum section C. The information which sets the flip-flop circuit associated with this programmer stage is obtained from the instruction word, as shown in FIG. 4. In such case, the "T" line thereof is energized to initiate operation of a table lookup sub-routine programming stage 440 shown in detail in FIG. 17.

As shown in FIG. 17, the "T" line of the conditional transfer stage 438 extends to three parallel branch circuits each containing an "and" gate 442*a*, 442*b* or 442*c* which is controlled by the instruction in the instruction register. Each of these branches is rendered active when a particular type of transducer requiring a particular linearization table is scanned. The output of the "and" gates are connected to respective programming stages 444*a*, 444*b* and 444*c* which effect the feeding of block addresses of the first blocks of three different linearization table sections from the linearization constants register 45 (FIG. 7*b*) to the units, tens and hundreds comparison matrices 52, 53 and 55. In the exemplary system being described, there are three different linearization tables in a single 5-track section of the drum and the first word blocks of the tables are at block addresses 149, 119 and 99, respectively.

Figure 6:
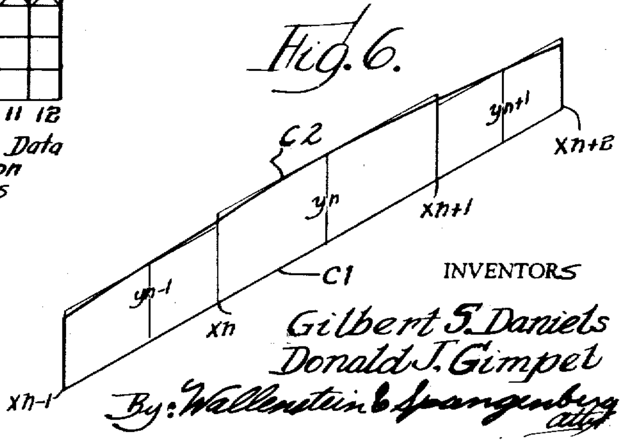
FIG. 6 is a diagram illustrating the manner in which linearization correction factors are determined.

As previously indicated, word one of each two word block in linearization section C of the drum represents the first point on the apparent output curve C of the transducer involved (FIG. 6). This word is subtracted from the value of the variable stored in the data storage register by the next stage 44*b*, and the variable data is re-read into the data storage register via gate 110*a* (FIG. 7*a*).

The next stage of the programmer is a conditional transfer stage 448 which inquires as to the sign of the subtraction operation just mentioned. If the subtraction has a positive sign, then the "T" line is pulsed which initiates operation of the programming stage 450 which transfers the block address then in the linearization adress register 45*b* (FIG. 7*b*) through adder 16*b* where one is subtracted therefrom and the result of the subtraction read into the address register 45*b* so that the first word in the next block may then be transferred out from the drum and subtracted from the variable value in the data storage register under control of programming stage 44*b* again. To this end, the output line of stage 450 is connected to the input of programming stage 44*b*. Thus, the numerical data representing successive points on the apparent characteristic curve C1 of the transducer are subtracted from the value of the variable until the result of the subtraction is a negative number whereupon the "N" line of conditional transfer 448 is rendered operative to start a programming stage 482 into operation. When the result of the subtraction is negative, this indicates that the proper segment of the curve has been located. Programming stage 482 effects the readout of word 2 of the block address in the linearization storage register (word 2 being the correction factor to be added to the data value), and the apparent data value in the data storage register to the adder where addition is performed to obtain the actual data value which is fed to the data storage register. On completion of this stage of operation, the drum entry log cycle conditional transfer stage 406 is set into position. This stage inquires whether a drum entry log cycle is involved. If it is, then the "T" line of this stage is pulsed to initiate operation of the programming stage 453 which effects the reading out of the linearized value in the data storage register through the adder and into the word five position of the drum at the block address stored in the main address register 40.

At the same time, a flip-flop (not shown) associated with the condtional transfer stage 314 (FIG. 10*c*) which inquires whether a log printout cycle is involved, is set to indicate that a log printout cycle is involved. Next, a conditional transfer stage 455 (FIG. 10*d*) is set into operation which stage inquires whether a one hour log is involved. As previously indicated, a drum entry log cycle is possible between the regular hourly recording intervals and in such case the "N" line of this register would be energized. The circuit associated with stage 455 is set at the beginning of each hourly log period.

Assuming that a one-hour log cycle is involved, then the "T" line of stage 455 is rendered operative to initiate operation of a total point conditional transfer stage 457. If a total point is not involved. as in the present example, then the "N" line is energized which joins line 421 leading to conditional transfer stage 309 (FIG. 10*c*). Stages 309, 310 or 309 and 424 are set into operation as above explained for the purpose of restoring the block address in the main address register at that time to the proper position in block No. 1 of section B of the drum.

Next, the log printout cycle conditional transfer stage 314 is operated; and, since the flip-flop associated with this stage has just been set to indicate a log printout cycle, a pulse appears on the "T" line thereof to initiate operation of the conditional transfer stage 459 which inquires whether the output register 17 is clear. This may be determined by apparatus (FIG. 7*a*) including a flip-flop circuit 458*a* and an "and" gate 458*b*. The flip-flop circuit 458*a* is set to indicate a "no-clear" position when information is initially transferred from the data storage register to the output register. The gate 458*b* is opened upon the transfer of the last word element out of the output register to pass a reset pulse to the flip-flop circuit 458*a* which sets it into its "clear" position. If the output register is not clear, then the "N" line will be energized which line extends to the input of the master reset stage 301 to initiate a new programming cycle. Any delay in printing out of the log information does not affect the accuracy of the information subsequently printed out because this has been stored in word five of the block address associated with the variable involved.

Assuming that the output register was cleared, then the "T" line of the conditional transfer stage 459 is energized which initiates operation of a programming stage 461 (FIG. 10*e*) which now transfers word four of block one of section B of the drum which word is the address constant or, if this portion of the programmer has been previously entered during the log printout cycle involved, is the address last handled thereby. It should be remembered, however, that this block address may not actually be a log point since all block addresses are scanned in the present programming arrangement where the block addresses are obtained by subtracting one from the previous block address. Thus, the programming stage 461 reads the log address in word four of block one through the adder where one is subtracted therefrom and the result of the subtraction is read into the address register 40. Next, a conditional transfer stage 463 is rendered operative which inquires as to the sign of the subtraction so that a determination as can be made to whether a log printout cycle has been completed. If the result of the subtraction is positive, then this indicates that a log printout cycle is not over, and the "T" line of stage 463 will be energized which initiates operation of the programming stage 465 which effects the readout of instruction word one of the block address in the address register through the adder and into the instruction register. As previously indicated, the instruction indicates the nature of the point or variable being scanned, among other things.

The next stage to be set into operation is a conditional transfer stage 467 which inquires whether the point is a log point. If it isn't, then the "N" line is energized, programming stage 471 is rendered operative which programming stage transfers, the log point address from the address register through the adder and back into the word four position of the first block of the drum. The output of the programmer stage 471 extends to the re-cycle line which joins the input of master re-set programming stage 301 (FIG. 10*a*) to initiate a new cycle of operation of the programmer.

In our example, however, a log point was involved so that the "T" line of the transfer stage 467 would be energized to initiate operation of a conditional transfer stage 472 which inquires whether a totals point is involved. In the present example a totals point was not involved so that the "N" line thereof would be energized to initiate operation of a conditional transfer stage 474 which inquires whether a totals demand is involved. As above explained, a totals demand is a demand for a printout of all totalized variables at any time the totals demand button associated with the keyboard is depressed. Since this is not the case in the present example, the "N" line of the conditional transfer stage 474 will be energized which initiates operation of a programming stage 476. This stage reads out from the drum word five of the block address in the main address register which is the number indicating the linearized or final variable value to be printed out.

Next, the programming stage 478 is rendered operative which stage initiates the actual printout of the information in the data storage register by initiating operation of the typewriter programmer **14*b* which transfers the data to the output storage register and then through gate 144*a* leading to the log output device 6*a*. Since alarm scanning may continue during the period the information in the output storage register is being fed to the typewriter, stage 478 need not wait for the completion of all of the printing before a new stage of the programmer is rendered operative as long as the data storage register has been cleared by transferring its data to the output register. Then, the next programming stage 471 is rendered operative which stage, as previously indicated, transfers the address from the address register back to word four position, in the first block of drum section B. A new programming cycle is then initiated as a pulse appears on the re-cycle line leading to the master re-set stage 301**.

The example just illustrated was with regard to a point or variable to be linearized but not totalized during an hourly printout. Now, the programming sequence for a drum entry log cycle for a flow variable which is to be totalized will be described. Refer again to FIG. 10*c*, and the conditional transfer stage 394 which inquires whether the block address in the address register 40 contains flow data. In the programming system illustrated, it is assumed that flow points are not points requiring linearization, as is common with temperature variables measured with thermocouples. Conditional transfer stage 394 inquiring whether a flow point is involved will provide a pulse on the "T" line thereof. This initiates operation of the conditional transfer stage 396 which inquires whether a totals point is involved. Since it is, the "T" line of this stage will be energized to initiate operation of the conditional transfer stage 403 (FIG. 10*d*) which inquires whether a drum entry log cycle is involved. Since it is, the "T" line thereof is energized to initiate operation of a programming stage **482*a* which is one of a series of stages 482*a* to 482*p*** which introduce a time compensation factor in the integrated flow value for the variable involved. This is important for an "on-demand" readout where the operator wants the status of the system before the next hourly period.

It has been found desirable to provide numerical information of an extrapolated flow or an average flow rate over a period covered by the actual integrated flow measurement involved. This gives the operator a good idea on how well the system is meeting a given production goal. By inserting a suitable conversion constant at any point in the system, each flow rate measurement itself can be given in terms of extrapolated flow at that rate over say, an hour base period. Then, true average flow or extrapolated flow over the base period, can be obtained by dividing the integrated value by the number of flow rate measurements making up the total involved. For example, taking a flow rate of one gallon per integration cycle (e.g. 10 seconds) or 360 gallons per hour, the integrated flow quantity covering two integration cycles would be 720 gallons for a rate measurement based on an hourly period. The average rate of flow remains, however, at 360 gallons per hour. What the operator may want to know, however, is not total flow since the last regular, such as hourly period but rather an average flow rate or an extrapolated value of the flow at the end of the hour of the average flow rate for the rest of the hour is the same as that since the beginning of the current hour. This gives him a better idea on the over-all condition of the point of the system being monitored. If the constants of the system are such that the output derived from a transducer measuring flow rate (pressure differential) would result in the typing of the number 360, standing for 360 gallons per hr. for each unit of flow rate taken every ten seconds, then an average flow rate or extrapolated flow can be obtained by merely dividing the integrated flow rate measurement by the number of integration subcycles involved.

Returning to Fig. 10*d*, programming stage **482*a* effects the readout of the integrator subcycle count from word 4 of the second block of the drum and the transfer thereof through the adder and into the accumulator register where the 4-digits occupy stages 2 through 5 of this 5-digit register. Next, stage 482*b* transfers the numerical information in the data storage register simultaneously through lines L2 and L4 as a subtraction operation is performed so that a zero can be provided which is read into the MQR Register for the purpose of setting the register up for a division operation. The next programming stage is a "0" detect stage 482*c*** which, as in other "zero" detector stages, shifts the numerical information in the AR and MOR registers which are utilized together as a 9-digit shift register toward the first stage of the register until a number other than "zero" appears in the first stage, and then all numbers are shifted one position downward, that is, to the next highest stage. This leaves the most significant number (number other than zero) of the subcycle count number in the second stage register.

The next programming stage **482*d*** transfers the internal subcycle count number from the accumulator register into the data storage register via the adder, it being remembered that in a division operation the divisor is always stored in the data storage register.

The next programming stage set into operation is a stage **482*e* which reads out the address from the address register to the adder where 1 is subtracted therefrom and the result is read back into the address register so that the $N-1$ block on the drum may be located. The next programming stage 482*f*** effects the readout of words 3 and 4 containing the 8-digit totals number representing total flow (in terms of an hour base period, for example), since the beginning of the last hour, through the adder to the registers AR and MQR operated together as a 9-digit shift register.

In the next stage **482*g*, another "0" detect operation is performed just as in stage 482*c*. The next stage 482*b* carries out a division operation in accordance with the detailed programming shown in Fig. 14. As indicated by the latter figure, the quotient of a division operation ends up in the MQR register so that it is necessary to shift the 4 digits in this register 4 places upward or to the left so that these digits are in stages 2 through 5** of the accumulator register from which they may be readout to the data register or some other place for storage.

Next, a conditional transfer stage **482*j* is set into operation which stage inquires whether a one-hour log is involved. If it is not, the input to a programming stage 432*n* is pulsed. Otherwise, the "T" line of the conditional transfer stage 482*j* is pulsed initiating operation of a programming stage 482*k*. This stage creates a zero by reading out the information in the data storage register simultaneously to the two adder input lines L2** and L4 where a subtraction operation is performed, the resultant zero being read both into the data storage register and also into word 3 of the $N-1$ address involved. Next the programming stage 482m is rendered operative which stage transfers the zero in the data storage register to word 4 of the $N-1$ block of the drum.

The next programming stage 482n restores the address to the N block address by reading out the address in the address register through the adder where 1 is added thereto and the result is read back into the address register. In the next stage 482p, the numerical information in the accumulator register is read through the adder into the data storage register. Now, information on average flow over the time period involved is present in the data storage register, preferably based on an hourly period, that is so many gallons, etc. per hour average flow rate. The output line of programming stage 482p is connected to the input of the programming stage 453.

Programming stage 453 reads into word 5 position of the "N" block address involved the value of the variable in the data storage register and sets a flip-flop stage associated with the log printout cycle transfer stage 311 (FIG. 10c) to a log printout cycle indicating condition. As previously indicated, the next stage set into operation is the conditional transfer stage 455 which again inquires whether a one-hour log is involved. Since it is, the "T" line is energized which initiates operation of a conditional transfer stage 457 which inquires whether the point is a totals point. Since it is, the "T" line thereof is energized to initiate operation of a series of programming stages which perform various totalizing operations.

The first stage set into operation is a conditional transfer stage 483 which inquires whether the point involved is one in which 24-hour totals are obtained. If so, then the totalized flow during the previous hour must be added to the 24-hour total stored in the $N-1$ word block. Upon energization of the "T" line, the programming stage 485 is rendered operative which stage reads out the main block address from the address register through the adder where one is subtracted therefrom and the result is read back into the address register so that the $N-1$ block may be reached. Then, under control of a programming stage 487, the current hourly totalized value stored in the data storage register and words five and six, representing an eight-digit number which is the previous 24-hour total for the point involved, are added together in the adder and the resultant sum is fed into the accumulator register and the MQR regiser connected in series to form an eight stage shift register. The eight digits occupy stages 1–8 of the AR–MQR registers. Stage 487 also recirculates the current hourly totalized value into the data storage register. It should be remembered that at the end of each hourly period the time compensated value determined by the series of stages 482a–482p and transferred to the data storage register by stage 482p actually represents total flow for the hour.

Next, the eight digit 24-hour total number is read out from the last-mentioned registers through the adder and into the drum where the number is stored in word positions five and six of the $N-1$ address block under control of a programming stage 489. Next, by means of a programming stage 491 the address in the address register is restored to the "N" block address by passing the address in the address register through the adder where one is added thereto and the result fed back into the address register. Then, a conditional transfer stage 493 is rendered operative through an input line which is also joined by the "N" line of the 24-hours point conditional transfer stage 483. Conditional transfer stage 493 inquires whether the point involved is one in which eight-hour totals are obtained. If it is, then the "T" line is energized and a series of programming stages 495, 497, 499 and 501 are set into operation which correspond in function to stages 485, 487, 489 and 491 just discussed wherein the eight-hour totals are transferred from the proper word and block position on the drum and from the data storage register through the adder where a new eight-hour total is obtained, and then this new eight-hour total is transferred into the proper position in the drum. The only difference is that the eight-hour totals block address is the $N-2$ address so that the digit 2 must be subtracted from the main address rather than the digit 1 to gain access to the block containing the eight-hour totals.

Following the eight-hour totalizing operation, the conditional transfer stage 503 is rendered operative which stage inquires whether a cross totals point is involved. As previously indicated, a cross totals point is a point or variable whose hourly total values are to be added to the hourly totals values of other points. Assume that the flow point in question is not a cross totals point then, the "N" line of the conditional transfer stage 503 is energized and the main stream of the programmer is entered via line 421 above mentioned which joins the input to the conditional transfer stage 309.

The explanation of the operation of the programmer now follows the explanation given above for a non-flow, non-totals point through stages 309, 310, 424, 311, 459, 461 (FIG. 10c), 463, 465, and 467 until stage 472 is reached. These stages are preparing of printout of log points. This stage, as above mentioned, inquires whether a totals point is involved. Since, in the present example, a totals point is involved, the "T" line is energized initiating operation of a conditional transfer stage 533 which inquires whether totals demand operation is involved. This answer is obtained from a flip-flop actuated by the totals-demand key on the keyboard, and, if the answer is in the affirmative, the "T" line is energized. However, since a totals demand operation is not involved, but an hourly log printout cycle is involved, the "N" line is energized which initiates operation of a stage 535 which effects the readout from the drum of word five of the block address (log point address) in the main address register which word information passes through the adder and into the data storage register. Word five, it should be noted, is a word which represents the numerical value of the variable represented by the log address in the address register.

The next stage set into operation is a conditional transfer stage 537 which inquires whether an eight-hour log is involved, that is, whether eight hours have passed since the last eight-hour log, this stage being under the control of a suitable timing source in the case of the other hourly, eight and twenty-four hour conditional transfer stages. If an eight-hour log is not involved, then the "N" line is energized which initiates operation of the above-mentioned initial log printout programmer 478 which effects operation of the typewriter programmer to be described which effects the readout of the log value word into the output register and then to the log output typewriter 6a. As soon as the data shift register is clear, the next programming stage 471 is immediately rendered operative.

If, on the other hand, an eight-hour log is involved, then the "T" line of stage 537 is energized which initiates operation of a conditional transfer stage 539 which inquires whether an eight-hour point is involved, that is whether the "N" block address has an eight hours' total ($N-2$) block address. In the case of the $N-1$ and $N-2$ totals blocks for any totals point, the instruction words therefore indicate that they are not treated as log points since data in these blocks is obtained only at a time when the associated "N" block address is then in the address register. This information can be obtained from the instruction in the instruction register which indicates whether eight hour totals are obtained. If it is not, then the "N" line is energized which line joins the input line to the initial log printout programming stage 478 which initiates the printing out of the data in the data storage register by operating the typewriter programmer 14*b* which effects the printout of the data value (word 5) then in the data storage register.

If the block address involved is an eight-hour totals point, then the "T" line of stage 539 is energized to initiate operation of the programming stage 451 (FIG. 10*f*) which initiates the printout of the data information (word 5) then in the data storage register by operating typewriter programmer 14*b*. Stage 541 also initiates the readout of the address in the address register to the adder where two are subtracted therefrom, the result being read back into the address register. Now, the *N*—2 totals block address is in the address register so that access to the eight-hour totals information may be obtained. Next, programming stage 543 is rendered operative which reads out words three and four from the *N*—2 block into stages 2–9 of the accumulator register and MQR registers connected together as an active 9-stage shift register. Words three and four may represent an eight digit number, and, the information to be printed out is to represent only the four most significant digits of this number. Thus, if the eight digits are 00002536, only the 2536 would be read out. If the number were 25681962, then only the four most significant numbers, namely, 2568 would be actually printed out. Accordingly, the next programming stage 445 is a "0" detect stage where the numbers in the AR and MQR registers are moved up toward the top of the first stage of the AR register until a number other than zero appears in the first stage thereof. Then the digits are shifted one stage forward as in the previously described "0" detect operations.

Next, the programming stage 547 is rendered operative which reads out the numerical value in the data storage register to both inputs L2 and L4 leading to the adder where the same number is subtracted from itself to create a zero which is read into the data storage register. This is necessary because a reset of the numerical information in words three and four of the *N*—2 block at the end of eight hours is necessary so that a new eight-hour total may be obtained. The next stage 549 of the programmer transfers the zero number in the data storage register to word three of the *N*—2 address and also re-circulates the zero into the DSR register. The next stage 551 transfers the zero which was re-entered into the data storage register in stage 549 into word four of the *N*—2 block of the drum. The next stage 553 restores the N block address to the address register by transferring the address in the address register through the adder where the number 2 is added thereto and the resultant value is re-entered into the main address register.

The following stage 555, reads out the four most significant digits of the 8-hour totals number then in stages 2-5 of the AR register into the DSR register. The programmer then remains idle for a small fraction of a second until the typewriter programmer completes effecting the printout of the data value, word 5, begun by the operation of stage 541, and transfers the 8-hour data value transferred by stage 555 to the DSR register to the output register 17. Stages 541–555 complete their operation in a matter of a few hundred microseconds which is faster than the typewriter programmer can complete its operation.

When the typewriter programmer completes the transfer of the 8-hour totals information in the DSR register to the output register, the main programmer resumes operation upon receiving a pulse from the typewriter programmer on terminal "*y*." This pulse is fed via line 556 to programming stage 471 (FIG. 10*e*) where the address in the address register is read-back into the log address section of the drum. As previously indicated, the output of the stage 471 extends to the input of the first stage of the programmer, the master reset programming stage 301, where a new scanning programming cycle begins.

Assume, now, that the block address in the address register in the new programming cycle is a totals point which is to be cross totalized with another totals point. Such points are cross totals points. Assume further that in the particular programming format being used that a cross totals point is not a flow point. The cross totals points could, for example, represent kilowatt hours. During a drum entry log cycle the programmer stages will be operated in the sequence: 301, 302, 303, 304, 305, 306, 314, 315 (assume no scan point), 316 (FIG. 10*c*), 436, 394, 438 (assume linear variable or transducer), and 556. The last-mentioned stage, not previously described, inquires whether a totals point is involved. Since it isn't, the "N" line of stage 556 is energized which initiates operation of conditional transfer stage 406 which inquires whether a drum entry log cycle is involved. Since it is, stage 453 is operated to transfer the totals value in the DSR register into drum word 5 of the block address involved, and also sets the log printout cycle conditional transfer stage 311 (FIG. 10*c*). Then stages 455, 457, 483, 493 and 503 are rendered operative in succession, the latter inquiring whether a cross totals point is involved. If a cross totals point is involved, as determined from the "N" block address instruction, then a "T" line of this stage is energized initiating operation of a programming stage 565 which reads out word six from the "N" block address in the address register. The programming stage 565 reads out word six of the "N" block address then in the address register which, in the case of a cross totals point (i.e. a variable contributing to a cross totals value), represents a number which is the block address containing the cross totals information to which the hourly totals of the "N" block address involved and data of other "N" block addresses to be cross totalized contribute. Word six is transferred through the adder and into the accumulator register.

Next, a conditional transfer stage 567 is rendered operative which stage inquires whether an integration subcycle is involved. If it is, then the "T" line is energized to initiate operation of a programming stage 569 which transfer the main block address still in the address register back into the section of the drum to contain the integration address, namely word three of the second block in section B of the drum. (The cross totals address is still stored in the accumulator register, not the address register, pending transfer of the address in the address register back into the drum.)

If an integration sub-cycle is not involved, then the "N" line is energized which initiates operation of a programming stage 571 which transfers the address in the address register through the adder and then into the scanned address word position of the drum, namely word three, in the first block of section B of the drum.

Next, by means of a programming stage 573, the cross totals address in the accumulator register is transferred through the adder and into the address register.

Then, programming stage 575 is rendered operative which transfers out from the word number three and four position of the selected cross totals address the previous one hour total for the cross total points involved, together with the one hour total of the point just scanned still held in the DSR register. These numbers are transferred through the adder where they are added together and then transferred into the accumulator register and the MQR register operated together as an eight digit shift register. The totalized value in the data storage register is again re-circulated into the data storage register by the programming stage 575.

Next, a programming stage 577 is rendered operative which transfer the data in the AR and MQR registers into words three and four of the cross totals block address involved. An operating pulse appears on a line 578 leading to the input conditional transfer stage 311 (FIG. 10*c*) which inquires whether a log printout cycle is involved. Since it is, the conditional transfer stage 459 is operated and inquiries whether the output register 459 is clear. If it is not, then the programmer recycles to effect a new drum entry log cycle. Recycling continues with the data value for a new variable being entered into the word 5 position of the associated block address for each new programming cycle. As soon as the output register is clear the section of the programmer (FIG. 10*e*) initiating a printout of the log point data associated with the next lowest log address effected by subtracting one from the log address stored in block #1 of the drum.

During each hourly drum entry log cycle, when the drum block address in the address register contains the cross totals number, a section of the programmer not previously described is rendered operative to, among other things compute an average cross totals value, if this is desired. Previously, the totals values of the various points or variables on which a cross total was to be obtained was added to the number in a cross totals block address which has a lower block address number than any of the points on which a cross total is to be obtained. Thus, when the cross totals address is finally reached, the number stored in words 3 and 4 of the cross totals address represents the current total for all the cross total points involved. The instruction for the cross total block indicates that the point involved is a log point and a totals point but not a scan point, flow point or a point requiring linearization.

As above-mentioned, during a drum entry log cycle, the conditional transfer stage 316 (FIG. 10*c*) will initiate operation of a conditional transfer stage 436 which requires whether a log point is involved. Since it is, the conditional transfer stage 394 is set into operation which inquires whether a flow point is involved. Since it isn't, the next conditional transfer stage 438 is rendered operative. Since a table look-up subroutine isn't required, the conditional transfer stage 556 is rendered operative which inquires whether a totals point is involved. Since it is, the "T" line thereof is pulsed which initiates operation of a conditional transfer stage 580, which inquires whether the block address contains cross totals information. Since it does, the "T" line is pulsed which initiates operation of a conditional transfer stage 581 which inquires whether an average cross totals value is desired, that is, a number representing the cross totals value divided by the number of cross total points making up the total.

If an average is desired, the "T" line of stage 581 is pulsed which initiates operation of a conditional transfer stage 582 which transfers out word 6 of the cross total address involved through the adder and into the accumulator register. Word 6 of a cross totals address point contains a number representing the number of points making up the cross total value. In the next stage 583, a zero is generated by feeding numerical information in the data storage register through the two input lines L2 and L4 of the adder where a subtraction operation is performed, the zero being transferred into the MQR register and the zero being re-entered into the data storage register.

Next, since word 6 is to be used in a divsion operation, a "0" detect operation is performed by a programming stage 584 which moves the numerical information in the accumulator register and MQR register connected in series up toward the number 1 stage of the accumulator register until a number other than zero is in the first stage thereof, whereupon the most significant digit in the first stage and the other digits are moved to the next highest stage thereby filling stages 2 through 5 with the divisor. After the zero detect operation, the zero stored in the data storage register is once again transferred to the MQR register by stage 585. Word 6 is then transferred out of the accumulator register through the adder and into the data storage register which contains the divisor under control of programming stage 586. The next programming stage 587 effects the read-out of drum words 3 and 4 of the cross total address, which is the cross totals value, through the adder and into the accumulator register where the 8-digits occupy stages 2 through 9 of the combination 9-digit shift register formed by the AR and the MQR registers connected in series.

Next, a programming stage 588 performs a "0" detect operation of the kind previously described which places the 4 most significant figures of the dividend into stages 2 through 5 of the accumulator register. Next, the programming stage 589 performs a division operation as outlined more fully in FIG. 14. Next, the programming stage 590 shifts the quotient developed in the MQR register up into the AR register so that it occupies stages 2 through 5. Next, the pulse appearing in the output of the programming stage 590 initiates operation of a conditional transfer stage 591 which inquires whether a 1-hour log is involved.

Since this conditional transfer stage 590 is entered by an alternate path extending from the average point conditional transfer stage 581, the latter branch will be discussed before proceeding with an explanation of the operations performed following the stage 591.

Returning to conditional transfer stage 581, if an average cross totals value is not desired, then the system is set to read into word 5 position of the cross totals block address involved the four most significant digits of the 8-digit cross totals number. Accordingly, the "N" line of the stage 581 is pulsed which initiates the operation of a programming stage 592 which reads out the cross total value stored in words 3 and 4 of the cross totals address through the adder and into the combined 9-digit shift register ARMQ. Since only a 4-digit number is to be printed out and stored in the word 5 position of the drum, a zero detect operation is performed by the next programming stage 593 which moves the 4 most significant digits into stages numbers 2 through 5 of the accumulator register. The output of the stage 593 initiates operation of the above mentioned conditional transfer stage 591. Thus, depending upon whether the average read-out or the totals read-out section of this part of the programmer is entered, the information in the accumulator register then represents either a cross totals average or just a cross totals value.

The conditional transfer circuit 591, as above explained, inquires whether an hour log is involved. If it is not, then a conditional transfer stage 594 is operated via line "N." If an hour log is involved, then the "T" line of the stage 591 is pulsed to initiate operation of programming stages 595 and 596 in sequence, the latter stage initiating operation of the aforementioned stage 594. The purpose of stages 595 and 596 is to generate a zero which is read into the data storage register by feeding the same number through the two inputs L2 and L4 leading to the adder and then transferring this zero to words 3 and 4 of the cross total address so that the cross totals value is re-set to zero.

In programming stage 594, the cross totals average or the cross total value in the accumulator register is read into the data storage register in preparation for transfer to the log word 5 position of the cross totals address. This is accomplished in the next stage which is rendered operative by a pulse appearing on line 597 which extends to the input of programming stage 453 (FIG. 10*d*) which transfers this information to word 5 position in the drum of the block address involved, and sets a log print-out cycle as above explained for other variables.

The remainder of the stages operates in a similar manner from that explained previously.

Now, let it be assumed that all points to be logged have been logged and that the log address in the drum is the number zero. Therefore, when 1 is subtracted from zero by programmer stage 461 (FIG. 10*e*), a negative number results so that the "N" line of the next stage 463, which inquires as to the sign of the result of the subtraction operation, is energized. Next, various resetting operations are performed. The first stage then rendered operative is a conditional transfer stage 600 which inquires whether a 1 hour log is involved. If it is not, then the "N" line is energized. Since in our present example, a regular hourly log entry cycle was involved, the "T" line of the programming stage 600 will be energized which initiates operation of the programming stage 602 which effects the read-out of the hours count number in word position 3 of block 2 of the drum. As previously indicated, each hour this number is increased by 1 so that memory of the number of hours since zero time which have passed is readily available. The new hours count number is transferred into the DSR register. The next programming stage 604 effects the transfer of the new hours count information from the DSR register into word 3 position of block 2 of the drum. This programming stage also re-sets the flip-flop or bi-stable devices of the various conditional transfer circuits which inquire whether a 1-hour or an 8-hour log is involved. The 1-hour bi-stables were initially set by a clock mechanism just before the beginning of the hour involved. The 8-hour log bi-stables of course are only set every 8 hours so that the re-setting operation on these bi-stables by the programming stage 604 is only effective each 8-hourly period. Stage 604 also resets the bi-stable associated with the log printout cycle conditional transfer stage 311 which was initially set and remains set during the first program cycle of a drum entry log cycle by stage 453 (FIG. 10*d*).

Next, a conditional transfer stage 606 is rendered operative which inquires whether a 24-hour log is involved. If not, the "N" line is energized which initiates operation of a programming stage 608 which reads-out the log address constant, the number representing the highest block address, through the adder to the address register. Next, the programming stage 471 is rendered operative which transfers this address into the log address section of the drum, namely word 4 of the first block in the drum, whereupon a new programming cycle begins. However, the next time the programming operations encounter the programming stage 311, this conditional transfer stage will indicate that a log print-out cycle is not involved so that the "N" line of stage 311 would be energized and the log print-out programming portion of the programmer would not be entered until the beginning of a new drum entry log cycle or a totals demand operation which also sets the log print-out cycle stage 311.

Going back to the conditional transfer stage 606 (FIG. 10*e*), if a 24-hour log was involved, then the "T" line would be energized which initiates operation of a programming stage 610 which reads-out the number in the DSR register both to lines L2 and L4 leading of the adder so that a zero is produced. This zero is read into the DSR register. The programming stage 610 also sets the totals demand flip-flop associated with each conditional transfer stage which inquires whether a totals demand is involved since, at the end of each 24-hour hourly log cycle, all 24-hour totals values are printed out in a separate segment of the log sheet of the log output recording device 6*a*. Stage 610 may also send a signal to the typewriter 6*a* which effects a line spacing to a separate section of the log sheet where all 24-hour total values are printed. The line spacing apparatus for the typewriter may be similar to that disclosed in copending application Serial No. 495,492 filed March 21, 1955. The programming stage 610 also sets the flip-flop associated with the log print-out cycle conditional transfer stage 311 which the programming stage 604 had just reset.

Next, the programming stage 612 is rendered operative which transfers the zero in the DSR register through the adder and into the hours count position on the drum, word 6 position, block #1, so that a new 24-hour time period will be counted. The programming stage 612 is connected to the programming stage 608, previously mentioned, which effects the transfer of the log address constant from the drum into the address register whereupon the next programming stage 471 transfers the drum address log constant into the log address section of the drum. Again, a new programming cycle is initiated and, due to the fact that the programming stage 610 had set the log print-out cycle flip-flop, the log print-out programming section of the programmer will again be entered the next time around.

It should be recalled that as yet the 24-hour totals information has not been printed on the log sheet. Since the log address constant had been just previously transferred to the log address section of the drum, the number transferred to the address register by programming stage 461, will be a positive number so that the conditional transfer stage 463 will provide a pulse on its "T" line to initiate, by means of programming stage 465, the transfer of the instruction of word 1 of the first block address (address 499) to the instruction register. Since as above explained, the first block on the drum has an instruction word which indicates that the point is not a log point or a scan point, the "N" line of the next conditional transfer stage 467 will be pulsed so that conditional transfer stage 471 via line 469 is rendered operative to immediately initiate a new programming cycle. This process is repeated until the address transfer to the address register is that of a point which is considered a log point. Then, the "T" line of the conditional transfer stage 467 is pulsed to initiate operation of the conditional transfer stage 472 which inquires whether a totals point is involved. If it is not, the "N" line of this stage is pulsed which initiates operation of a totals demand conditional transfer stage 474. It will be recalled that at the end of a 24-hour period, the totals-demand flip-flops are set so that the "T" line of this stage will be pulsed so that programming stage 471 is operated again, which, as above indicated, after transfer of the address in the address register to the log address section of the drum, initiates a new programming cycle. When, however, a totals point is involved, the "T" line of the conditional transfer stage 472 is pulsed which operates conditional transfer stage 533 which inquires whether a totals-demand is involved. Since in the present example a totals-demand is involved, the "T" line of this stage is pulsed which initiates operation of the conditional transfer stage 615 (FIG. 10*f*) which inquires of the instruction word whether the block address relates to a variable on which a 24 total is obtained. The instruction for a block address containing any totals information, as previously explained, indicates that it is not a log or totals point since this block is only entered through the associated "N" block address. This point in the programmer would have been bypassed in stage 467. If an "N" block address is involved, and it does not relate to a point on which 24-hour totals are obtained, then the "N" line of stage 615 is pulsed which initiates operation of the programming stage 471 preparatory to a re-cycling operation as above explained. This kind of programming sequence results when a totals-demand is requested between the hourly recording intervals.

Where a 24-hours point is involved, then the "T" line of stage 615 is pulsed which initiates operation of a conditional transfer stage 619 which inquires whether a 24-hour log period is involved. If not, the "N" line is pulsed. This situation occurs when a totals-demand is requested between the hourly recording cycles. In the present example, a 24-hour log period is involved so that the "T" line is pulsed initiating operation of a programming stage 621 which reads-out the address from the address register through the adder where 1 is subtracted therefrom, the result being entered into the address register so that the $N-1$ block containing 24-hour totals information may be located. Next, a programming stage 623 is operated which transfers out the 8-digit totals number in words 5 and 6 of the $N-1$ block to the AR and MQR registers acting together as a 9 digit shift register. As above explained, whenever information is read into these registers in this manner, the four most significant digits of the 8 digit number occupy stages 2 through 5 of the 5-stage AR register and the remaining four digits are in the four stages of register MQR.

Except for 24-hour total figures, only four digits (most significant numbers having a number greater than zero as the highest digit) are printed out. Twenty-four-hour totals, however, are printed out as an 8 digit number.

The next programming stage 630 transfers out the four most significant digits from the stages 2 through 5 of the address register through the adder and into the DSR register preparatory for reading-out to the output register for printing on the log output device. The next programming stage 631 initiates operation of the typewriter programmer **14*b* which effects the immediate transfer of the information in the DSR register to the main output register and then transfers the same to the log output device 6*a*. The programming stage 631 also effects the shifting of the 4 digits in the MQR register upward into the stages 2 through 5** of the accumulator register, the most significant digit being in the second stage of the accumulator register.

Accordingly the next programming stage 625 reads out whatever number is in the DSR register to lines L2 and L4 leading to the adder where a subtract operation is performed to create a zero which is read into the DSR register. Then the zero is transferred through the adder into word 5 position of the drum to reset the same to zero, and the zero is recirculated into the DSR register. The next programming stage 627 reads out the zero from the DSR register through the adder and into word 6 position of the drum.

The next programming stage to be set into operation is stage 633 which reads out the four digits in the accumulator register through the adder and into the DSR register in preparation for print-out. The stage 633 operates much faster than the typewriter programmer **14*b* and the data transferred to the DSR register by stage 633 remains in the DSR register until transferred to the output register and the typewriter 6*a* by the typewriter programmer. The next programming stage 635 reads out the address from the address register through the adder where 1 is added thereto and result is transferred back into the address register so that the "N" block address is then stored in the address register. The programmer momentarily ceases operation until a pulse is fed to terminal Y indicating that the DSR register has been cleared. The terminal Y joins line 556 leading to the input of programming stage 471** which, after transfer of a block address into the log address section of the drum, initiates a re-cycling of the programmer.

ON-DEMAND READ OUT

When the on-demand pushbutton on the keyboard 155 is depressed, circuits associated with the various conditional transfer circuits inquiring whether a drum entry log cycle is involved, are set to indicate a drum entry log cycle. Practically the same programming sequence is carried on as in a regular hourly drum entry and printout log cycle except that no totalizing for 8- and 24-hour totals or cross totalizing are effected by the section of the programmer beginning with conditional transfer stages 483, 493 and 503. However, all log points are measured, stored and printed out in the normal manner.

One additional programming operation required during on-demand operation is a re-setting of all the flip-flops associated with conditional transfer circuits which were originally set when the on-demand push button was pressed. This additional operation is performed by a section of the programmer including conditional transfer circuit 600 (FIG. 10*e*) which, when a 1-hour log is not involved, pulses the "N" line to initiate operation of a totals demand conditional transfer circuit 787 which inquires whether a totals demand is involved. Since it isn't, the "N" line thereof is pulsed which initiates operation of a programming stage 789 which re-sets all those flip-flops which were set when the on-demand push button was pressed. Next, the programming stage 608 is rendered operative which, as above explained, effects the transfer of the log address constant from the drum into the address register whereupon the next stage 471 feeds this log address constant into the log address section of the drum. A new cycle of operation then proceeds, as above explained.

TOTALS DEMAND OPERATION

As previously indicated, between regular hourly recording intervals, access may be had to 24-hour total information which represents at any time, the summation of each hourly totals value and, in accordance with the programming sequence to be described, an additional quantity representing quantity of flow for the proportionate part of the hour involved. Depression of the totals-demand push button sets all drum entry log cycle flip-flop circuits, all totals-demand flip-flop circuits and the flip-flop circuit associated with log printout cycle stage 311. Thus, a normal drum entry log cycle is effected where the variable values are entered in word 5 of the block addresses for all log points. Since an hour log cycle is not involved, conditional transfer circuit 455 (FIG. 10*d*) will pulse its "N" line thereby by-passing the conditional transfer circuits 483, 493 and 503 involving cross total, 8-hour and 24-hour summations.

The log print-out section of the programmer (FIG. 10*e*) will be entered in the normal manner and the regular programming sequence is followed until the conditional transfer stage 472 is reached. Where a totals point is not involved, conditional transfer stage 474 is operated which inquires whether a totals-demand is involved. If it is, and a totals point is not involved, then no print-out of any information is involved at that time. However, if a totals point (i.e., a point which is totalized, not the block address for totals information) and totals demand are involved, then the "T" line of conditional transfer stage 533 is pulsed which initiates operation of conditional transfer stage 615 (FIG. 10*f*) which inquires whether the block address being scanned contains information to be added to a 24-hour totals number. If it does not, then there is no need to print information in the block address involved so that the program re-cycles via line 556 which extends to the programming stage 471 which transfers the log address back to the drum and initiates a new programming cycle.

When such a block address is scanned, then the "T" line of stage 615 is pulsed which initiates operation of a conditional transfer stage 619 which inquires whether a 24-hour log is involved. Since the totals demand now being discussed occurred between hourly recording periods, the "N" line is pulsed which initiates operation of a series of programming stages which converts the time compensated totals value in word 5 of the "N" block address involved, which, in the case of the present example is information of average rate of flow, back to a true flow, which is then added to the previous 24-hour total value to obtain the actual total up to the time involved. This conversion is obtained by multiplying the 1-hour total value recorded in terms of average rate of flow for a base period (1 hour) by the ratio of the integration sub-cycle count number to the integration sub-cycle constants value.

The first programming stage then set into operation is a programming stage 790 which transfers the integration sub-cycle count value in word 4 of the second block of the drum through the adder and into the accumulator register. The next programming stage 792 generates a zero by reading out the number in the DSR register to input lines L2 and L4 of the adder and then entering the zero in both the MQR register and the DSR register. The next programming stage 794 "0" detects the integrator sub-cycle count number in the accumulator register in preparation for a division operation. The zero stored in the data storage register is again entered into the MQR register in programming stage 796. The next stage 800 transfers the integrator sub-cycle count number in word 4 of the second block of the drum through the adder and into the accumulator register. Then, stage 802 "0" detects the accumulator register and the following stage 804 provides a dividing operation in accordance with the program shown in FIG. 14 so that a number appears in the MQR register representing the quotient of the integrator sub-cycle count number and the integrator sub-cycle constant number.

The next programming stage 806 effects transfer of word 5 of the "N" block address involved which word represents the time compensated or average flow value of the variable involved. This number is transferred through the adder and into the DSR register under control of the stage 806. Next, the result of the above-mentioned division operation and the number representing the average flow data is multiplied by programming stage 808 following the programming sequence shown in FIG. 15.

Next, programmer stage 810 reads out from the drum the numerical data in the block address containing 24-hour totals information and adds this number to the result of the multiplication carried on by stage 808. Thus, programming stage 810 reads out the "N" block address in the address register through the adder where 1 is subtracted therefrom and the result is read into the address register. The next programming stage 812, effect the reading out from the drum of words 5 and 6 of the $N-1$ block address, an 8-digit number, and the 8-digit result of the aforementioned multiplication operation stored in the registers AR and MQR through the adder, and the result of the addition is read back into the registers AR and MQR acting as an overall 9-digit shift register.

The next programming stage 814 effects the read-out of the sum of the addition from the accumulator register, that is the four most significant digits thereof, through the adder and into the DSR register. The next programming stage 816 initiates operation of typewriter programmer 14*b* which effects the read-out of this information from the DSR register into the output register and then to the log typewriter 6*a*. Stage 816 also effects a shift operation of the series connected registers AR and MQR so that the 4 remaining most significant digits occupy stages 2 through 5 of the AR register. The next stage 818 transfers out these 4 digits from the accumulator register through the adder and into the DSR register where the information awaits transfer to the output register and the typewriter 6*a* by the typewriter programmer 6*a*. The next stage 820 re-sets the address in the address register to the "N" block address by reading out the address in the address register through the adder when 1 is added thereto and then reading the result into the address register. Then, the programmer awaits a pulse from typewriter programmer 14*b* indicating that the data in the DSR register has been transferred to the output register. This pulse, as before, is fed to terminal Y leading to line 556 extending to programmer address transfer and programmer re-cycling stage 471.

When all block addresses have been scanned in the log printout section of the programmer, the stages 463, 600, 787 and 788 operate in sequence, the latter stage resetting the totals demand flip-flop circuits. Then stages 608 and 471 are operated to performing address restore functions.

OFF-NORMAL SUMMARY

When the off-normal summary push button is depressed, information on all variables which are then abnormal is printed out on the scan output recording device 6*b*. The depression of this switch sets only the flip-flops associated with the off-normal summary conditional transfer circuits. The point in the program where the off-normal conditional transfer circuits are found, is in the part of the programmer following the conditional transfer circuit 383 (Fig. 10*c*) which inquired whether an alarm value of the variable was detected. If it was not, the "N" line thereof is pulsed which initiates operation of the off-normal conditional transfer circuit 390. Since a conditional transfer situation exists, the "T" line thereof is pulsed which initiates operation of the drum entry log cycle conditional transfer circuit 316. Since the drum entry log cycle is not involved, the "N" line is pulsed which initiates operation of the integration sub-cycle conditional transfer circuit 309 which initiates a sequence of programming operations which results in the re-cycling of the programmer in a manner previously explained.

If an alarm is detected, then, as above explained, it is desired to print-out the abnormal value of the variable. Upon pulsing of the "T" line of the conditional transfer stage 383, the conditional transfer stage 385 is operated which inquires whether an off-normal summary is involved. Since it is, then the "T" line is pulsed which initiates the side branch of the programmer which is normally entered during a drum entry log cycle or the detection of a new abnormal or new return to normal variable.

The only difference in the programming now effected is that the instruction is not changed to indicate an abnormal condition of the variable since off normal summary stage 412 bypasses instruction change stage 414. Printout of the off-normal variable is initiated by stage 418. Reset of the off-normal summary conditional transfer stage is obtained by stage 308 (FIG. 10*a*) when the block address in address register becomes a negative number indicating completion of the scanning of all block addresses.

TYPEWRITER PROGRAMMER

Refer now to FIG. 18 illustrating the typewriter programmer. This programmer is shown as a 26-stage shift register, preferably a magnetic core shift register of the kind previously referred to in the articles in the periodical Automatic Control. The register has an advance pulse input line AP which receives advance pulse for progressively shifting a set condition of the magnetic core from stage to stage. As previously indicated, a magnetic core shift register stage generates an appriciable pulse each time its magnetic state reverses as induced by the feeding of an advance pulse of proper polarity to an input winding of a stage or by the feeding of a set pulse of proper polarity to another input winding. The advance pulses are polarized to reverse the magnetic state induced by a previous set pulse. Suitable rectifying means incorporated in each stage provides an output control pulse only when an advance pulse changes the magnetic state of a core set by a previous set pulse. Normally each stage is in a no-set or reset condition so that a stage is set to generate a pulse only when a set pulse is fed thereto. The generated output pulse of a given stage is used to set the succeeding stage. Once a given stage is set, the reception of an advance pulse (advance pulses are fed simultaneously to all stages) will generate a control pulse and set the succeeding stage.

The output control pulse of the magnetic core stages are used for external control functions, such as operating flip-flop circuits which open gates controlling the flow of information to the output typewriters or for directly pulsing the space line of the typewriters. A given number of stages provide for a selection of printing formats used respectively by the scan and log output typewriters by arranging the stages in proper sequence so that the stages used exclusively with, say, the scan output typewriter are placed ahead of the stages used in common with the output typewriters. Then, when operation of the log output typewriter is desired, the early stages used with the scan output typewriter are by-passed by feeding the first set pulse to the first stage following the last stage exclusively provided for use with the scan output typewriter.

The outputs of the stages used in common with the scan and log output typewriters are split off to the different control circuits associated with the scan and log output typewriters and contacts are provided in the split off branches to select the active branch.

The initial set pulse is fed to the programmer via an input line 900. This pulse is fed to line 900 whenever the main programmer calls for operation of the typewriter programmer. The line 900 extends to the first stage of the 26-stage shift register through normally open contacts 902 and line 904. The contacts 902 are closed by a relay (not shown) which may be pulled-in when main programmer stage 418 (FIG. 10*d*) is operated which occurs whenever operation of the typewriter programmer is requested during an alarm scan or off-normal-summary cycle. Any other time the operation of the typewriter programmer is requested the initial set pulse fed to the typewriter programmer is fed via normally closed contacts 906 of the last-mentioned relay to a line 908 which extends to stage 9 through a normally open limit switch 910 of the log output typewriter 16*a*. The contacts 910 are closed when the carriage of typewriter 16*a* is positioned to effect typing at the start of a line. The line 908 extends to stage 16 through normally closed contacts 911 which are also controlled by the position of the carriage of log output typewriter 6*a*. They are closed for all positions of the typewriter carriage except the one which closes limit contacts 910.

Before reviewing the functions of the stages, it will be helpful to review the various formats for the data printed on typewriters 6*a* and 6*b*. The format of the data printed by the log output typewriter 16*a* follows a regular pattern in that the order of the variable data is always the same so that point identification information can be pre-printed at the heads of respective vertical columns on the log sheet. Thus, all regular data for a given point or variable will be in the same column. Similarly, all 24-hour totals information, whether obtained regularly at the end of each 24-hour period or from a "totals demand" readout, will be in a definite order so that preprinted point identification headings may be used as for regular log data. As previously indicated, the 24-hour totals information is preferably placed in a separate segment of the log sheet, such as the off-normal segment ONS illustrated in U.S. Patent No. 2,701,748 the main difference being that the segment for a 24-hour totals data is divided into vertical columns with pre-printed point identification numbers identifying the point or variable on which the totals information pertains and also perhaps a symbol indicating the units involved, such as gallons or kilowatt hours. The time information for the data involved will always be at the beginning of each line of information printed.

The preferred format for regular hourly log data for the first two variable columns and the time column will be as follows:

(*a*) 070000 2869 2849

For an 8 hr. hourly log it would be:

(*b*) 080000 2869 3861 2839 3900

The first numbers in formats (*a*) and (*b*) give digital time information in hours (first and second digits) minutes (third and fourth digits) and seconds (fifth and sixth digits). The next number in format (*a*) represents the hourly value for the point or variable identified at the head (not shown) of its column. Except for 8-hour printouts shown in format (*b*), the next number represents the hourly value for the next variable. In format (*b*), the 4-digit number following the first 4-digit number is a number representing the four most significant figures of the 8-hour totals number.

The format for the 24-hour totals columns is the same as format (*b*) except that the 8 digits associated with each point all represent the accumulated total for the variable involved.

The format for the data printed by the scan output typewriter cannot have pre-printed column, point identification headings obviously because the variables which become abnormal cannot be predicted. Also, the time one variable becomes abnormal may be unrelated to the time another variable becomes abnormal. Consequently, each time a variable becomes abnormal time and point identification information must be given in addition to data information. Moreover, since the point identification information being a block address number does not indicate the units of the data number or otherwise identify variable type (temperature, pressure, flow, etc.), a group or variable type identification symbol (such as T for temperature, P for pressure, F for flow) would be helpful. Consequently, the format for the scan output typewriter for each new abnormal or new return to normal variable may be:

(*c*) T368 102216 2869 F043 131618 3000

The group "T368" indicates a temperature variable having a block address 368, the number "102216" is the time number indicating 22 minutes, 16 seconds after the 10th hour and "2869" represents a temperature of 2869° F. The next group represents similar kinds of information for a flow variable. In both the log and scan formats, all data numbers representing abnormal values are printed in red.

Refer again more particularly to FIG. 18. When the No. 1 stage receives a set pulse on line 904 during a scan cycle, the next advance pulse received on line AP will generate a control pulse which sets stage No. 2, advances the carriage of scan output typewriter 6*b* one space by pulsing the space line thereof directly and it sets the flip-flop circuits (not shown) which open the gate 117*b* (FIG. 7*a*) to feed advance pulses to the DSR register 104, and the gates 111*a*, 111*b*, 111*c* and 111*d* during the reception of the first advance pulse to transfer the binary decimal code to the corresponding stages of the OSR register 17. The DSR register contained the block address number transferred there by the main programmer 14*a*.

The next two advance pulses received by the typewriter programmer 14*b* will generate control pulses at the output of stages No. 2 and No. 3 which pulse the space line of typewriter 6*b*. Then, the reception of the next advance pulse will generate a pulse in the output of stage No. 4 which opens gate 143*c* to pass to typewriter 6*b* for printing signals indicating the proper variable type identifying symbol determined from the instruction word then in the instruction buffer storage register 128 (FIG. 7*b*), the latter controlling which of the gates 114*a*, 114*b* or 114*c* of symbols register 113 (FIG. 7*a*) is open.

Next control pulses are generated successively in stages No. 5, No. 6 and No. 7 which respectively momentarily open gates 111*e* (FIG. 7*a*) for transferring the 3 digits of the block address number to line L7 where the signals reach log output typewriter 6*b* via the then open gates 143*a*. The stages No. 5, No. 6 and No. 7, of course control gates 143*a*. The timing between successive operation of these typewriter programmer stages is such that the typewriter completes typing a given digit before the next stage is operated.

After completion of the typing of the block address number, typewriter programmer stage No. 8 is operated which effects the readout of the AR register 115, then containing the variable value transferred there by the main programmer 14*a* to the DSR register 104. The next typewriter programmer stage No. 9 transfers the data in the DSR register to the OSR register.

Next stages No. 10 through No. 15 are operated in succession and as each is operated the six digits of the time number are successively transferred from the clock register 107 to the scan output typewriter through gates 143*b*. Since the time stages are used with both the log and scan typewriters, the outputs thereof, by means of contacts 902*a*—906*a*, 902*b*—906*b*, 902*c*—906*c*, 902*d*—906*d*, 902*e*—906*e* and 902*f*—906*f*, may be gated to the proper locations so that gates 143*b* (FIG. 7*a*) are opened during a scan printout cycle and gates 144*b* are opened during a log printout cycle. Contacts 902*a* to 902*f* are normally open contacts which close with contacts 902 during a scan printout cycle and contacts 906*a* to 906*f* like contacts 906 are closed except during a scan printout cycle. The output lines in which contacts 902*a–f* and 906*a–f* appear, among other things extend to flip-flop circuits controlling the gates 143*b* and 144*b* and gates (not shown) controlling the feeding of advance or transfer pulses which control the successive feeding of time information from clock register 107.

Stages No. 16 and No. 17 create successive pulses which space the selected typewriter twice, stage No. 17 also controlling the ribbon shift of the selected typewriter so that abnormal data will be typed in red.

The next four stages Nos. 17, 18, 19 and 20 respectively initiate the feeding of four advance pulses through gate 11*e* to shift the 4 digits in the OSR register 17 to line L7 and to the selected typewriter 6*a* or 6*b* via selected gates 143*a* and 144*a*.

The outputs of stages No. 22, No. 23, No. 24, No. 25 and No. 26 are active during all but a scan printout operation. During 8 and 24 hourly log periods or during totals demand operation, the outputs of these stages are fed through respective normally open contacts 915*a*, 915*b*, 915*c*, 915*d* and 915*e* to bistable and other control circuits which effect the printing of four more digits by the log output typewriter. During all other periods of operation of the typewriter programmer, the outputs of stages 22–26 extend through normally closed contacts 917*a*, 917*b*, 917*c*, 917*d* and 917*e* to a common line 919. Obviously, the series of contacts 915*a–e* and 917*a–e* are controlled by a relay which in turn is clock controlled so as to become energized for a while every 8th, 24th hour and also manually controlled via the totals demand pushbutton. When common line 919 is pulsed during an alarm scan period nothing happens because of a set of normally closed contacts 906' which open with contacts 906. During other periods, such as during normal hourly log periods, the pulses appearing on line 919 are used to line space the typewriter four spaces to accomplish format (*a*) where a spacing but no typing of data is effected.

Referring now more particularly to the first of these stages, stage 22, during totals demand, 8 hour and 24 hour operation, the pulse appearing at the output thereof is fed through contacts 915*a* to bistable circuits (not shown) which open various gates which shift data from the DSR register to the OSR register. The aforementioned pulse also appears on terminal *y* to indicate the current clearing of the OSR register. Terminal *y* is connected to the main programmer 14*a* as above indicated to continue the operation thereof without requiring the programmer 14*a* to await the typing of the four digits under control of stages 23–26.

Stages 23–26 when contacts 915*b–e* are respectively closed operate in succession to transfer the four digits in the OSR register to the log output typewriter.

The present invention has thus provided an exceedingly flexible, general purpose data reduction system which additionally is fast-operating, can accommodate a large number of points (500–1000), and is very accurate. It is based on principles permitting mass production of most of the basic components which are adapted to an individual customer's use by simple plug-board or printed circuit insert connections and recording appropriate control data on the drum.

It should be understood that numerous modifications may be made in the preferred embodiment above described without deviating from the broader aspects of the invention.

What is claimed is:

1. A variable monitoring system for monitoring a large number of variables, said system including output recording means, storage means having stored therein data on alarm limits of the variables, substantially continuously operating scanning means for successively feeding to a common output data on said variables at a higher rate than can be accommodated by said output recording means, means for storing data in said storage means on the variables scanned during certain preselected scanning cycles and also during other scanning cycles, alarm detecting and control means responsive to incoming data of the variables at said common output and corresponding alarm limit data in said storage means for detecting the presence of abnormal variables, and means for periodically feeding said stored data on said variables scanned, whether normal or abnormal, during said preselected scanning cycles to said recording means, said scanning means, storing means and alarm detecting and control means being operative to scan, detect and store during the recording of said stored data and to feed information on abnormal variables from said storage means to said output recording means without delay when an abnormal variable is detected.

2. A variable monitoring system for monitoring a large number of variables, said system including output recording means, storage means having stored therein data on alarm limits of the variables, substantially continuously operating scanning means for successively feeding to a common output data on said variables at a higher rate than can be accommodated by said output recording means, means for storing data in said storage means on the variables scanned during certain preselected scanning cycles, alarm detecting and control means responsive to incoming data of the variables at said common output and corresponding alarm limit data in said storage means for detecting the presence of abnormal variables, and means for periodically feeding said stored data on said variables scanned, whether abnormal or normal, during said preselected scanning cycles to said recording means, said scanning means, storing means and alarm detecting and control means being operative to scan and detect during the recording of said stored data and to feed information on abnormal variables to said output recording means without delay when an abnormal variable is detected.

3. A variable monitoring system for monitoring a large number of variables including output recording means, storage means having stored therein data on alarm limits of the variables, means for successively feeding to a common output data on said variables at a higher rate than can be accommodated by said output recording means, means for storing in said magnetic storage means data on the variables to be recorded by said output recording means, means responsive to incoming data of the variables at said common output and corresponding alarm limit data in said storage means for detecting the presence of an abnormal variable and effecting substantially immediate readout of abnormal data to said output recording means, and means for feeding said stored data on the variables to said output recording means while the system continues to scan for and detect abnormal data.

4. In a variable monitoring system for monitoring a large number of variables including an output recording means, storage means having stored therein data on alarm limits of the variables and linearizing correction data for variables measured with transducers having nonlinear input-output characteristics, means for successively feeding to a common output data on said variables at a higher rate than can be accommodated by said output recording means, means coupled to said common output for storing in said storage means data on the variables to be regularly recorded in said storage means, means responsive to data from said common output obtained from a non-linear transducer and responsive to corresponding linearizing data on said storage means for providing a linearized output for the variable involved, means responsive to incoming data of the variables at said common output and corresponding alarm limit data in said storage means for detecting the presence of an abnormal variable and effecting substantially immediate readout of linearized abnormal data to said output recording means whenever scanned, and means for feeding said stored data on the variables to said output recording means while the system continues to scan for and detect abnormal data.

5. In a varied monitoring system including an input portion including transducer means associated with respective variables, at least some of said transducer means being of a type having a non-linear input to output characteristic, and input switching means for sequentially feeding the outputs of said transducer means to data handling means, and an output portion including output recording means for recording the data, data handling means connected between said input switching means and said recording means comprising: storage means having a first series of binary coded information for each variable including information on data handling requirements for the associated variable including information on whether the variable involved requires alarm scanning, logging, and linearization, information on the type of variable, information on whether the variable was abnormal when previously scanned, information on the value to be logged of the variable scanned during a predetermined scanning cycle, and information on the alarm limits of the variable, said storage means also having a second series of binary coded information including a number representing a different possible uncorrected measured value of a given type of non-linear transducer and a number which corrects for non-linearity of the transducer of the variable involved, and means for receiving said data handling requirements from said storage means, and, if the variable is one to be scanned, effecting the comparison of said alarm limit information in the storage means for the variable being scanned with the value of the variable scanned, and, if an alarm condition exists, storing such information in the appropriate location in said storage means and effecting readout of the variable value to said output recording means if the information in the storage means indicates that the variable was normal when previously scanned, if the variable is one to be logged and the time for logging has arrived, effecting the readout from said storage means to said output recording means of said data to be logged, if the variable is one to be linearized, effecting the comparison of the non-linearized value of the variable involved with the various possible measured values of the variable in said second series of information blocks in said storage means and for modifying the non-linearized value by the linearizing correction information associated with the number corresponding to the non-linearized value of the variable.

6. A data reduction system for handling data on a number of variables comprising an input portion including transducers associated with respective variables, only some of which provide outputs proportional to the rate of change of the associated variables which rate information is to be integrated, scanning means having terminals to which said transducers are respectively repeatedly coupled, and said scanning means including means for regularly interrupting the scanning of the terminals associated with variables other than said rate variables and immediately rescanning the terminals associated with the rate variables so that the rate variables are scanned at a definite rate independently of the time it takes to scan the non-rate variables, and measuring means connected to the output of said scanning means for providing a signal indicating the measured value of the currently scanned variable which is to be integrated with data on the same variable obtained during previous scanning cycles.

7. A data reduction system for handling data on a number of variables comprising an input portion including analog output transducers associated with respective variables, only some of which provide outputs proportional to the rate of change of the associated variables which rate information is to be integrated, means having input terminals which are repeatedly successively scanned and to which said transducers are respectively connected, said transducers associated with rate variables being connected to adjacent successively scanned terminals of said scanning means, and said scanning means including means for regularly interrupting the scanning of the terminals associated with variables other than said rate variables and immediately rescanning the terminals associated with the rate variables so that the rate variables are scanned at a definite rate independently of the time it takes to scan the non-rate variables, and measuring means connected to the output of said scanning means for providing a digital coded signal indicating the measured value of the currently scanned variable which is to be integrated with data on the same variable obtained during previous scanning cycles.

8. In a data monitoring and recording system including relatively fast operating scanning means for scanning the outputs of variable-responsive means, relatively slow operating output indicating means for providing a visual indication of the values of the variables as determined from the outputs of said variable-responsive means, and storage means having storage locations for storing data on the values of substantially all of the variables obtained at spaced scanning intervals, control means for controlling the feeding of information between said scanning means, storage means and said output indicating means, said control means including: means for feeding data on the values of the variables derived from the output of the scanned variable-responsive means to said first mentioned storage locations in said storage means where such data is stored, and means for periodically sequentially feeding to said output indicating means data on the values of said variables stored in said first mentioned locations in said storage means at a substantially slower rate than said variable-responsive means are scanned while said scanning means continues to operate.

9. In a data monitoring and recording system including relatively fast operating scanning means for scanning the outputs of variable-responsive means, relatively slow operating output indicating means for providing a visual indication of the values of the variables as determined from the outputs of said variable-responsive means, and storage means having storage locations for storing data on the values of substantially all of the variables obtained at spaced scanning intervals, and other storage locations in which are stored other data on said variables including alarm limits of the variables, control means for controlling the feeding of information between said scanning means, storage means and said output recording means, said control means including: means for feeding data on the values of the variables derived from the output of the scanned variable-responsive means to said first mentioned storage locations in said storage means where such data is stored, means for comparing data representing the value of the variable being scanned with corresponding alarm data in said other storage locations in said storage means and for feeding of data identifying a new abnormal variable to said output indicating means without much delay, means for periodically sequentially feeding to said output indicating means data on the values of said variables stored in said first mentioned locations in said storage means at a substantially slower rate than said variable-responsive means are scanned, said scanning means continuing to operate so as to monitor abnormal variables simultaneously with the operation of said output indicating means, so that the monitoring of the variables need not await the relatively slow operation of said output indicating means in sequentially indicating the values of the variables.

10. A variable monitoring system including relatively fast operating scanning means for sequentially scanning the outputs of variable-responsive means; relatively slow operating output indicating means for displaying information on the variables; data storage means having a plurality of storage locations respectively containing information of the variables associated with said variable-responsive means, the storage locations associated with said variables each containing program selection instruction information dependent on the variable type involved and indicating whether data on the associated variable is to be indicated on said output indicating means during preselected intervals, and storage space for data on the value of the variable to be fed to said output indicating means during the next preselected interval, said storage means further having stored therein a log address related to the storage location to which access is next to be had for feeding said variable values to said output indicating means, and a scan address related to the scanning position of said scanning means; timing means for indicating the start of preselected storage entry intervals when the variable values obtained from the outputs of said variable-responsive means are to be fed to said storage spaces in said storage means at a relatively high rate and thereafter from said storage means to said output indicating means at a relatively slow rate; and control means collectively comprising a number of control sections which are sequentially and cyclically operated at least once for each different scanning position of said scanning means, one of said control sections including means responsive to instruction information at the storage location corresponding to the scan address in said storage means which indicates that data on the associated variable is to be stored during said preselected storage entry intervals for feeding data from the currently scanned variable-responsive means to said storage space at the last mentioned storage location set aside for such data when said timing means indicates that a preselected storage entry interval has arrived, means for feeding the data to be indicated on said output indicating means from the storage location of said storage means identified by the log address in said storage means provided the output indicating means is free to accept such data and for modifying said log address to gain access to other variable data to be fed to said output indicating means when the data in the storage location associated with the current log address is fed to said output indicating means, another of said control sections including means for changing said scan address in said storage means to correlate said scan address with the scanning position of said scanning means, and said control means including means for continuing the aforesaid cyclic operation of said control means and said scanning means during the relatively slow feeding of said data values to said output indicating means following a storage entry interval, so that the monitoring of the variables need not await the relatively slow operation of said output indicating means.

11. A variable monitoring system including relatively fast operating scanning means for sequentially scanning the outputs of variable-responsive means; relatively slow operating output indicating means for displaying information of the variables; data storage means having a plurality of storage locations respectively containing information of the variables associated with said variable-responsive means, the storage locations associated with said variables each containing data on at least one alarm limit of the associated variable, program selection instruction information dependent on the variable type involved and indicating whether data on the associated variable is to be indicated on said output indicating means during preselected intervals and whether an alarm detection operation is to be performed on the data of the associated variable, and storage space for data on the value of the variable to be fed to said output indicating means, said storage means further having stored therein a log address related to the storage location to which access is next to be had for feeding said variable values to said output indicating means, and a scan address related to the scanning position of said scanning means; timing means for indicating the start of preselected storage entry intervals when the variable values obtained from the outputs of said variable-responsive means are to be fed to said storage spaces in said storage means at a relatively high rate and thereafter from said storage means to said output indicating means at a relatively slow rate; and control means comprising a number of control sections which are sequentially and cyclically operated, one of said control sections including means responsive to instruction information at the storage location corresponding to the scan address in said storage means which indicates that data on the associated variable is to be stored during said preselected storage entry intervals for feeding data from the currently scanned variable-responsive means to said storage space at the last mentioned storage location set aside for such data when said timing means indicates that a preselected storage entry interval has arrived, and means for feeting the data to be indicated on said output indicating means from the storage location of said storage means identified by the log address in said storage means provided the output indicating means is free to accept such data and for modifying said log address to gain access to other variable data to be fed to said output means when the data in the storage location associated with the current log address is fed to said output indicating means, another of said control sections including means for changing said scan address in said storage means to correlate said scan address with the scanning position of said scanning means, another of said control sections including control means responsive to the instruction information at the storage location corresponding to the current scan address in said storage means which indicates that an alarm detection operation is desired by effecting the comparison of the alarm limit data in the associated storage location with the value of the associated variable and effecting substantially immediate feeding to said output indicating means of information indicating an abnormal variable when detected by said comparison operation, and said control means including means for continuing the aforesaid cyclic operation of said control means and said scanning means during the relatively slow feeding of said data values to said output indicating means following a storage entry interval, so that the monitoring of the variables need not await the relatively slow operation of said output indicating means.

12. A variable monitoring system including scanning means for scanning the outputs of variable-responsive transducer means, data storage means containing information on the variables, said information including alarm limit data on the variables and program selection instruction information dependent on the variable types involved, manually operable input means for changing alarm limit data in said storage means for any selected variable, and control means comprising a number of individual program control sections providing a variety of programs, said control sections being arranged to be automatically sequentially operated and forming a program unit which is cyclically operated at least once for each scanning position of said scanning means, and one of said control sections including means responsive to operation of said manually operable input means to read the information set thereon into said storage means for changing the alarm limit for a selected variable with only a momentary delay in the program cycle involved.

13. A variable monitoring system including scanning means for scanning the outputs of variable-responsive transducer means, data storage means containing information on the variables, said information including alarm limit data on the variables and program selection instruction information dependent on the variable types involved, manually operable input means for changing alarm limit data and program selection instruction information in said storage means for any selected variable, and control means comprising a number of individual program control sections providing a variety of programs depending on the type of variable associated with the transducer means being scanned, said control sections being arranged to be automatically sequentially operated and forming a program unit which is cyclically operate at least once for each scanning position of said scanning means, and one of said control sections being positioned to be operated every program cycle and including means responsive to operation of said manually operable input means to read the information set thereon into said storage means for changing the alarm limit and program selection instruction information for a selected variable with only a momentary delay in the program cycle involved.

14. A variable monitoring system including scanning means for scanning the outputs of variable-responsive transducer means, data storage means containing information on the variables, said information including alarm limit data on the variables and program selection instruction information dependent on the variable types involved, manually operable input means for changing alarm limit data and program selection instruction information in said storage means for any selected variable, and control means comprising a number of individual program control sections providing a variety of programs depending on the type of variable associated with the transducer means being scanned, said control sections being arranged to be automatically sequentially operated and forming a program unit which is cyclically operate at least once for each scanning position of said scanning means, said control sections being operative in both series and branched relation, a branching condition transfer control section operated prior to said branched control sections and being responsive to the program selection instruction information corresponding to the variable associated with the transducer means being scanned which identifies the type of variable involved by rendering the appropriate branched control section operative and bypassing the other of same, and one of said control sections being positioned to be operated every program cycle and including means responsive to operation of said manually operable input means to read the information set thereon into said storage means for changing the alarm limit and program selection instruction information for a selected variable with only a momentary delay in the program cycle involved.

15. A variable monitoring system including scanning means for scanning the outputs of variable-responsive transducer means, data storage means containing information on the variables and including alarm limit data on the variables and program selection information dependent on the variable types involved, and control means comprising a number of individual program control sections providing a variety of programs depending on the type of variable associated with the transducer means being scanned, said control sections being arranged to be automatically sequentially operated and forming a program unit which is cyclically operated at least once for each scanning position of said scanning means, said control sections being arranged in both series and branched relation, a branching conditional transfer control section operated prior to said branched control section and being responsive to the program selection instruction information corresponding to the variable associated with the transducer means being scanned which identifies the type of variable involved by rendering the appropriate branched control section operative and bypassing the other of same, and means responsive to a given external condition completely independent of the condition of the variable being scanned by temporarily modifying a portion of the program cycle involved.

16. A variable monitoring system comprising: variable responsive transducer means associated with respective variables to be monitored, only some of said variables being variables whose values are to be integrated, scanning means for scanning the outputs of said transducer means, said scanning means having a first section to which transducer means associated with non-integration variables are connected and a second section to which only transducer means associated with the variables to be integrated are connected, output indicating means for indicating the conditions of said variables, storage means having a plurality of storage locations respectively containing information on the variables associated with said transducer means, the storage locations of integration variables having storage spaces for the integration values of the variables, said storage means further having a scan address related to the scanning position of said first section of said input scanning means and an integration address related to the scanning position of said second section of said scanning means, means for changing said scan address in said storage means with the change in the scanning position of said first section of said scanning means, timing means for indicating regular periods when said integration variables are to be integrated, and means responsive to the integration period determined by said timing means by rendering the first section of said scanning means inactive to scan the associated transducer means and rendering the second section of said scanning active to scan the integration variable transducer means, and changing said integration address with the change in scanning position of said second section of the scanning means, and means following completion of an integration period for rendering said first section of said scanning means active to scan the associated transducer means at the scanning position identified by the scan address in said storage means.

17. A variable monitoring system comprising: variable responsive transducer means associated with respective variables to be monitored, only some of said variables being variables whose values are to be integrated, scanning means for scanning the outputs of said transducer means, said scanning means having a first section to which transducer means associated with non-integration variables are connected and a second section to which only transducer means associated with the variables to be integrated are connected, output indicating means for indicating the conditions of said variables, storage means having a plurality of storage locations respectively containing information on the variables associated with said transducer means, at least some of said storage locations including information on at least one alarm limit of the associated variables and program selection instruction information indicating whether an alarm detection operation is to be performed on the data of the associated variable, the storage locations of integration variables having storage spaces for the integration values of the variables, said storage means further having a scan address related to the scanning position of said first section of said input scanning means and an integration address related to the scanning position of said second section of said scanning means, means for changing said scan address in said storage means with the change in the scanning position of said first section of said scanning means, timing means for indicating regular periods when said integration variables are to be integrated, and means responsive to the integration period determined by said timing means by rendering the first section of said scanning means inactive to scan the associated transducer means and rendering the second section of said scanning active to scan the integration variable transducer means, and changing said integration address with the change in scanning position of said second section of the scanning means, means following completion of an integration period for rendering said first section of said scanning means active to scan the associated transducer means at the scanning position identified by the scan address in said storage means, means responsive to said instruction information at the address in said storage means corresponding to the active scanning position of said scanning means which information indicates that an alarm detection operation is desired by comparing the alarm limit data value of the variable in said storage means and the value of the scanned variable, and means responsive to the detection of an abnormal variable by feeding information to said output indicating means which identifies the abnormal variable.

18. A variable monitoring system including scanning means having a number of different scanning conditions for respectively scanning the outputs of different variable-responsive transducer means, storage means having a plurality of storage locations respectively containing information on the variables associated with said variable-responsve transducer means, said information in said storage means being stored in digital coded form and the storage locations including alarm limit information on the variables and program selection instruction information dependent on the variable types involved and including instruction information which indicates whether data from the transducer means being scanned is to be compared with corresponding alarm limit information in said storage means, and control means comprising a number of individual program control sections providing a variety of different routes for flow of information to and from said storage means depending on the type of variable associated with the transducer means being scanned, said control sections being arranged to be automatically sequentially operated and forming a program unit which is cyclically operated at least once for each scanning condition of said scanning means, one of said control sections including means being operative each scanning cycle to change the scanning condition of said scanning means, and another of said control sections being responsive to said program selection instruction information corresponding with the transducer means being scanned which instruction information indicates the need for an alarm detection operation by effecting the comparison of the corresponding alarm limit data with the value of the currently scanned variable and for performing a control function when an abnormal condition of the scanned variable is detected.

19. A variable monitoring system including scanning means having a number of different scanning conditions for respectively scanning the outputs of different variable-responsive transducer means, data storage means having a plurality of storage locations respectively containing information on the variables associated with said variable-responsive transducer means, said information in said storage means being stored in digital coded form and the storage locations associated with each of said variables including alarm limit information on the variables and program selection instruction information dependent on the variable types involved, each of which instruction information indicates whether data on the associated variable at the storage location involved is to be compared with alarm limit information in said storage means, said storage means further having stored therein an address related to the scanning condition of said scanning means, and control means comprising a number of individual program control sections providing a variety of different routes for flow of information to and from said storage means depending on the type of variable associated with the transducer means being scanned, said control sections being arranged to be automatically sequentially operated and forming a program unit which is cyclically operated at least once for each scanning condition of said scanning means, one of said control sections being operative each scanning cycle to change the scanning condition of said scanning means and said address to correlate the address stored in said storage means with the scanning condition of the scanning means, and another of said control sections being responsive to said program selection instruction information at the storage location corresponding with the address currently in said storage means which instruction information indicates the need for an alarm detection operation by effecting the comparison of the alarm limit data at the current address with the value of the currently scanned variable and performing a control function when an abnormal variable is detected.

20. A variable monitoring system including scanning means having a number of different scanning conditions for scanning respectively the outputs of different variable-responsive transducer means at least some of which are associated with variables whose values are to be totalized, data storage means having a plurality of storage locations respectively containing information on the variables associated with said variable-responsive transducer means, said information in said storage means being stored in digital coded form and the storage locations including totals information where the associated variables are to be totalized and program selection instruction information dependent on the variable types involved and including instruction information which indicates whether data from the transducer means being scanned is to be compared with corresponding alarm limit information in said storage means and added to data on the same variable obtained when the variable was previously scanned to give totals information, and control means comprising a number of individual program control sections providing a variety of different routes for flow of information to and from said storage means depending on the type of variable associated with the transducer means being scanned, said control sections being arranged to be automatically sequentially operated and forming a program unit which is cyclically operated at least once for each scanning position of said scanning means, one of said control sections including means for changing the condition of the scanning means during a program cycle, another of said control sections being responsive to said program selection instruction information corresponding with the transducer means being scanned which instruction information indicates the need for an alarm detection operation for effecting the comparison of the corresponding alarm limit data with the value of the currently scanned variable and performing a control function when an abnormal variable is detected, and another of said control sections being responsive to instruction information indicating that totalization is in order by effecting the addition of the value of the variable indicated by the currently scanned transducer means to the associated totals data stored in said storage means.

21. A variable monitoring system comprising: variable responsive transducer means providing signals outputs indicating the values of associated variables, scanning means for sequentially scanning the outputs of different variable-responsive transducer means and delivering variable value indicating signals to a common output, storage means in which are stored values of the variables and data constants including alarm limits therefor, external control means responsive to an external condition independent of the variable responsive transducer means being scanned, and cyclically operated program control means including means for normally providing a succession of operations including comparing the values of the variables indicated by the signals at said common output with the corresponding alarm limit data stored in said storage means, said program control means including program modifying means responsive to operation of said external control means for momentarily modifying the current program cycle and carrying out an alternate series of operations related to said external condition.

22. A variable monitoring system comprising: variable responsive transducer means providing signals outputs indicating the values of associated variables, scanning means for sequentially scanning the outputs of different variable-responsive transducer means and delivering variable value indicating signals to a common output, storage means in which are stored values of the variables and data constants including alarm limits therefor, output indicating means on which data on the variables may be periodically displayed, manually operable external control means, and cyclically operated program control means including means for normally providing a succession of operations including changing the scanning condition of said scanning means, comparing the values of the variables indicated by the signals at said common output with the corresponding alarm limit data stored in said storage means, storing the values of the scanned variables in said storage means, and reading out the stored values of the variables in said output indicating means, said program control means including program modifying means responsive to operation of said external control means for momentarily modifying the current program cycle and carrying out an alternate series of operations related to said external condition.

23. A continuous variable monitoring system including variable responsive transducer means associated with variables of different types, external control means responsive to an external condition independent of the variable responsive transducer means being scanned, computer means, storage means for storing data on the variables as determined from the output of said transducer means and in which are stored alarm limit and other data including program selection information for the different respective variable types, output display means for displaying data stored in said storage means, program control means providing a variety of program sub-routines for the monitoring system involving different uses of said computer means, storage means and said output display means, some of said program sub-routines being designed for use with said different types of variables and another being designed for use upon operation of said external control means, and said programs control means including means responsive to the program selection information associated with the transducer means being scanned for operating the monitoring system in the corresponding program sub-routine, and means responsive to the operation of said external control means for operating the monitoring system in said other sub-routine.

24. A continuous variable monitoring system including variable responsive transducer means associated with variables of different types, computer means, storage means for storing data on the variables as determined from the output of said transducer means and in which are stored alarm limit and other data including program selection information for the different respective variable types, output display means for displaying data stored in said storage means, program control means providing a variety of program sub-routines for the monitoring system involving different uses of said computer means, storage means and said output display means, some of said program sub-routines being designed for use with said different types of variables and said programs control means including means responsive to the program selection information associated with the transducer means being scanned for operating the monitoring system in the corresponding program sub-routine.

25. A variable monitoring system including relatively fast operating scanning means for separately scanning the outputs of variable-responsive means in a definite predetermined order; relatively slow operating output indicating means for displaying information on the variables; data storage means having a plurality of storage locations respectively containing information of the variables associated with said variable-responsive means and positioned in the same order as said variable-responsive means are scanned, the storage locations associated with said variables each containing program selection instruction information dependent on the variable type involved and indicating whether data on the associated variable is to be indicated on said output indicating means during preselected intervals, and storage space for data on the value of the variable to be fed to said output indicating means, said storage means further having stored therein a log address related to the storage location to which access is next to be had for feeding said variable values to said output indicating means, and a scan address related to the scanning position of said scanning means; timing means for indicating the start of preselected storage entry intervals when the variable values in said storage means obtained from the outputs of said variable-responsive means are to be fed to said storage spaces in said storage means at a relatively high rate and thereafter from said storage means to said output indicating means at a relatively slow rate; and control means comprising a number of control sections which are sequentially and cyclically operated at least once for each different scanning position of said scanning means, one of said control sections including means responsive to instruction information at the storage location corresponding to the scan address in said storage means which indicates that data on the associated variable is to be stored during said preselected storage entry intervals for feeding data from the currently scanned variable-responsive means to said storage space at the last mentioned storage location set aside for such data when said timing means indicates that a preselected storage entry interval has arrived, and means for feeding the data to be indicated on said output indicating means from the storage location of said storage means identified by the log address in said storage means provided the output indicating means is free to accept such data and for modifying said log address to gain access to other variable data to be fed to said output indicating means when the data in the storage location associated with the current log address is fed to said output indicating means, another of said control sections including means for changing said scan address in said storage means to correlate said scan address with the scanning position of said scanning means, and said control means including means for continuing the aforesaid cyclic operation of said control means and said scanning means during the relatively slow feeding of said data values to said output indicating means following a storage entry interval, so that the monitoring of the variable need not await the relatively slow operation of said output indicating means.

References Cited in the file of this patent

UNITED STATES PATENTS

| | | |
|---|---|---|
| 2,609,143 | Stibitz | Sept. 2, 1952 |
| 2,737,342 | Nelson | Mar. 6, 1956 |
| 2,759,171 | Fleming | Aug. 14, 1956 |
| 2,849,704 | Neff | Aug. 26, 1958 |
| 2,883,255 | Anderson | Apr. 21, 1959 |

OTHER REFERENCES

"Description of a Magnetic Drum Calculator," Harvard U. Computation Lab., 1952; pp. 7 to 11, 21 to 26, 28 to 36, and 38 to 40 relied on.

Armata, "High Density Digital Data Recording," Tele Tech, July 1954, pp. 68, 69, 110 and 111 relied on.

"Automatic Data Reduction," Instruments and Automation, Sept. 1956, pp. 1767 to 1772.